United States Patent
Kim et al.

(10) Patent No.: US 11,647,412 B2
(45) Date of Patent: May 9, 2023

(54) METHOD FOR IMPROVING MEASUREMENT PERFORMANCE OF TERMINAL IN WIRELESS COMMUNICATION SYSTEM AND APPARATUS THEREOR

(71) Applicant: LG ELECTRONICS INC., Seoul (KR)

(72) Inventors: Jaehyung Kim, Seoul (KR); Changhwan Park, Seoul (KR); Joonkui Ahn, Seoul (KR); Seunggye Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/265,601

(22) PCT Filed: Aug. 9, 2019

(86) PCT No.: PCT/KR2019/010148
§ 371 (c)(1),
(2) Date: Feb. 3, 2021

(87) PCT Pub. No.: WO2020/032730
PCT Pub. Date: Feb. 13, 2020

(65) Prior Publication Data
US 2021/0195457 A1   Jun. 24, 2021

Related U.S. Application Data

(60) Provisional application No. 62/716,975, filed on Aug. 9, 2018.

(30) Foreign Application Priority Data

Sep. 25, 2018 (KR) .................. 10-2018-0114551
Mar. 29, 2019 (KR) .................. 10-2019-0037407
May 3, 2019 (KR) .................. 10-2019-0052624

(51) Int. Cl.
*H04W 24/10* (2009.01)
*H04B 17/318* (2015.01)
*H04W 56/00* (2009.01)
*H04W 76/28* (2018.01)
*H04J 11/00* (2006.01)

(52) U.S. Cl.
CPC .......... *H04W 24/10* (2013.01); *H04B 17/318* (2015.01); *H04J 11/0069* (2013.01); *H04W 76/28* (2018.02)

(58) Field of Classification Search
None
See application file for complete search history.

(56) References Cited

U.S. PATENT DOCUMENTS

2018/0019855 A1* 1/2018 Zhang .................. H04B 7/0626
2018/0048412 A1   2/2018 Zhang et al.
(Continued)

FOREIGN PATENT DOCUMENTS

KR    20140099917        8/2014
WO    2018028983         2/2018
WO    WO-2019063819 A1 * 4/2019 ........ H04W 52/0216

OTHER PUBLICATIONS

"3GPP TSG RAN Meeting #80 RP-181186", La Jolla, US, Jun. 11-14, 2018, pp. 1-7 (Year: 2018).*
(Continued)

*Primary Examiner* — Scott M Sciacca
(74) *Attorney, Agent, or Firm* — Lee Hong Degerman Kang Waimey

(57) ABSTRACT

Disclosed are a method for improving measurement performance of a terminal in a wireless communication system, and an apparatus therefor. Specifically, in a method wherein a terminal performs measurement in a wireless communication system, a method performed by the terminal com-
(Continued)

prises the steps of: receiving, from a serving base station, configuration information for measurement of a reference signal receive power (RSRP) and/or a reference signal received quality (RSRQ), wherein the configuration information includes port configuration information related to an antenna port to which a reference signal is transmitted and measurement configuration information related to a correlation between a cell-specific reference signal (CRS) and a re-synchronization signal (RSS) for the measurement; receiving the CRS and/or the RSS from a neighbor base station; calculating the RSRP and/or the RSRQ according to the configuration information by using the CRS and the RSS; and reporting the RSRP and/or the RSRQ to the serving base station.

7 Claims, 40 Drawing Sheets

(56) References Cited

U.S. PATENT DOCUMENTS

| | | | |
|---|---|---|---|
| 2019/0268904 A1* | 8/2019 | Miao | H04W 52/02 |
| 2019/0306812 A1* | 10/2019 | Sengupta | H04W 56/005 |
| 2020/0344021 A1* | 10/2020 | Fang | H04L 5/0094 |

OTHER PUBLICATIONS

PCT International Application No. PCT/KR2019/010148, International Search Report dated Dec. 4, 2019, 4 pages.
Sony, "Remaining issues in RSS," 3GPP TSG RAN WG1 Meeting #93, R1-1806558, May 2018, 5 pages.
Ericsson, "Introduction of Even Further Enhanced MTC for LTE," 3GPP TSG-RAN1 Meeting #93, R1-1807935, May 2018, 26 pages.

* cited by examiner

[FIG. 20]
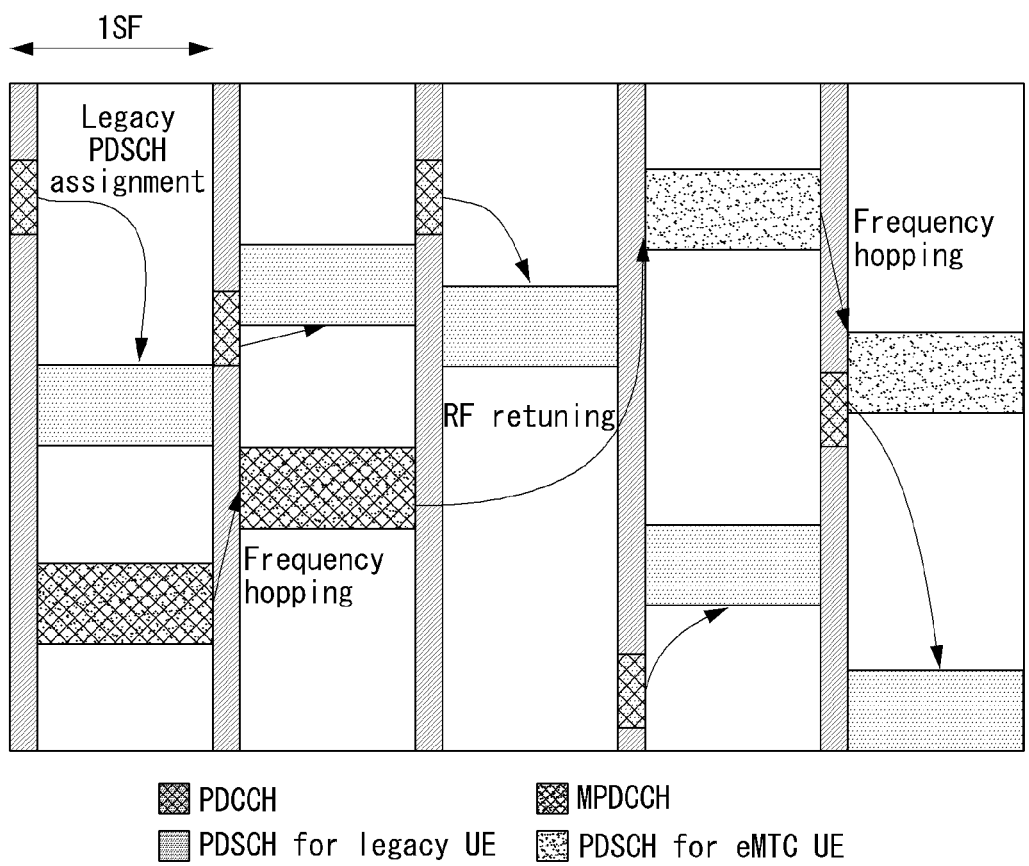

[FIG. 21]
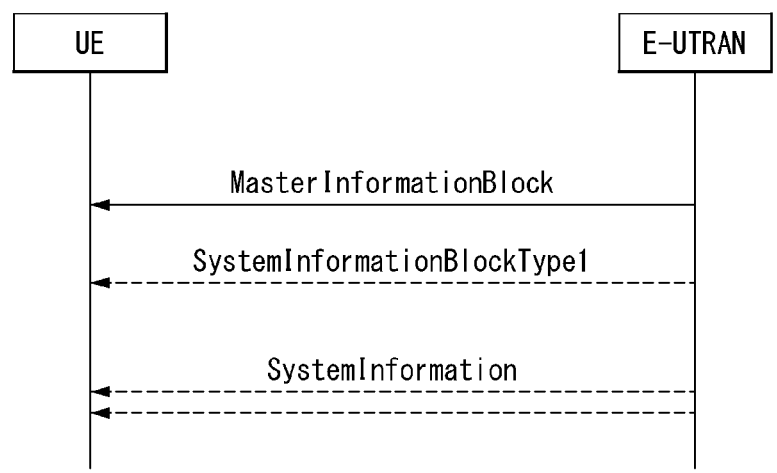

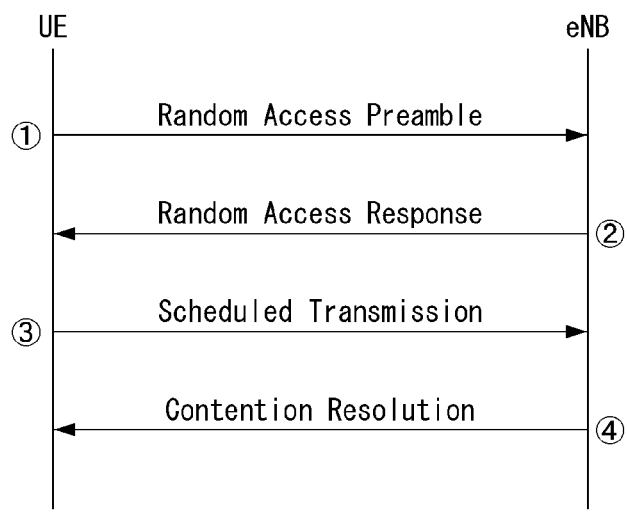
[FIG. 22]

[FIG. 23]
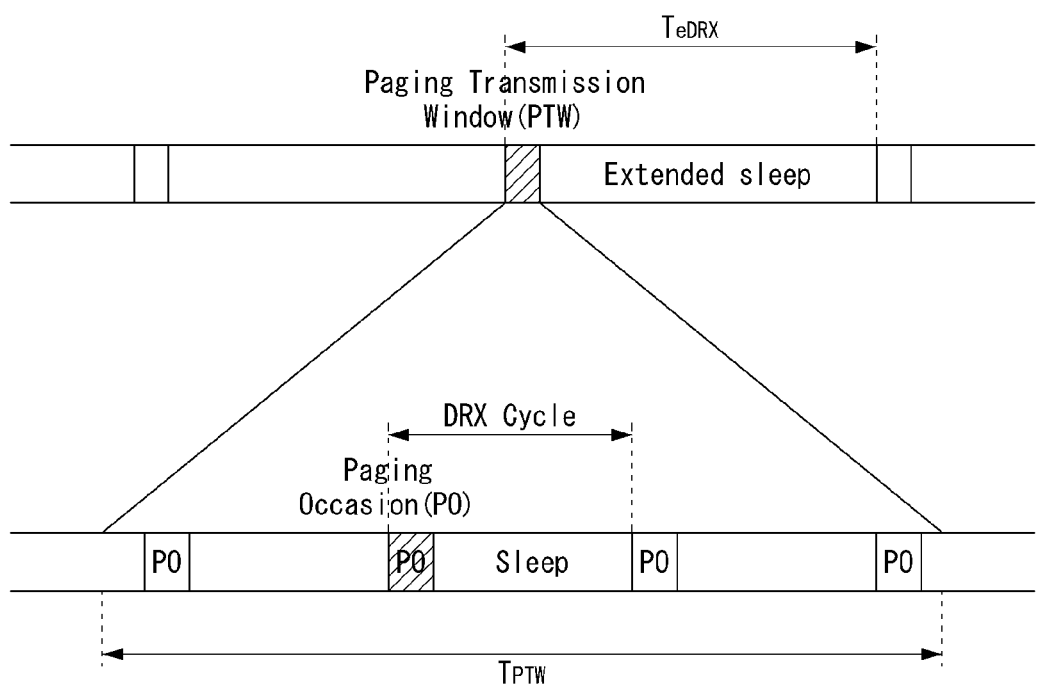

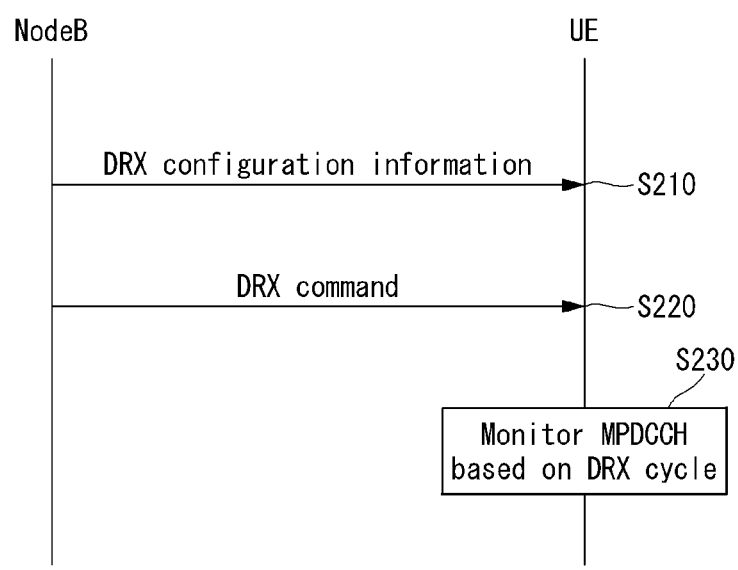
[FIG. 24]

[FIG. 25]
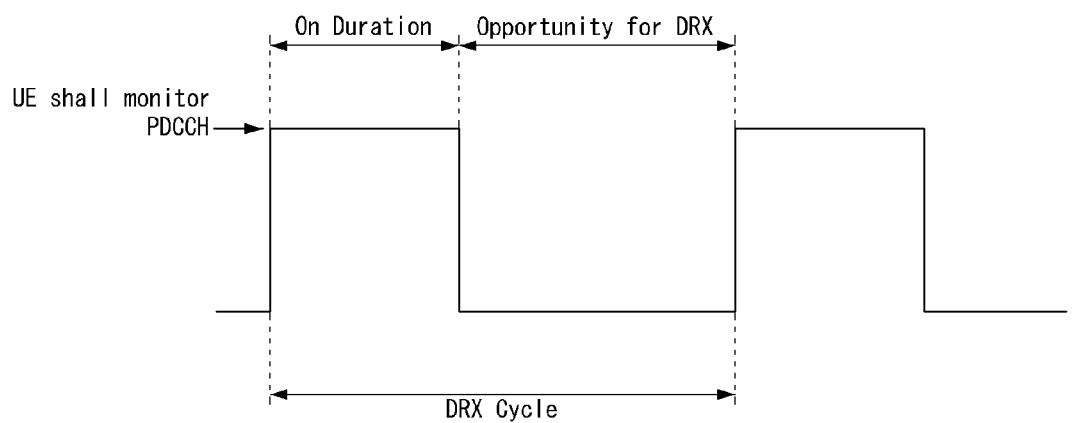

[FIG. 26]

| Port 1 | Port 1 | Port 2 | Port 2 | Port 3 | Port 3 | Port 4 | Port 4 |
|---|---|---|---|---|---|---|---|
| #1 | #2 | #3 | #4 | #5 | #6 | #7 | #8 | frequency ↑ → time

[FIG. 27]
[MGP#0], period = 40ms, duration = 6ms, offset = 10ms
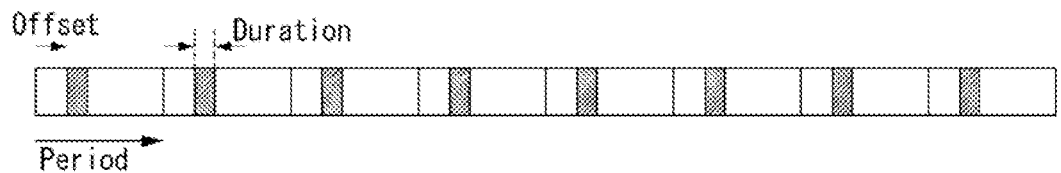
[MGP#1], period = 80ms, duration = 6ms, offset = 10ms
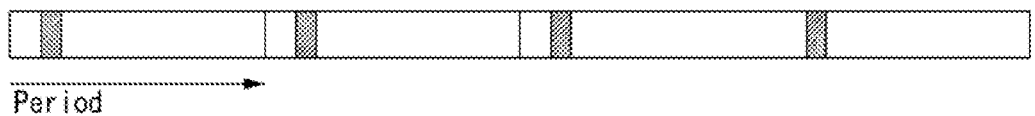
[RSS] with period = 160ms, duration = 8ms, offset = 8ms
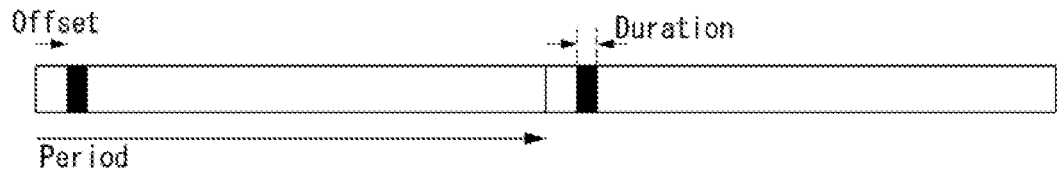

[FIG. 28]
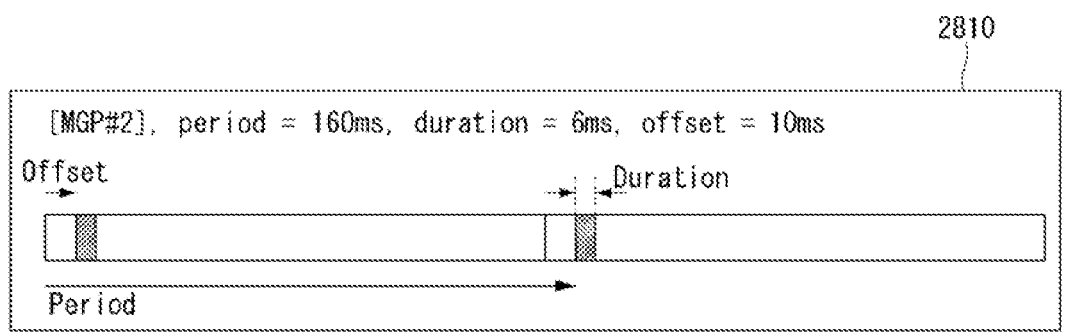
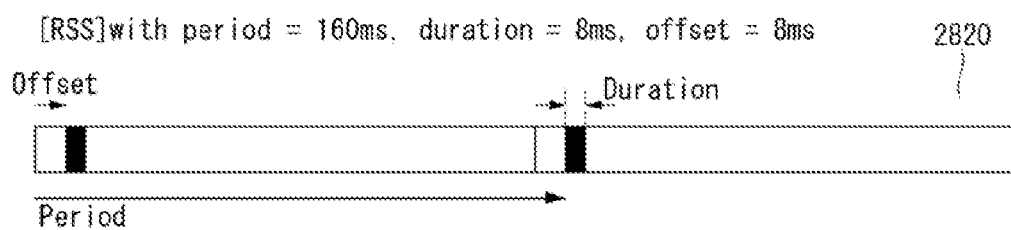

【FIG. 29】
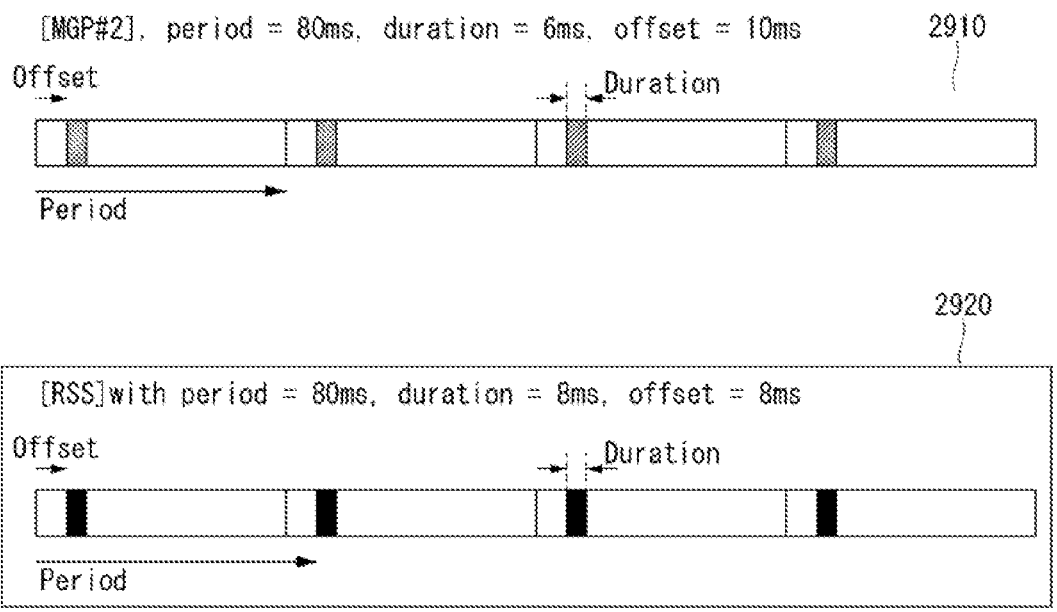

[FIG. 30]
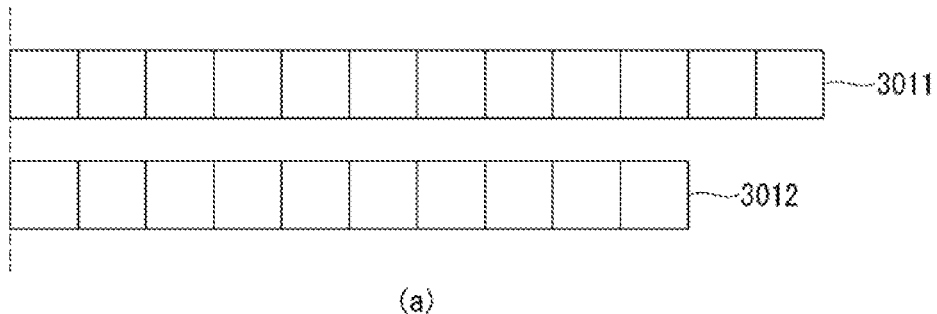
(a)
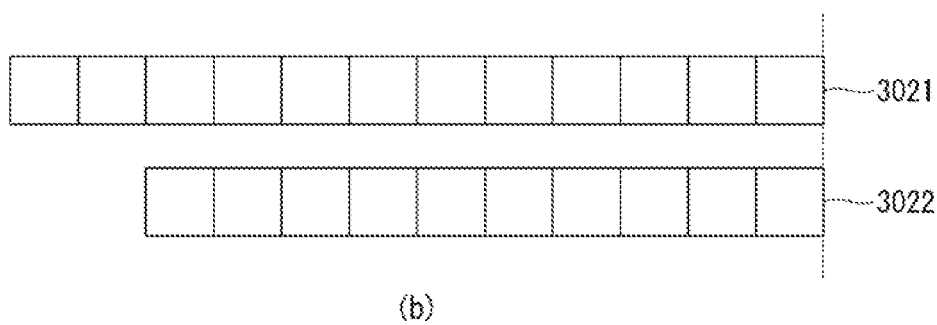
(b)
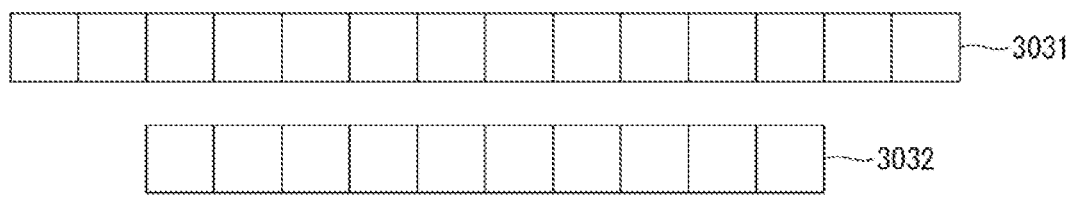
(c)

[FIG. 31]
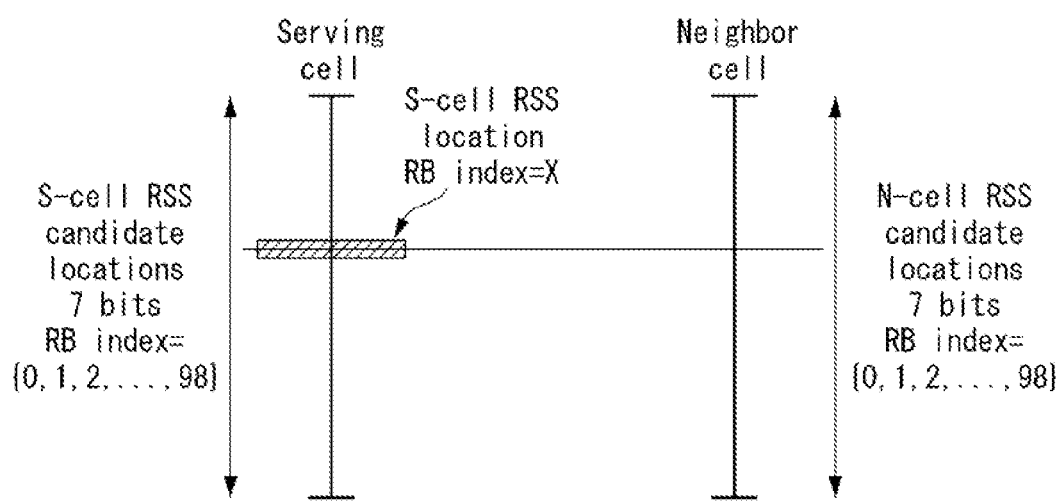

[FIG. 32]
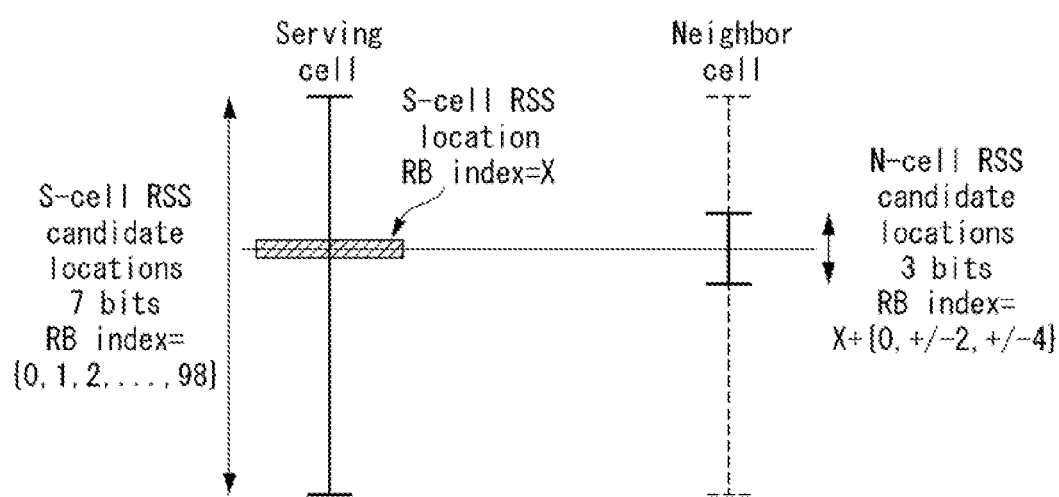

[FIG. 33]
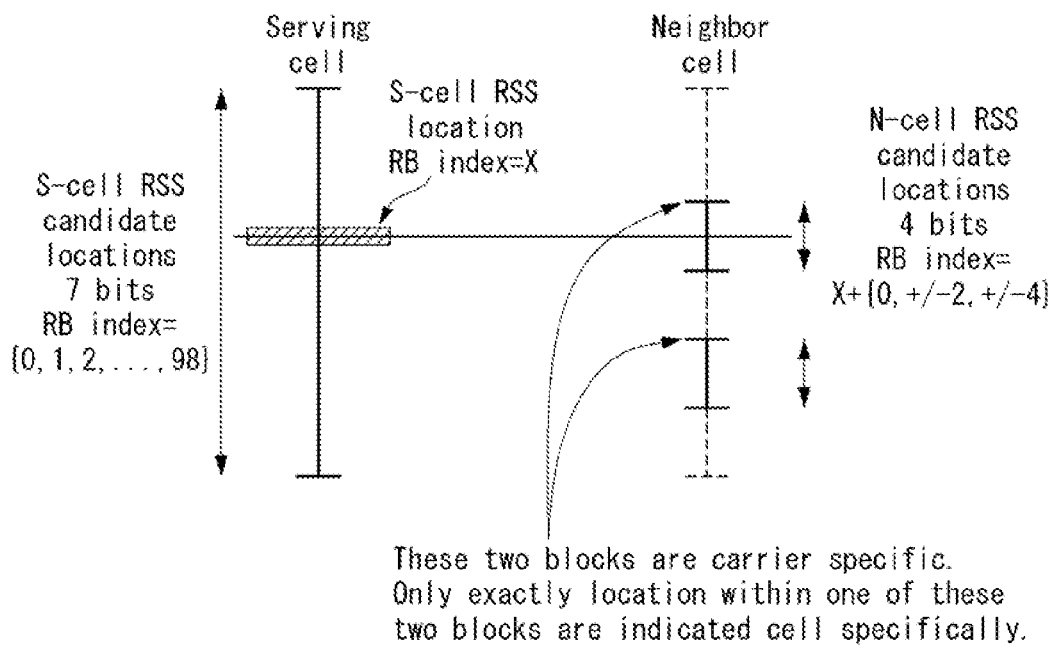

[FIG. 34]
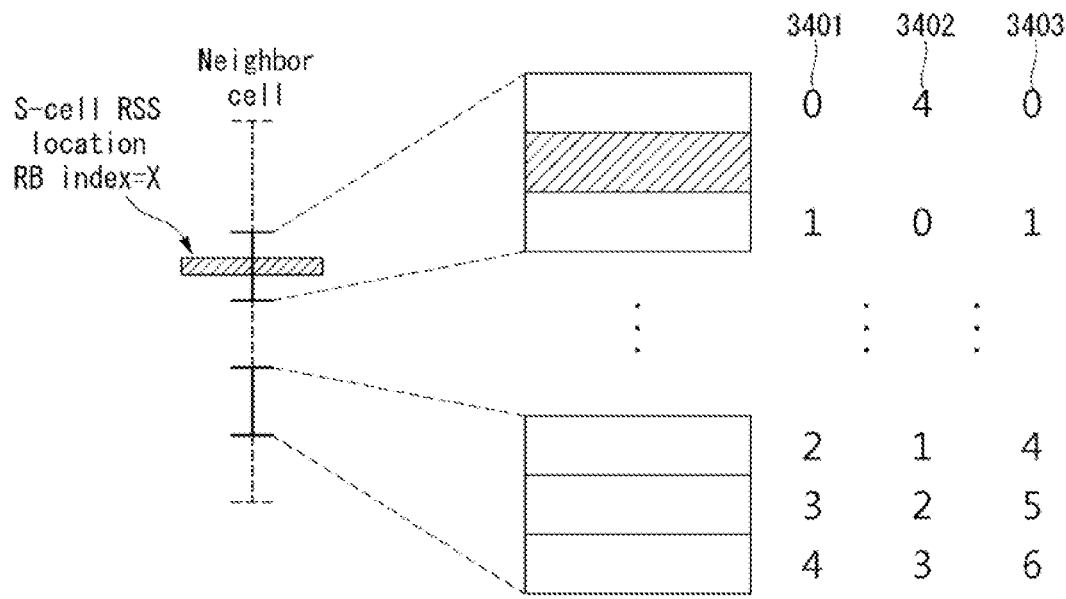

[FIG. 35]
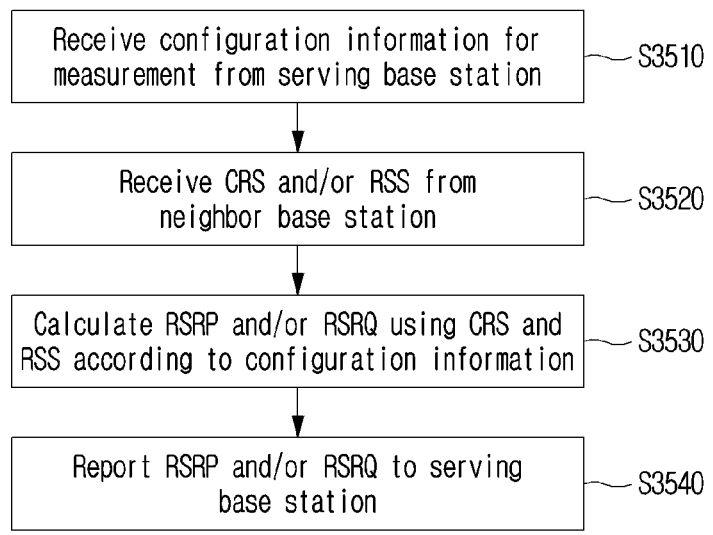

[FIG. 36]
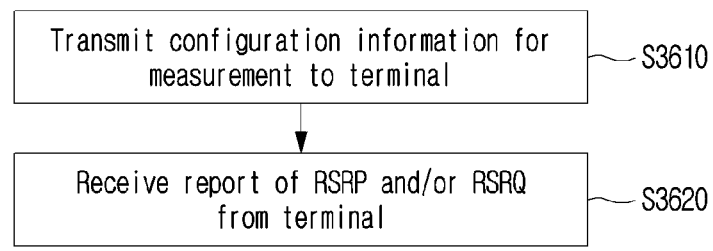

[FIG. 37]
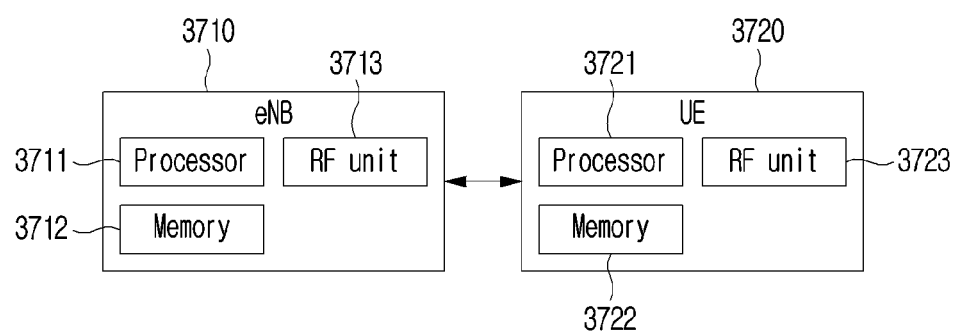

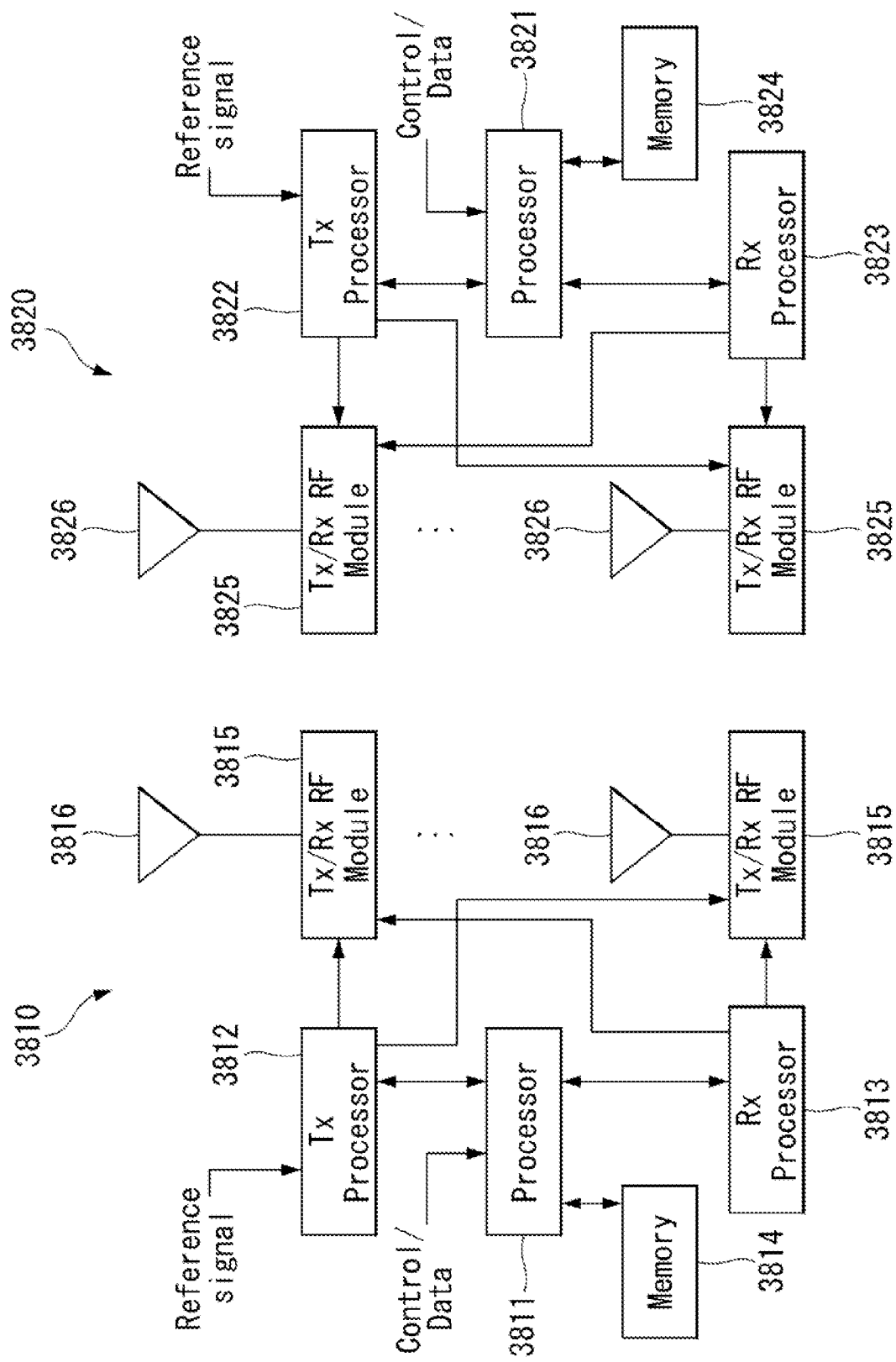

[FIG. 39]
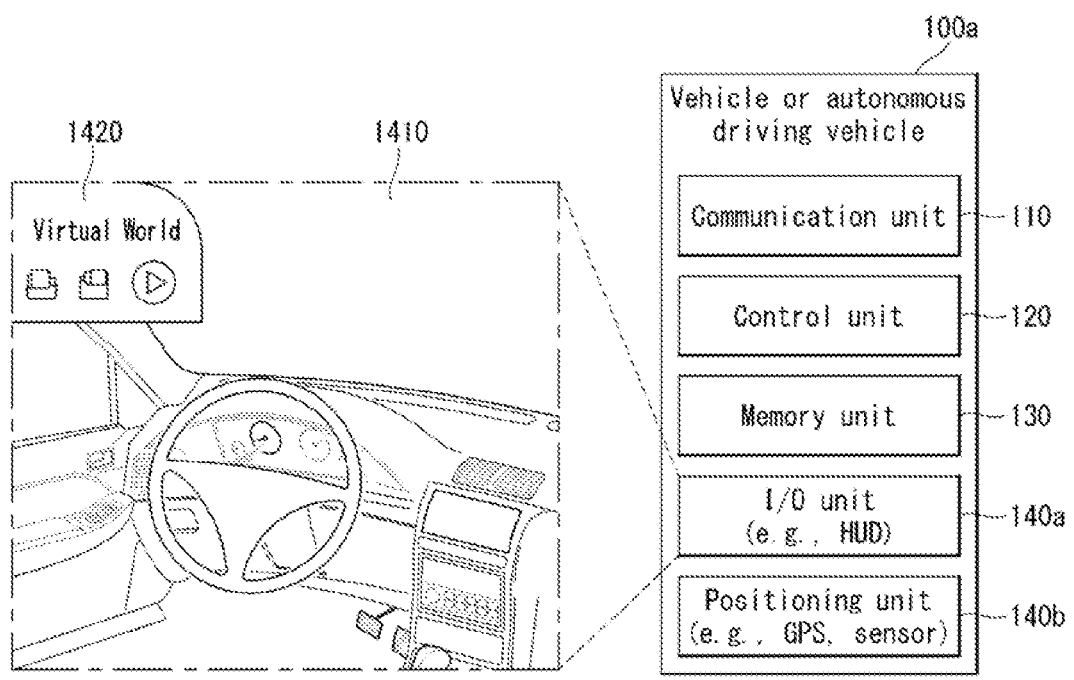

[FIG. 40]
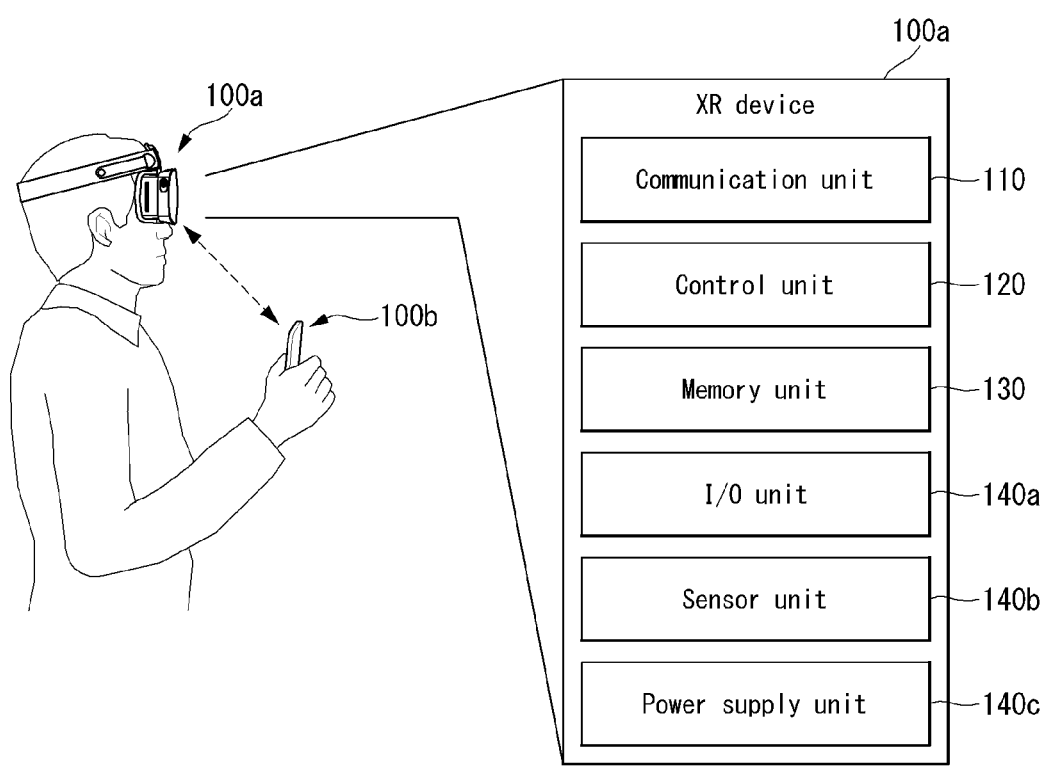

METHOD FOR IMPROVING MEASUREMENT PERFORMANCE OF TERMINAL IN WIRELESS COMMUNICATION SYSTEM AND APPARATUS THEREOR

CROSS-REFERENCE TO RELATED APPLICATIONS

This application is the National Stage filing under 35 U.S.C. 371 of International Application No. PCT/KR2019/010148, filed on Aug. 9, 2019, which claims the benefit of U.S. Provisional Application No. 62/716,975, filed on Aug. 9, 2018, and also claims the benefit of earlier filing date and right of priority to Korean Application Nos. 10-2018-0114551 filed on Sep. 25, 2018, 10-2019-0037407 filed on Mar. 29, 2019, and 10-2019-0052624 filed on May 3, 2019, the contents of which are all incorporated by reference herein in their entirety.

TECHNICAL FIELD

The present disclosure relates to a wireless communication system, and more particularly, to a method for improving measurement performance of a terminal and an apparatus therefor.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present disclosure is to provide a method of improving the measurement performance of a terminal in a wireless communication system.

In addition, an object of the present disclosure is to provide a method for improving mobility of a terminal in a wireless communication system.

In addition, an object of the present disclosure is to provide a method in which a terminal can use a resynchronization signal (RSS) for measurement in a wireless communication system.

In addition, an object of the present disclosure is to provide a method of reducing signaling overhead for measurement of a terminal in a wireless communication system.

The technical objects to attain in the present disclosure are not limited to the above-described technical objects and other technical objects which are not described herein will become apparent to those skilled in the art from the following description.

Technical Solution

In the present disclosure, a method of performing measurement at a terminal, in a wireless communication system, the method performed by the terminal includes receiving, from a serving base station, configuration information for measurement of a reference signal receive power (RSRP) and/or a reference signal received quality (RSRQ), wherein the configuration information includes port configuration information related to an antenna port through which a reference signal is transmitted, and measurement configuration information related to a relationship between a cell-specific reference signal (CRS) and a re-synchronization signal (RSS) for the measurement; receiving, from a neighbor base station, the CRS and/or the RSS; calculating the RSRP and/or the RSRQ according to the configuration information using the CRS and the RSS; and reporting, to the serving base station, the RSRP and/or the RSRQ.

In addition, in the present disclosure, the port configuration information includes CRS port configuration information and RSS port configuration information.

In addition, in the present disclosure, the CRS port configuration information is information related to a number of antenna ports through which the CRS is transmitted.

In addition, in the present disclosure, the RSS port configuration information is information related to a relationship between at least one first antenna port through which the CRS is transmitted and at least one second antenna port through which the RSS is transmitted.

In addition, in the present disclosure, the at least one second antenna port is configured to be the same as a fixed one antenna port of the at least one first antenna port by the RSS port configuration information.

In addition, in the present disclosure, the at least one second antenna port is configured to be the same as fixed two antenna ports of the at least one first antenna port by the RSS port configuration information.

In addition, in the present disclosure, the RSS port configuration information includes sequence information related to a cyclic order of the at least one second antenna port, the at least one second antenna port is cycled in a time domain and/or a frequency domain according to the sequence information.

In addition, in the present disclosure, the cycled at least one second antenna port is the same as two or four antenna ports included in the at least one first antenna port.

In addition, in the present disclosure, a Quasi Co-Location (QCL) relationship is configured between the at least one first antenna port and the at least one second antenna port by the RSS port configuration information.

the measurement configuration information includes information on a ratio of power of the RSS to power of the CRS In addition, in the present disclosure, the measurement configuration information further includes at least one of RSS configuration information indicating whether RSS is supported, RSS transmission information related to a duration in which the RSS is transmitted, or RSS sequence information including information related to a cover code of the RSS.

In addition, the present disclosure further includes receiving, from the serving base station, system information including RSS-related information related to the RSS, where the RSS-related information includes at least one of transmission period information of the RSS, duration information of the RSS, or location information on a frequency domain/time domain of the RRS.

In addition, in the present disclosure, the RSS is in a first location on the frequency domain, the RRS transmitted by the serving base station is in a second location on the frequency domain, and a difference between an RB index (Resource Block Index) value of the first location and an RB index value of the second location does not exceed a certain value.

In addition, the present disclosure further includes obtaining the first location of the RSS based on the location information, where the first location is obtained by adding a specific value less than or equal to the certain value included in the location information to the RB index value of the second location.

In addition, the present disclosure further includes receiving, the serving base station, discontinuous reception (DRX) mode configuration information, where the configuration information is received in a listening duration of the DRX mode.

A terminal for performing measurement in a wireless communication system, the terminal includes a transmitter for transmitting a radio signal; a receiver for receiving a radio signal; and a processor functionally connected to the transmitter and the receiver, wherein the processor performs to: receive, from a serving base station, configuration information for measurement of a reference signal receive power (RSRP) and/or a reference signal received quality (RSRQ), wherein the configuration information includes port configuration information related to an antenna port through which a reference signal is transmitted, and measurement configuration information related to a relationship between a cell-specific reference signal (CRS) and a re-synchronization signal (RSS) for the measurement; receive, from a neighbor base station, the CRS and/or the RSS; calculate the RSRP and/or the RSRQ according to the configuration information using the CRS and the RSS; and report, to the serving base station, the RSRP and/or the RSRQ.

Technical Effects

The present disclosure has an effect of improving the measurement performance of a terminal in a wireless communication system.

In addition, the present disclosure has an effect of improving the mobility of a terminal in a wireless communication system.

In addition, the present disclosure has an effect that the terminal can use the resynchronization signal (RSS) for measurement in a wireless communication system.

In addition, the present disclosure has an effect of reducing signaling overhead for measurement of a terminal in a wireless communication system.

The technical effects of the present disclosure are not limited to the technical effects described above, and other technical effects not mentioned herein may be understood to those skilled in the art from the description below.

DESCRIPTION OF DRAWINGS

The accompanying drawings, which are included herein as a part of the description for help understanding the present disclosure, provide embodiments of the present disclosure, and describe the technical features of the present disclosure with the description below.

The accompanying drawings, which are included herein as a part of the description for help understanding the present disclosure, provide embodiments of the present disclosure, and describe the technical features of the present disclosure with the description below.

FIG. 20 is a diagram illustrating an example of scheduling for each of the MTC and legacy LTE.

FIG. 21 illustrates a general system for a system information acquisition procedure.

FIG. 22 illustrates a contention-based random access procedure.

FIG. 23 illustrates an example of a DRX scheme in an idle state and/or an inactive state.

FIG. 24 illustrates an example of a DRX configuration and indication procedure for an MTC terminal.

FIG. 25 illustrates an example of a DRX cycle.

FIG. 26 is a diagram illustrating an example of a method of determining an RSS port by performing port cycling within CRS ports.

FIG. 27 is a diagram illustrating an example in which a terminal performs measurement according to an MG configuration and an RSS configuration.

FIG. 28 is a diagram illustrating an example of a method of matching an MGP period to a period (or a minimum period of RSS) or an integer multiple of the period on an RSS configuration.

FIG. 29 is a diagram illustrating an example of a method of matching a period on an RSS (or RSS of the minimum period) configuration with a period of MGP #0 and/or MGP #2.

FIG. 30 illustrates an example of a method of matching the RSS cover code with a newly defined RSS duration.

FIG. 31 is a diagram illustrating an example of RSS frequency location parameter signaling without delta signaling.

FIG. 32 is a diagram illustrating an example of RSS frequency location parameter signaling using delta signaling.

FIG. 33 is a diagram illustrating an example of a case where there are a plurality of RSS frequency location candidate blocks capable of configuring RSS.

FIG. 34 is a diagram illustrating an example of a method of configuring an exact position of an RSS in a frequency domain in a state in which a plurality of blocks are configured to be carrier-specific.

FIG. 35 illustrates an example of an operation of a terminal in the present invention described above.

FIG. 36 is a diagram illustrating an example of an operation of a base station in the present disclosure as described above.

FIG. 37 illustrates a block diagram of a radio communication device according to an embodiment of the present disclosure.

FIG. 38 is another example of a block diagram of a radio communication device in which some embodiments of the present disclosure may be applied.

FIG. 39 illustrates an example of an autonomous vehicle to which the methods proposed in the present disclosure may be applied.

FIG. 40 illustrates an example of an XR device to which the methods proposed in the present disclosure may be applied.

BEST MODE FOR INVENTION

Figure 1:
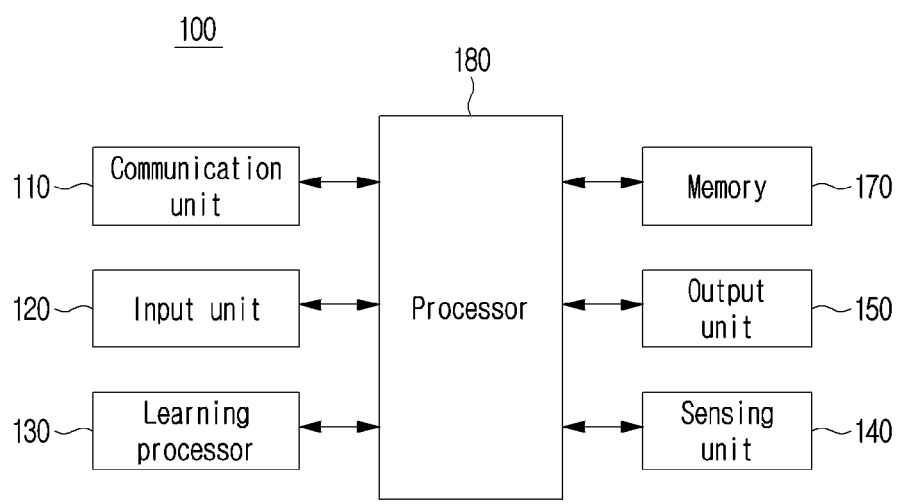
FIG. 1 illustrates an AI device 100 according to an embodiment of the present disclosure.

Some embodiments of the present disclosure are described in detail with reference to the accompanying drawings. A detailed description to be disclosed along with the accompanying drawings are intended to describe some exemplary embodiments of the present disclosure and are not intended to describe a sole embodiment of the present disclosure. The following detailed description includes more details in order to provide full understanding of the present disclosure. However, those skilled in the art will understand that the present disclosure may be implemented without such more details.

In some cases, in order to avoid that the concept of the present disclosure becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present disclosure, and the use of such specific terms may be changed in various forms without departing from the technical sprit of the present disclosure.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

<5G Scenario>

The three main requirements areas of 5G include (1) Enhanced Mobile Broadband (eMBB) area, (2) Massive Machine Type Communication (mMTC) area, and (3) Ultra-reliable and Low Latency Communications (URLLC) area.

In some use cases, multiple areas may be required for optimization, and other use cases may be focused on only one key performance indicator (KPI). 5G supports these various use cases in a flexible and reliable way.

eMBB goes far beyond basic mobile Internet access, covering rich interactive work, media and entertainment applications in the cloud or augmented reality. Data is one of the key drivers of 5G, and it may not be possible to see dedicated voice services for the first time in the 5G era. In 5G, voice is expected to be processed as an application program simply using the data connection provided by the communication system. The main reasons for the increased traffic volume are the increase in content size and the increase in the number of applications requiring high data rates. Streaming services (audio and video), interactive video and mobile Internet connections will become more widely used as more devices connect to the Internet. Many of these applications require always-on connectivity to push real-time information and notifications to the user. Cloud storage and applications are rapidly increasing in mobile communication platforms, which can be applied to both work and entertainment. And, cloud storage is a special use case that drives the growth of the uplink data rate. 5G is also used for remote work in the cloud and requires much lower end-to-end latency to maintain a good user experience when tactile interfaces are used. Entertainment, for example, cloud gaming and video streaming is another key factor that is increasing the demand for mobile broadband capabilities. Entertainment is essential on smartphones and tablets anywhere, including high mobility environments such as trains, cars and airplanes. Another use case is augmented reality and information retrieval for entertainment. Here, augmented reality requires very low latency and an instantaneous amount of data.

In addition, one of the most anticipated 5G use cases concerns the ability to seamlessly connect embedded sensors in all fields, i.e. mMTC. By 2020, potential IoT devices are expected to reach 20.4 billion. Industrial IoT is one of the areas where 5G plays a major role in enabling smart cities, asset tracking, smart utilities, agriculture and security infrastructure.

URLLC includes new services that will transform the industry with ultra-reliable/low-latency links such as self-driving vehicles and remote control of critical infrastructure. The level of reliability and delay is essential for smart grid control, industrial automation, robotics, drone control and coordination.

Next, look at a number of examples in more detail.

5G can complement fiber-to-the-home (FTTH) and cable-based broadband (or DOCSIS) as a means of providing streams rated at hundreds of megabits per second to gigabits per second. These high speeds are required to deliver TVs in 4K or higher (6K, 8K and higher) resolutions as well as virtual and augmented reality. Virtual Reality (VR) and Augmented Reality (AR) applications involve almost immersive sports events. Certain application programs may require special network settings. For example, for VR games, game companies may need to integrate the core server with the network operator's edge network server to minimize latency.

Automotive is expected to be an important new driving force in 5G, with many use cases for mobile communication to vehicles. For example, entertainment for passengers demands simultaneous high capacity and high mobility mobile broadband. The reason is that future users will continue to expect high-quality connections, regardless of their location and speed. Another application example in the automotive field is an augmented reality dashboard. It identifies an object in the dark on top of what the driver sees through the front window and displays information that tells the driver about the distance and movement of the object. In the future, wireless modules enable communication between vehicles, exchange of information between the vehicle and supporting infrastructure, and exchange of information between the vehicle and other connected devices (e.g., devices carried by pedestrians). The safety system can lower the risk of an accident by guiding the driver through alternative courses of action to make driving safer. The next step will be a remote controlled or self-driven vehicle. It is very reliable and requires very fast communication between different self-driving vehicles and between the vehicle and the infrastructure. In the future, self-driving vehicles will perform all driving activities, and drivers will be forced to focus only on traffic anomalies that the vehicle itself cannot identify. The technical requirements of self-driving vehicles call for ultra-low latency and ultra-fast reliability to increase traffic safety to levels unachievable by humans.

Smart cities and smart homes, referred to as smart society, will be embedded with high-density wireless sensor networks. A distributed network of intelligent sensors will identify the conditions for cost and energy-efficient maintenance of a city or home. A similar setup can be done for each household. Temperature sensors, window and heating controllers, burglar alarms and appliances are all wirelessly connected. Many of these sensors are typically low data rates, low power and low cost. However, for example, real-time HD video may be required in certain types of devices for surveillance.

The consumption and distribution of energy including heat or gas is highly decentralized, requiring automated control of distributed sensor networks. The smart grid interconnects these sensors using digital information and communication technologies to gather information and act accordingly. This information can include the behavior of suppliers and consumers, allowing smart grids to improve efficiency, reliability, economics, sustainability of production and the distribution of fuels such as electricity in an automated manner. The smart grid can also be viewed as another low-latency sensor network.

The health sector has many applications that can benefit from mobile communications. The communication system can support telemedicine providing clinical care from remote locations. This can help reduce barriers to distance and improve access to medical services that are not consistently available in remote rural areas. It is also used to save lives in critical care and emergencies. A wireless sensor network based on mobile communication may provide sensors and remote monitoring of parameters such as heart rate and blood pressure.

Wireless and mobile communications are becoming increasingly important in industrial applications. Wiring is expensive to install and maintain. Thus, the possibility of replacing cables with reconfigurable wireless links is an attractive opportunity for many industries. However, achieving this requires that the wireless connection operates with a delay, reliability and capacity similar to that of the cable, and its management is simplified. Low latency and very low error probability are new requirements that need to be connected to 5G.

Logistics and freight tracking are important examples of use for mobile communications that enable tracking of inventory and packages from anywhere using location-based information systems. Logistics and freight tracking use cases typically require low data rates, but require a wide range and reliable location information.

<Artificial Intelligence (AI)>

Artificial intelligence refers to the field of researching artificial intelligence or the methodology to create it, and machine learning refers to the field of researching methodologies to define and solve various problems dealt with in the field of artificial intelligence. do. Machine learning is also defined as an algorithm that improves the performance of a task through continuous experience.

An Artificial neural network (ANN) is a model used in machine learning, and may refer to an overall model with problem-solving ability, which is composed of artificial neurons (nodes) that form a network by combining synapses. The artificial neural network may be defined by a connection pattern between neurons of different layers, a learning process for updating model parameters, and an activation function for generating an output value.

The artificial neural network may include input layer, output layer, and optionally one or more hidden layers. Each layer includes one or more neurons, and the artificial neural network may include neurons and synapses connecting neurons. In an artificial neural network, each neuron can output a function value of an activation function for input signals, weights, and biases input through synapses.

Model parameters refer to parameters that are determined through learning, and include weights of synaptic connections and biases of neurons. In addition, the hyperparameter refers to a parameter that must be set before learning in a machine learning algorithm, and includes a learning rate, iteration count, mini-batch size, and initialization function.

The purpose of learning artificial neural networks can be as determining model parameters that minimize the loss function. The loss function can be used as an index for determining an optimal model parameter in the learning process of the artificial neural network.

Machine learning can be classified into supervised learning, unsupervised learning, and reinforcement learning according to the learning method.

Supervised learning refers to a method of training an artificial neural network when a label for training data is given, and a label may mean the correct answer (or result value) that the artificial neural network must infer when training data is input to the artificial neural network. Unsupervised learning may mean a method of training an artificial neural network in a state where a label for training data is not given. Reinforcement learning may mean a learning method in which an agent defined in a certain environment learns to select an action or action sequence that maximizes the cumulative reward in each state.

Among artificial neural networks, machine learning implemented as a deep neural network (DNN) including a plurality of Hidden Layers is sometimes referred to as deep learning, and deep learning is a part of machine learning. Hereinafter, machine learning is used in the sense including deep learning.

<Robot>

A robot may refer to a machine that automatically processes or operates a task given by its own capabilities. In particular, a robot having a function of recognizing the environment and performing an operation by self-determining may be referred to as an intelligent robot.

Robots can be classified into industrial, medical, household, military, etc. depending on the purpose or field of use.

The robot may be provided with a driving unit including an actuator or a motor to perform various physical operations such as moving a robot joint. In addition, the movable robot includes a wheel, a brake, a propeller, and the like in a driving unit, and can travel on the ground or fly in the air through the driving unit.

<Self-Driving, Autonomous-Driving>

Autonomous driving refers to self-driving technology, and autonomous driving vehicle refers to a vehicle that is driven without a user's manipulation or with a user's minimal manipulation.

For example, in autonomous driving, a technology that maintains a driving lane, a technology that automatically adjusts the speed such as adaptive cruise control, a technology that automatically drives along a specified route, and a technology that automatically sets a route when a destination is set, etc. All of these can be included.

The vehicle includes all vehicles including only an internal combustion engine, a hybrid vehicle including an internal combustion engine and an electric motor, and an electric vehicle including only an electric motor, and may include not only automobiles, but also trains and motorcycles.

In this case, the autonomous vehicle can be viewed as a robot having an autonomous driving function.

<Extended Reality (XR)>

The extended reality collectively refers to virtual reality (VR), augmented reality (AR), and mixed reality (MR). VR technology provides only CG images of real world objects or backgrounds, AR technology provides virtually created CG images on top of real object images, and MR technology is a computer graphic technology that mixes and combines virtual objects in the real world.

MR technology is similar to AR technology in that it shows real and virtual objects together. However, in AR technology, virtual objects are used in a form that complements real objects, whereas in MR technology, virtual objects and real objects are used with equal characteristics.

XR technology can be applied to HMD (Head-Mount Display), HUD (Head-Up Display), mobile phones, tablet PCs, laptops, desktops, TVs, digital signage, etc., and devices applied with XR technology may be called as XR devices.

FIG. 1 illustrates an AI device 100 according to an embodiment of the present disclosure.

The AI device 100 may be implemented as a fixed device or a movable device such as a TV, a projector, a mobile phone, a smartphone, a desktop computer, a laptop computer, a digital broadcasting terminal, a personal digital assistants (PDA), a portable multimedia player (PMP), a navigation, a tablet PC, a wearable device, a set-top box (STB), a DMB receiver, a radio, a washing machine, a refrigerator, a desktop computer, a digital signage, a robot, a vehicle, and the like.

Referring to FIG. 1, the terminal 100 may include a communication unit 110, an input unit 120, a learning processor 130, a sensing unit 140, an output unit 150, a memory 170, and a processor 180.

The communication unit 110 may transmit and receive data with external devices such as other AI devices 100a to 100e or the AI server 200 using wired/wireless communication technology. For example, the communication unit 110 may transmit and receive sensor information, a user input, a learning model, and a control signal with external devices.

Here, the communication technologies used by the communication unit 110 include Global System for Mobile communication (GSM), Code Division Multi Access (CDMA), Long Term Evolution (LTE), 5G, Wireless LAN (WLAN), and Wireless-Fidelity (Wi-Fi), Bluetooth™, Radio Frequency Identification (RFID), Infrared Data Association (IrDA), ZigBee, and Near Field Communication (NFC) and the like.

The input unit 120 may acquire various types of data.

Here, the input unit 120 may include a camera for inputting an image signal, a microphone for receiving an audio signal, and a user input unit for receiving information from a user. Here, by treating a camera or microphone as a sensor, a signal acquired from the camera or microphone may be referred to as sensing data or sensor information.

The input unit 120 may acquire input data to be used when acquiring an output by using training data for model training and the training model. The input unit 120 may obtain unprocessed input data, and in this case, the processor 180 or the learning processor 130 may extract an input feature as a pre-process for the input data.

The learning processor 130 may train a model composed of an artificial neural network using the training data. Here, the learned artificial neural network may be referred to as a learning model. The learning model can be used to infer a result value for new input data other than the training data, and the inferred value can be used as a basis for a decision to perform a certain operation.

In this case, the learning processor 130 may perform AI processing together with the learning processor 240 of the AI server 200.

Here, the learning processor 130 may include a memory integrated or implemented in the AI device 100. Alternatively, the learning processor 130 may be implemented using the memory 170, an external memory directly coupled to the AI device 100, or a memory maintained in an external device.

The sensing unit 140 may acquire at least one of internal information of the AI device 100, information on the surrounding environment of the AI device 100, and user information by using various sensors.

Here, the sensors included in the sensing unit 140 include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, and a lidar, a radar, etc.

The output unit 150 may generate output related to visual, auditory or tactile sense.

Here, the output unit 150 may include a display unit that outputs visual information, a speaker that outputs auditory information, and a haptic module that outputs tactile information.

The memory 170 may store data supporting various functions of the AI device 100. For example, the memory 170 may store input data, training data, a learning model, and a learning history acquired from the input unit 120.

The processor 180 may determine at least one executable operation of the AI device 100 based on information determined or generated using a data analysis algorithm or a machine learning algorithm. Further, the processor 180 may perform a determined operation by controlling the components of the AI device 100.

To this end, the processor 180 may request, search, receive, or utilize data from the learning processor 130 or the memory 170, and may control the components of the AI device 100 to perform a predicted or desirable operation among the at least one executable operation.

Here, if connection of an external device is required to perform the determined operation, the processor 180 may generate a control signal for controlling the corresponding external device and transmit the generated control signal to the corresponding external device.

The processor 180 may obtain intention information for a user input, and determine a user's requirement based on the obtained intention information.

Here, the processor 180 may obtain intention information corresponding to the user input by using at least one of a Speech To Text (STT) engine for converting a speech input into a character string or a Natural Language Processing (NLP) engine for obtaining intention information of a natural language.

Here, at least one or more of the STT engine and the NLP engine may be composed of an artificial neural network at least partially trained according to a machine learning algorithm. In addition, at least one of the STT engine or the NLP engine may be learned by the learning processor 130, learned by the learning processor 240 of the AI server 200, or learned by distributed processing thereof.

The processor 180 may collect history information including user feedback on the operation content or operation of the AI device 100, and store it in the memory 170 or the learning processor 130, or transfer to an external device such as the AI server 200. The collected historical information can be used to update the learning model.

The processor 180 may control at least some of the components of the AI device 100 to drive an application program stored in the memory 170. Further, the processor 180 may operate by combining two or more of the components included in the AI device 100 to drive the application program.

Figure 2:
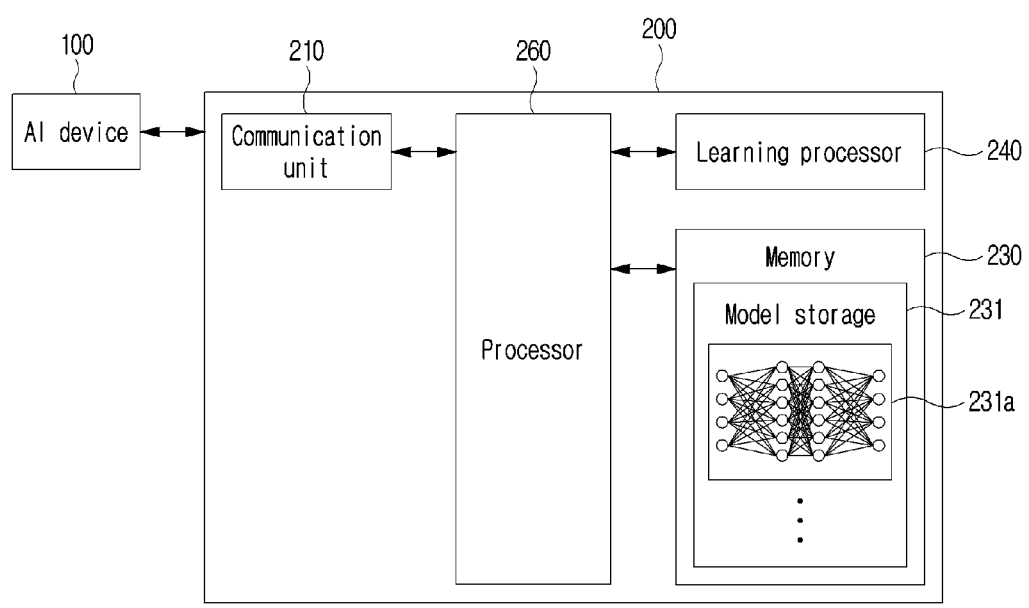
FIG. 2 illustrates an AI server 200 according to an embodiment of the present disclosure.

FIG. 2 illustrates an AI server 200 according to an embodiment of the present disclosure.

Referring to FIG. 2, the AI server 200 may refer to a device that trains an artificial neural network using a machine learning algorithm or uses the learned artificial neural network. Here, the AI server 200 may be composed of a plurality of servers to perform distributed processing, or may be defined as a 5G network. In this case, the AI server 200 may be included as a part of the AI device 100 to perform at least part of AI processing together.

The AI server 200 may include a communication unit 210, a memory 230, a learning processor 240, and a processor 260.

The communication unit 210 may transmit and receive data with an external device such as the AI device 100.

The memory 230 may include a model storage 231. The model storage 231 may store a model (or artificial neural network, 231a) being trained or trained through the learning processor 240.

The learning processor 240 may train the artificial neural network 231a using the training data. The learning model may be used while being mounted on the AI server 200 of an artificial neural network, or may be mounted on an external device such as the AI device 100 and used.

The learning model can be implemented in hardware, software, or a combination of hardware and software. When part or all of the learning model is implemented in software, one or more instructions constituting the learning model may be stored in the memory 230.

The processor 260 may infer a result value for new input data using the learning model, and generate a response or a control command based on the inferred result value.

Figure 3:
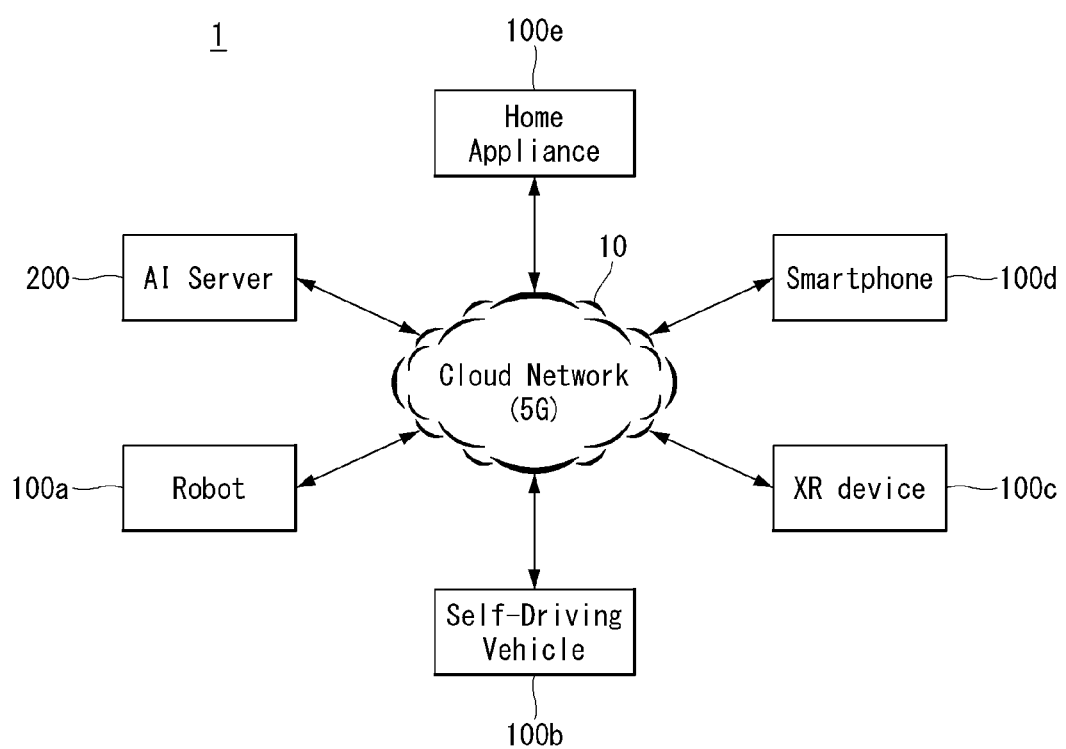
FIG. 3 illustrates an AI system 1 according to an embodiment of the present disclosure.

FIG. 3 illustrates an AI system 1 according to an embodiment of the present disclosure.

Referring to FIG. 3, the AI system 1 includes at least one of an AI server 200, a robot 100a, a self-driving (autonomous) vehicle 100b, an XR device 100c, a smartphone 100d, or a home appliance 100e. connected with the cloud network 10. Here, the robot 100a to which the AI technology is applied, the self-driving vehicle 100b, the XR device 100c, the smart phone 100d, or the home appliance 100e may be referred to as the AI devices 100a to 100e.

The cloud network 10 may constitute a part of the cloud computing infrastructure or may mean a network that exists in the cloud computing infrastructure. Here, the cloud network 10 may be configured using a 3G network, a 4G or long term evolution (LTE) network, or a 5G network.

That is, the devices 100a to 100e and 200 constituting the AI system 1 may be connected to each other through the cloud network 10. In particular, the devices 100a to 100e and 200 may communicate with each other through a base station, but may communicate with each other directly without through a base station.

The AI server 200 may include a server that performs AI processing and a server that performs an operation on big data.

The AI server 200 is connected through the cloud network 10 with at least one of the robot 100a, the self-driving vehicle 100b, the XR device 100c, the smartphone 100d, or a the home appliance 100e, which are AI devices constituting the AI system 1 and may help at least part of the AI processing of the connected AI devices 100a to 100e.

In this case, the AI server 200 may train an artificial neural network according to a machine learning algorithm in place of the AI devices 100a to 100e, and may directly store the learning model or transmit it to the AI devices 100a to 100e.

At this time, the AI server 200 may receive input data from the AI devices 100a to 100e, infer a result value for the received input data using a learning model, and generate a response or a control command based on the inferred result value, and transmit it to the AI devices 100a to 100e.

Alternatively, the AI devices 100a to 100e may infer a result value for input data using a direct learning model and generate a response or a control command based on the inferred result value.

Hereinafter, various embodiments of the AI devices 100a to 100e to which the above-described technology is applied will be described. Here, the AI devices 100a to 100e shown in FIG. 3 may be as a specific example of the AI device 100 shown in FIG. 1.

<AI+Robot>

The robot 100a is applied with AI technology and may be implemented as a guide robot, a transport robot, a cleaning robot, a wearable robot, an entertainment robot, a pet robot, an unmanned flying robot, and the like.

The robot 100a may include a robot control module for controlling an operation, and the robot control module may refer to a software module or a chip implementing the same as hardware.

The robot 100a may acquire status information of the robot 100a using sensor information obtained from various types of sensors, detect (recognizes) surrounding environments and objects, generate map data, decide a moving route and a driving plan, decide a response to user interaction, or decide an action.

Here, the robot 100a may use sensor information obtained from at least one sensor among a lidar, a radar, and a camera in order to determine the moving route and the driving plan.

The robot 100a may perform the above operations using a learning model composed of at least one artificial neural network. For example, the robot 100a may recognize a surrounding environment and an object using a learning model, and may determine an operation using the recognized surrounding environment information or object information. Here, the learning model may be directly learned by the robot 100a or learned by an external device such as the AI server 200.

Here, the robot 100a may perform an operation by generating a result using a direct learning model, but it may transmit sensor information to an external device such as the AI server 200 and perform the operation by receiving the result generated accordingly.

The robot 100a may determine the moving route and the driving plan using at least one of map data, object information detected from sensor information, or object information obtained from an external device, and may control the driving unit to drive the robot 100a according to the determined moving route and driving plan.

The map data may include object identification information on various objects arranged in a space in which the robot 100a moves. For example, the map data may include object identification information on fixed objects such as walls and doors and movable objects such as flower pots and desks. In addition, the object identification information may include a name, type, distance, and location.

In addition, the robot 100a may perform an operation or run by controlling a driving unit based on a user's control/interaction. In this case, the robot 100a may acquire interaction intention information according to a user's motion or voice speech, and determine a response based on the obtained intention information to perform the operation.

<AI+Autonomous Driving>

The self-driving (autonomous) vehicle 100b may be implemented as a mobile robot, vehicle, or unmanned aerial vehicle by applying AI technology.

The self-driving vehicle 100b may include an autonomous driving control module for controlling an autonomous driving function, and the autonomous driving control module may refer to a software module or a chip implementing the same as hardware. The autonomous driving control module may be included inside as a configuration of the self-driving vehicle 100b, but may be configured as separate hardware and connected to the exterior of the self-driving vehicle 100b.

The self-driving vehicle 100b may acquire status information of the self-driving vehicle 100b using sensor information obtained from various types of sensors, detect (recognizes) surrounding environments and objects, generate map data, decide a moving route and a driving plan, decide a response to user interaction, or decide an action.

Here, the self-driving vehicle 100b may use sensor information obtained from at least one sensor among a lidar, a radar, and a camera, similar to the robot 100a, in order to determine the moving route and the driving plan.

In particular, the self-driving vehicle 100b may recognize an environment or object in an area where the field of view is obscured or an area greater than a certain distance by receiving sensor information from external devices or directly recognized information from external devices.

The self-driving vehicle 100b may perform the above operations using a learning model composed of at least one artificial neural network. For example, the self-driving vehicle 100b may recognize a surrounding environment and an object using a learning model, and may determine a driving path using the recognized surrounding environment information or object information. Here, the learning model may be directly learned by the self-driving vehicle 100b or learned by an external device such as the AI server 200.

Here, the self-driving vehicle 100b may perform an operation by generating a result using a direct learning model, but it may transmit sensor information to an external device such as the AI server 200 and perform the operation by receiving the result generated accordingly.

The self-driving vehicle 100b may determine the moving route and the driving plan using at least one of map data, object information detected from sensor information, or object information obtained from an external device, and may control the driving unit to drive the self-driving vehicle 100*b* according to the determined moving route and driving plan.

The map data may include object identification information on various objects arranged in a space (e.g., road) in which the self-driving (autonomous) vehicle 100*b* moves. For example, the map data may include object identification information on fixed objects such as street lights, rocks, and buildings and movable objects such as vehicles and pedestrians. In addition, the object identification information may include a name, type, distance, and location.

In addition, the self-driving vehicle 100*b* may perform an operation or drive by controlling a driving unit based on a user's control/interaction. In this case, the self-driving vehicle 100*b* may acquire interaction intention information according to a user's motion or voice speech, and determine a response based on the obtained intention information to perform the operation.

<AI+XR>

The XR device 100*c* is applied with AI technology, and may be implemented as HMD (Head-Mount Display), HUD (Head-Up Display) provided in the vehicle, a TV, a mobile phone, a smart phone, a computer, a wearable device, a home appliance, a digital signage, a vehicle, a fixed robot or a mobile robot.

The XR device 100*c* may acquire information on a surrounding space or a real object by analyzing 3D point cloud data or image data acquired through various sensors or from an external device to generate location data and attribute data for 3D points, and may render the XR object to be displayed to output. For example, the XR apparatus 100*c* may output an XR object including additional information on the recognized object corresponding to the recognized object.

The XR apparatus 100*c* may perform the above operations using a learning model composed of at least one artificial neural network. For example, the XR device 100*c* may recognize a real object from 3D point cloud data or image data using a learning model, and may provide information corresponding to the recognized real object. Here, the learning model may be directly learned by the XR device 100*c* or learned by an external device such as the AI server 200.

At this time, the XR device 100*c* may directly generate a result using a learning model to perform an operation, but may also transmit sensor information to an external device such as the AI server 200 and receive the generated result to perform the operation.

<AI+Robot+Autonomous Driving>

The robot 100*a* may be implemented as a guide robot, a transport robot, a cleaning robot, a wearable robot, an entertainment robot, a pet robot, an unmanned flying robot, etc. by applying AI technology and autonomous driving technology.

The robot 100*a* to which AI technology and autonomous driving technology are applied may refer to a robot having an autonomous driving function or a robot 100*a* interacting with the self-driving vehicle 100*b*.

The robot 100*a* having an autonomous driving function may collectively refer to devices that move by themselves according to a given movement line without the user's control or by determining the movement line by themselves.

The robot 100*a* having an autonomous driving function and the self-driving vehicle 100*b* may use a common sensing method to determine one or more of a moving route or a driving plan. For example, the robot 100*a* having an autonomous driving function and the self-driving vehicle 100*b* may determine one or more of a movement route or a driving plan using information sensed through a lidar, a radar, and a camera.

The robot 100*a* interacting with the self-driving vehicle 100*b* exists separately from the self-driving vehicle 100*b* and may be linked to an autonomous driving function inside or outside the autonomous driving vehicle 100*b*, or may perform an operation associated with the user on board in the self-driving vehicle 100*b*.

Here, the robot 100*a* interacting with the self-driving vehicle 100*b* may control or assist the autonomous driving function of the self-driving vehicle 100*b* by acquiring sensor information on behalf of the self-driving (autonomous) vehicle 100*b* to provide it to the self-driving vehicle 100*b*, or acquiring sensor information and generating object information on the surrounding environment to provide it to the self-driving vehicle 100*b*.

Alternatively, the robot 100*a* interacting with the self-driving vehicle 100*b* may monitor a user in the self-driving vehicle 100*b* or control functions of the self-driving vehicle 100*b* through interaction with the user. For example, when it is determined that the driver is in a drowsy state, the robot 100*a* may activate an autonomous driving function of the self-driving vehicle 100*b* or assist in controlling the driving unit of the self-driving vehicle 100*b*. Here, the functions of the self-driving vehicle 100*b* controlled by the robot 100*a* may include not only an autonomous driving function, but also functions provided by a navigation system or an audio system provided inside the self-driving vehicle 100*b*.

Alternatively, the robot 100*a* interacting with the self-driving vehicle 100*b* may provide information or assist a function to the self-driving vehicle 100*b* from outside of the self-driving vehicle 100*b*. For example, the robot 100*a* may provide traffic information including signal information to the self-driving vehicle 100*b*, such as a smart traffic light, or automatically connect an electric charger to the charging port by interacting with the self-driving vehicle 100*b*, such as an automatic electric charger for an electric vehicle.

<AI+Robot+XR>

The robot 100*a* may be implemented as a guide robot, a transport robot, a cleaning robot, a wearable robot, an entertainment robot, a pet robot, an unmanned flying robot, a drone, etc. by applying AI technology and XR technology.

The robot 100*a* to which the XR technology is applied may refer to a robot to be controlled/interacted within an XR image. In this case, the robot 100*a* is distinguished from the XR device 100*c* and may be interacted with each other.

When the robot 100*a*, which is the object of control/interaction in the XR image, acquires sensor information from sensors including a camera, the robot 100*a* or the XR device 100*c* may generate an XR image based on the sensor information, and XR device 100*c* may output the generated XR image. In addition, the robot 100*a* may operate based on a control signal input through the XR device 100*c* or a user's interaction.

For example, the user may check the XR image corresponding to the viewpoint of the robot 100*a* linked remotely through an external device such as the XR device 100*c*, and may adjust the autonomous driving path of the robot 100*a* through the interaction, or control motion or driving, or check information on surrounding objects.

<AI+Autonomous Driving+XR>

The self-driving (autonomous) vehicle 100*b* may be implemented as a mobile robot, a vehicle, or an unmanned aerial vehicle by applying AI technology and XR technology.

The self-driving vehicle 100b to which the XR technology is applied may mean an autonomous driving vehicle including a means for providing an XR image, or an autonomous driving vehicle that is an object of control/interaction within the XR image. In particular, the self-driving vehicle 100b, which is an object of control/interaction in the XR image, is distinguished from the XR device 100c and may be interacted with each other.

The self-driving vehicle 100b having a means for providing an XR image may acquire sensor information from sensors including a camera, and may output an XR image generated based on the acquired sensor information. For example, the self-driving vehicle 100b may provide an XR object corresponding to a real object or an object in a screen to the occupant by outputting an XR image with a HUD.

In this case, when the XR object is output to the HUD, at least a part of the XR object may be output to overlap the actual object facing the occupant's gaze. On the other hand, when the XR object is output on a display provided inside the self-driving vehicle 100b, at least a part of the XR object may be output to overlap an object in the screen. For example, the self-driving vehicle 100b may output XR objects corresponding to objects such as lanes, other vehicles, traffic lights, traffic signs, motorcycles, pedestrians, and buildings.

When the self-driving vehicle 100b, which is an object of control/interaction in the XR image, acquires sensor information from sensors including a camera, the self-driving vehicle 100b or the XR device 100c may generate an XR image based on the sensor information, and output the generated XR image. In addition, the self-driving vehicle 100b may operate based on a control signal input through an external device such as the XR device 100c or a user's interaction.

General LTE System

Figure 4:
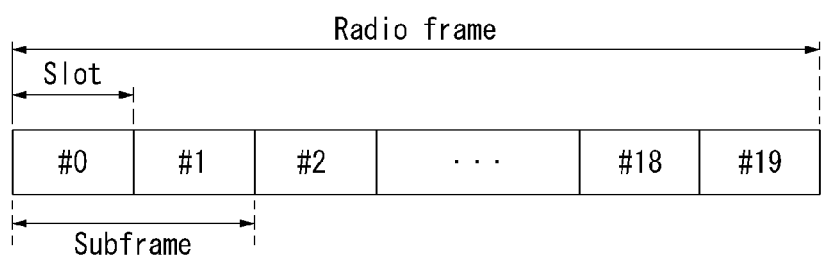
FIG. 4 is a diagram illustrating an example of the structure of a radio frame of LTE.

FIG. 4 is a diagram illustrating an example of the structure of a radio frame of LTE.

In FIG. 4, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in time domain. Since the 3GPP LTE uses the OFDMA in the downlink, the OFDM symbol is for representing one symbol period. The OFDM symbol may also be referred to as an SC-FDMA symbol or a symbol period. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

Figure 5:
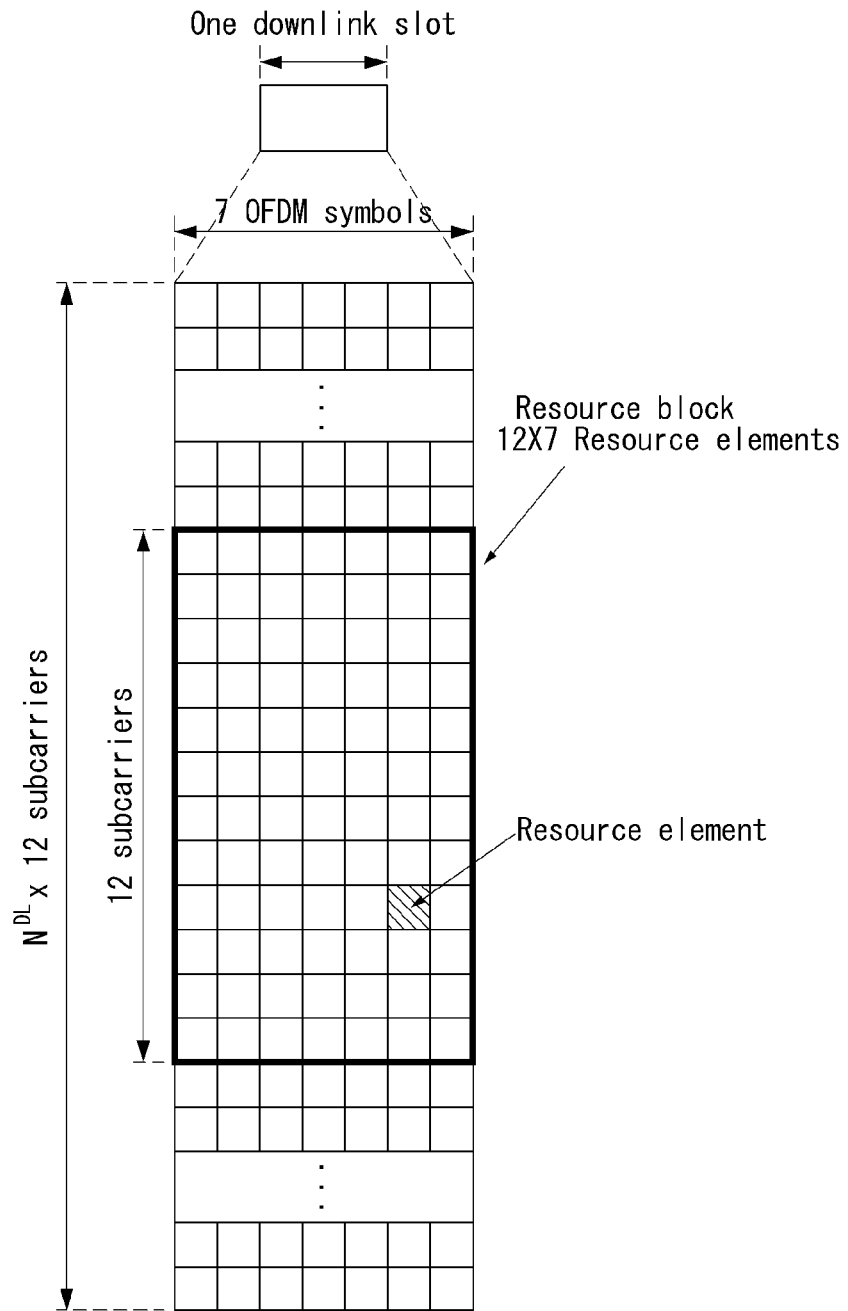
FIG. 5 is a diagram illustrating an example of a resource grid for downlink slot.

FIG. 5 is a diagram illustrating an example of a resource grid for downlink slot.

In FIG. 5, a downlink slot includes a plurality of OFDM symbols in time domain. It is described herein that one downlink slot includes 7 OFDM symbols, and one resource block (RB) includes 12 subcarriers in frequency domain as an example. However, the present disclosure is not limited thereto. Each element on the resource grid is referred to as a resource element (RE). One RB includes 12×7 REs. The number NDL of RBs included in the downlink slot depends on a downlink transmit bandwidth. The structure of an uplink slot may be same as that of the downlink slot.

Figure 6:
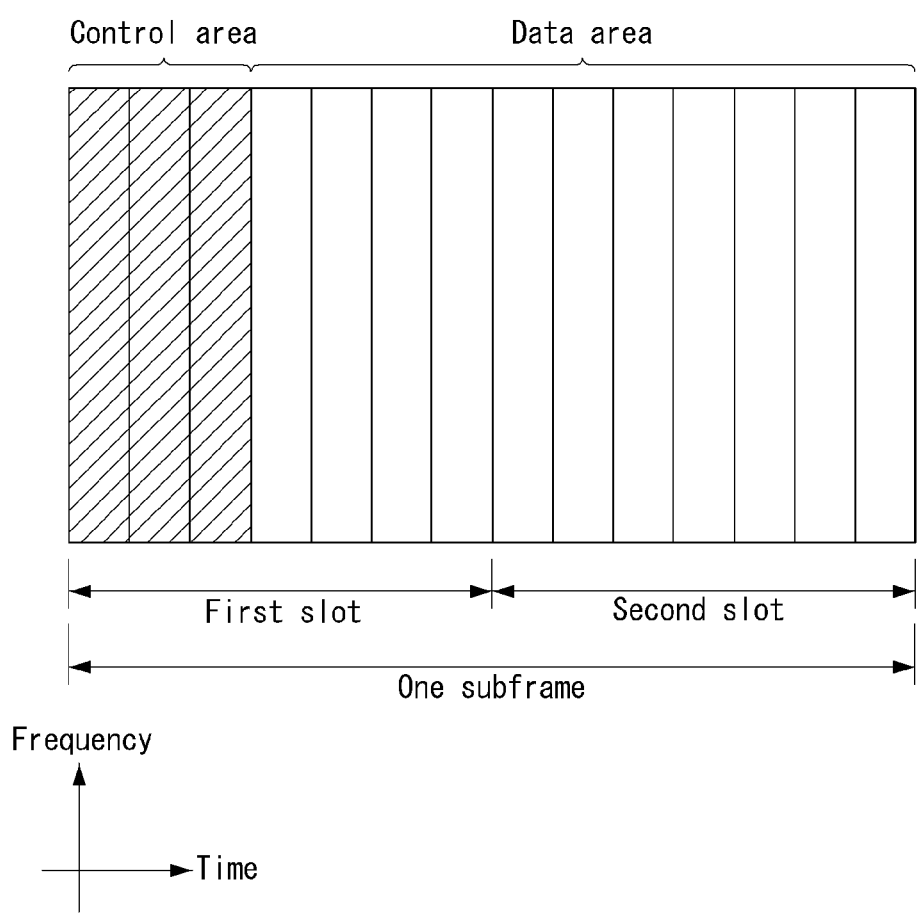
FIG. 6 is a diagram illustrating an example of the structure of downlink subframe.

FIG. 6 is a diagram illustrating an example of the structure of downlink subframe.

In FIG. 6, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of downlink control channels used in the 3GPP LTE includes a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or includes an uplink transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined according to a correlation between the number of CCEs and the coding rate provided by the CCEs. The BS determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 7:
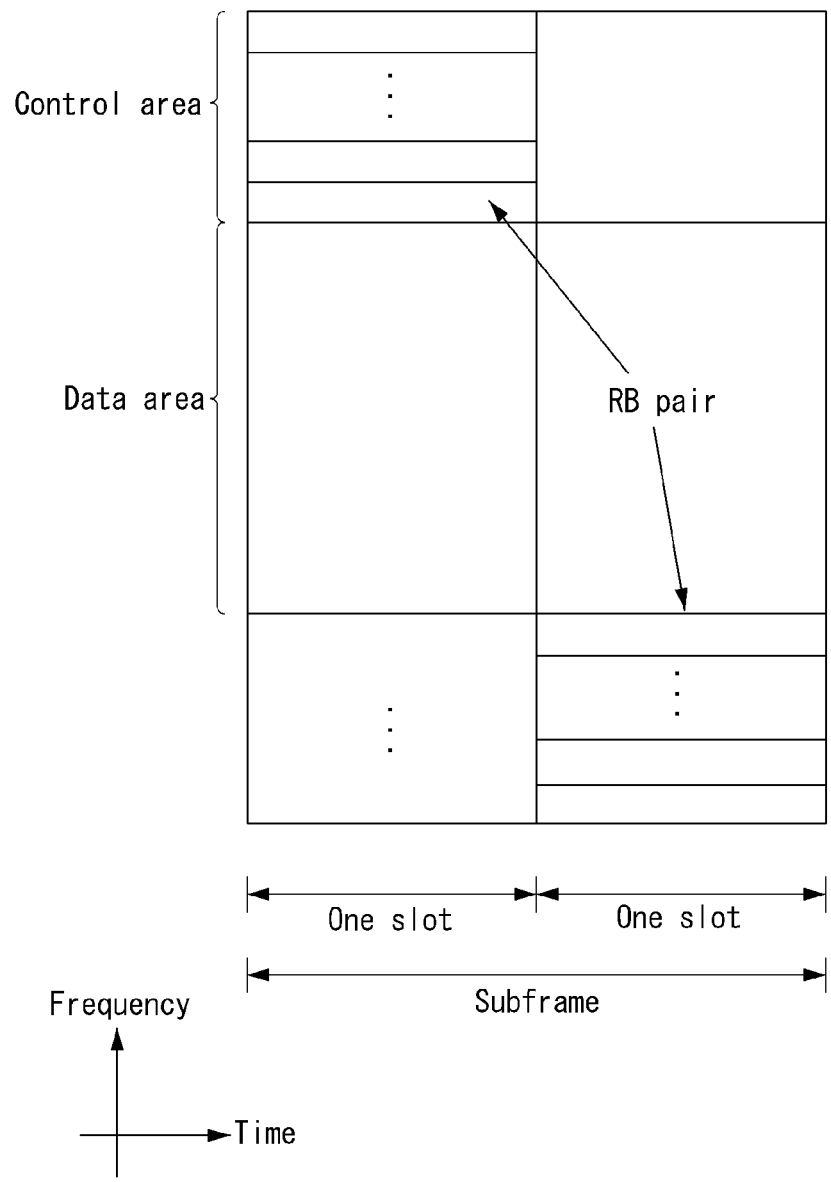
FIG. 7 is a diagram illustrating an example of the structure of uplink subframe.

FIG. 7 is a diagram illustrating an example of the structure of uplink subframe.

In FIG. 7, an uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. To maintain a single carrier property, one UE does not simultaneously transmit the PUCCH and the PUSCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Hereinafter, the LTE frame structure will be described in more detail.

Throughout LTE specification, unless otherwise noted, the size of various fields in the time domain is expressed as a number of time units $T_s=1/(15000 \times 2048)$ seconds.

Downlink and uplink transmissions are organized into radio frames with $T_f=307200 \times T_s=10$ ms duration. Two radio frame structures are supported:

Type 1, applicable to FDD
Type 2, applicable to TDD
Frame Structure Type 1

Frame structure type 1 is applicable to both full duplex and half duplex FDD. Each radio frame is $T_f=307200 \cdot T_s=10$ ms long and consists of 20 slots of length $T_{slot}=15360 \cdot T_s=0.5$ ms, numbered from 0 to 19. A subframe is defined as two consecutive slots where subframe i consists of slots 2i and 2i+1.

For FDD, 10 subframes are available for downlink transmission and 10 subframes are available for uplink transmissions in each 10 ms interval.

Uplink and downlink transmissions are separated in the frequency domain. In half-duplex FDD operation, the UE cannot transmit and receive at the same time while there are no such restrictions in full-duplex FDD.

Figure 8:
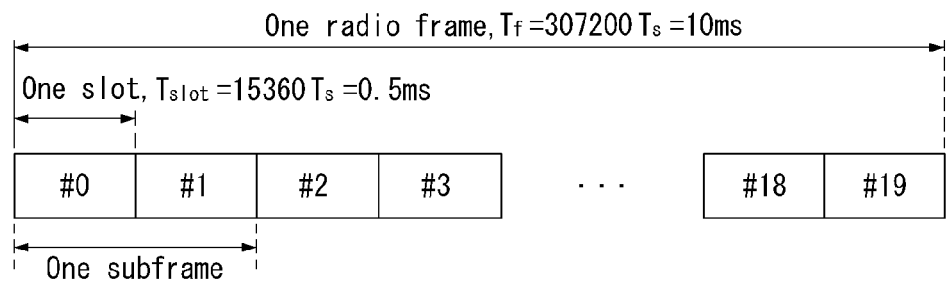
FIG. 8 illustrates an example of the frame structure type 1.

FIG. 8 illustrates an example of the frame structure type 1.

Frame Structure Type 2

Frame structure type 2 is applicable to FDD. Each radio frame of length $T_f=307200 \times T_s=10$ ms consists of two half-frames of length $15360 \cdot T_s=0.5$ ms each. Each half-frame consists of five subframes of length $30720 \cdot T_s=1$ ms. The supported uplink-downlink configurations are listed in Table 2 where, for each subframe in a radio frame, "D" denotes the subframe is reserved for downlink transmissions, "U" denotes the subframe is reserved for uplink transmissions and "S" denotes a special subframe with the three fields DwPTS, GP and UpPTS. The length of DwPTS and UpPTS is given by Table 1 subject to the total length of DwPTS, GP and UpPTS being equal to $30720 \cdot T_s=1$ ms. Each subframe i is defined as two slots, 2i and 2i+1 of length $T_{slot}=15360 \cdot T_s=0.5$ ms in each subframe.

Uplink-downlink configurations with both 5 ms and 10 ms downlink-to-uplink switch-point periodicity are supported. In case of 5 ms downlink-to-uplink switch-point periodicity, the special subframe exists in both half-frames. In case of 10 ms downlink-to-uplink switch-point periodicity, the special subframe exists in the first half-frame only. Subframes 0 and 5 and DwPTS are always reserved for downlink transmission. UpPTS and the subframe immediately following the special subframe are always reserved for uplink transmission.

Figure 9:
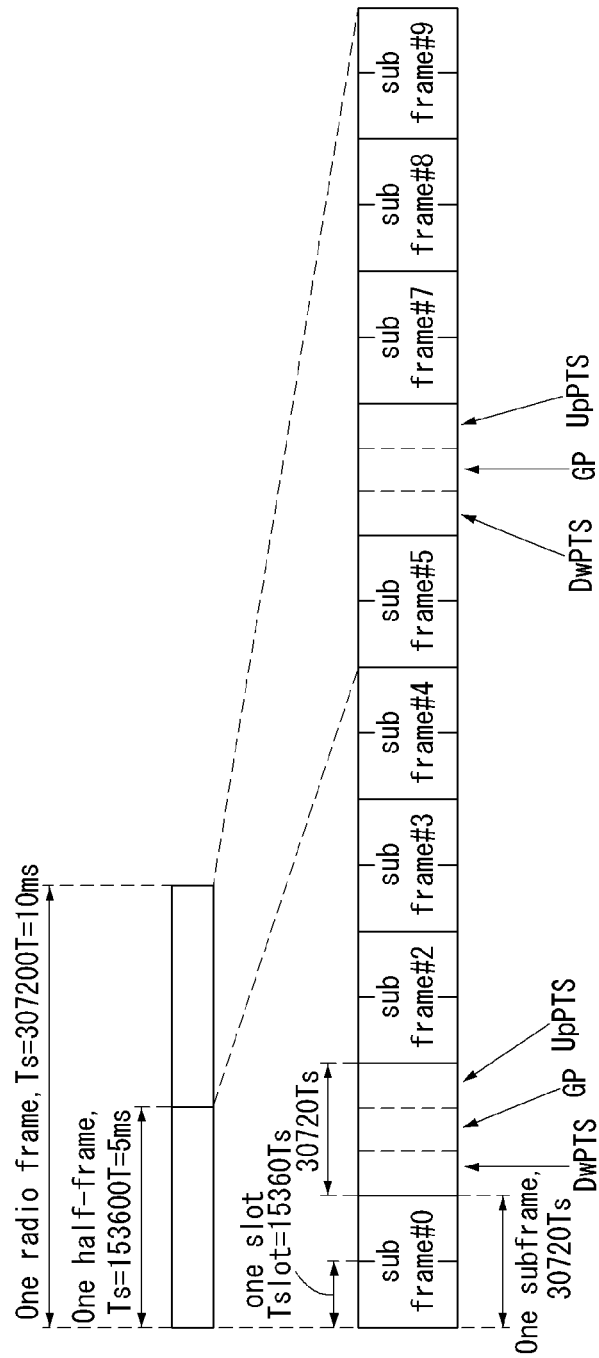
FIG. 9 is a diagram illustrating another example of the frame structure type 2.

FIG. 9 is a diagram illustrating another example of the frame structure type 2.

Table 1 shows an example of a configuration of a special subframe.

TABLE 1

| Special subframe configuration | normal cyclic prefix in downlink | | | extended cyclic prefix in downlink | | |
|---|---|---|---|---|---|---|
| | | UpPTS | | | UpPTS | |
| | DwPTS | normal cyclic prefix in uplink | extended cyclic prefix in uplink | DwPTS | normal cyclic prefix in uplink | extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Table 2 shows an example of an uplink-downlink configuration.

TABLE 2

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

<NB-IoT>

NB-IoT (narrowband-internet of things) is a standard for supporting low complexity and low cost devices and is defined to perform only relatively simple operations compared to existing LTE devices. NB-IoT follows the basic structure of LTE, but operates based on the contents defined below. If the NB-IoT reuses an LTE channel or signal, it may follow the standard defined in the existing LTE.

Uplink

The following narrowband physical channels are defined:
NPUSCH (Narrowband Physical Uplink Shared Channel)
NPRACH (Narrowband Physical Random Access Channel)

The following uplink narrowband physical signals are defined:
Narrowband demodulation reference signal The uplink bandwidth in terms of subcarriers $N_{sc}^{UL}$, and the slot duration $T_{slot}$ are given in Table 3.

Table 3 shows an example of NB-IoT parameters.

TABLE 3

| Subcarrier spacing | $N_{sc}^{UL}$ | $T_{slot}$ |
|---|---|---|
| $\Delta f$ = 3.75 kHz | 48 | 61440 · $T_s$ |
| $\Delta f$ = 15 kHz | 12 | 15360 · $T_s$ |

A single antenna port p=0 is used for all uplink transmissions.

Resource Unit

Resource units are used to describe the mapping of the NPUSCH to resource elements. A resource unit is defined as $N_{symb}^{UL}N_{slots}^{UL}$ consecutive SC-FDMA symbols in the time domain and $N_{sc}^{RU}$ consecutive subcarriers in the frequency domain, where $N_{sc}^{RU}$ and $N_{symb}^{UL}$ are given by Table 4.

Table 4 shows an example of supported combinations of $N_{sc}^{RU}$, $N_{slots}^{UL}$ and $N_{symb}^{UL}$.

TABLE 4

| NPUSCH format | $\Delta f$ | $N_{sc}^{RU}$ | $N_{slots}^{UL}$ | $N_{symb}^{UL}$ |
|---|---|---|---|---|
| 1 | 3.75 kHz | 1 | 16 | 7 |
|   |          | 1 | 16 |   |
|   | 15 kHz   | 3 | 8  |   |
|   |          | 6 | 4  |   |
|   |          | 12| 2  |   |
| 2 | 3.75 kHz | 1 | 4  |   |
|   | 15 kHz   | 1 | 4  |   |

Narrowband Uplink Shared Channel (NPUSCH)

The narrowband physical uplink shared channel supports two formats:

NPUSCH format 1, used to carry the UL-SCH

NPUSCH format 2, used to carry uplink control information

Scrambling shall be done according to clause 5.3.1 of TS36.211. The scrambling sequence generator shall be initialized with $c_{init}=n_{RNTI} \cdot 2^{14}+n_f \mod 2 \cdot 2^{13}+\lfloor n_s/2 \rfloor+N_{ID}^{cell}$ where $n_s$ is the first slot of the transmission of the codeword. In case of NPUSCH repetitions, the scrambling sequence shall be reinitialized according to the above formula after every $M_{identical}^{NPUSCH}$ transmission of the codeword with $n_s$ and $n_f$ set to the first slot and the frame, respectively, used for the transmission of the repetition. The quantity $M_{identical}^{NPUSCH}$ is given by clause 10.1.3.6 in TS36.211.

Table 5 specifies the modulation mappings applicable for the narrowband physical uplink shared channel.

TABLE 5

| NPUSCH format | $N_{sc}^{RU}$ | Modulation scheme |
|---|---|---|
| 1 | 1 | BPSK, QPSK |
|   | >1 | QPSK |
| 2 | 1 | BPSK |

NPUSCH can be mapped to one or more than one resource units, $N_{RU}$, as given by clause 16.5.1.2 of 3GPP TS 36.213, each of which shall be transmitted $M_{rep}^{NPUSCH}$ times.

The block of complex-valued symbols z(0), . . . , z($M_{rep}^{NPUSCH}-1$) shall be multiplied with the amplitude scaling factor $\beta_{NPUSCH}$ in order to conform to the transmit power $P_{NPUSCH}$ specified in 3GPP TS 36.213, and mapped in sequence starting with z(0) to subcarriers assigned for transmission of NPUSCH. The mapping to resource elements (k,l) corresponding to the subcarriers assigned for transmission and not used for transmission of reference signals, shall be in increasing order of first the index k, then the index l, starting with the first slot in the assigned resource unit.

After mapping to $N_{slots}$ slots, the $N_{slots}$ slots shall be repeated $M_{identical}^{NPUSCH}-1$ additional times, before continuing the mapping of z(•) to the following slot, where Equation 1, $$M_{identical}^{NPUSCH} = \begin{cases} \min([M_{rep}^{NPUSCH}/2], 4) & N_{sc}^{RU} > 1 \\ 1 & N_{sc}^{RU} = 1 \end{cases}$$ [Equation 1]

$$N_{slots} = \begin{cases} 1 & \Delta f = 3.75 \text{ kHz} \\ 2 & \Delta f = 15 \text{ kHz} \end{cases}$$

If a mapping to $N_{slots}$ slots or a repetition of the mapping contains a resource element which overlaps with any configured NPRACH resource according to NPRACH-ConfigSIB-NB, the NPUSCH transmission in overlapped $N_{slots}$ slots is postponed until the next $N_{slots}$ slots not overlapping with any configured NPRACH resource.

The mapping of z(0), . . . , z($M_{rep}^{NPUSCH}-1$) is then repeated until $M_{rep}^{NPUSCH}N_{RU}N_{slots}^{UL}$ slots have been transmitted. After transmissions and/or postponements due to NPRACH of 256·30720$T_s$ time units, a gap of 40·30720$T_s$ time units shall be inserted where the NPUSCH transmission is postponed. The portion of a postponement due to NPRACH which coincides with a gap is counted as part of the gap.

When higher layer parameter npusch-AllSymbols is set to false, resource elements in SC-FDMA symbols overlapping with a symbol configured with SRS according to srs-SubframeConfig shall be counted in the NPUSCH mapping but not used for transmission of the NPUSCH. When higher layer parameter npusch-AllSymbols is set to true, all symbols are transmitted.

Uplink Control Information on NPUSCH without UL-SCH Data

The one bit information of HARQ-ACK $o_0^{ACK}$ is coded according to Table 6, where for a positive acknowledgement $o_0^{ACK}=1$ and for a negative acknowledgement $o_0^{ACK}=0$.

Table 6 shows an example of HARQ-ACK code words.

TABLE 6

| HARQ-ACK $<o_0^{ACK}>$ | HARQ-ACK $<b_0, b_1, b_2, \ldots, b_{15}>$ |
|---|---|
| 0 | <0, 0, 0, 0, 0, 0, 0, 0, 0, 0, 0, 0, 0, 0, 0, 0> |
| 1 | <1, 1, 1, 1, 1, 1, 1, 1, 1, 1, 1, 1, 1, 1, 1, 1> |

Power Control

The UE transmit power for NPUSCH transmission in NB-IoT UL slot i for the serving cell is given by Equation 2 and 3 below.

If the number of repetitions of the allocated NPUSCH RUs is greater than 2, $$P_{NPUSCH,c}(i)=P_{CMAX,c}(i) \text{ [dBm]}$$ [Equation 2]

Otherwise, $$P_{NPUSCH,c}(i) = \min\begin{cases} P_{CMAX,c}(i), \\ 10\log_{10}(M_{NPUSCH,c}(i)) + P_{O\_NPUSCH,c}(j) + \alpha_c(j) \cdot PL_c \end{cases}[dBM]$$

[Equation 3]

where, $P_{CMAX,c}(i)$ is the configured UE transmit power defined in 3GPP TS36.101 in NB-IoT UL slot i for serving cell c.

$M_{NPUSCH,c}$ is $\{1/4\}$ for 3.75 kHz subcarrier spacing and $\{1, 3, 6, 12\}$ for 15 kHz subcarrier spacing $P_{O\_NPUSCH,c}(j)$ is a parameter composed of the sum of a component $P_{O\_NOMINAL\_NPUSCH,c}(j)$ provided from higher layers and a component $P_{O\_UE\_NPUSCH,c}(j)$ provided by higher layers for j=1 and for serving cell c where j∈{1,2}. For NPUSCH (re)transmissions corresponding to a dynamic scheduled grant then j=1 and for NPUSCH (re)transmissions corresponding to the random access response grant then j=2.

$P_{O\_UE\_NPUSCH,c}(2)=0$ and $P_{O\_NORMINAL\_NPUSCH,c}(2)=P_{O\_PRE}+\Delta_{PREAMBLE\_Msg3}$, where the parameter preamble-InitialReceivedTargetPower $P_{O\_PRE}$ and $\Delta_{PREAMBLE\_Msg3}$ are signalled from higher layers for serving cell c.

For j=1, for NPUSCH format 2, $\alpha_c(j)=1$; for NPUSCH format 1, $\alpha_c(j)$ is provided by higher layers for serving cell c. For j=2, $\alpha_c(j)=1$.

$PL_c$ is the downlink path loss estimate calculated in the UE for serving cell c in dB and $PL_c$=nrs-Power+nrs-PowerOffsetNonAnchor−higher layer filtered NRSRP, where nrs-Power is provided by higher layers and Subclause 16.2.2 in 3GPP 36.213, and nrs-powerOffsetNonAnchor is set to zero if it is not provided by higher layers and NRSRP is defined in 3GPP TS 36.214 for serving cell c and the higher layer filter configuration is defined in 3GPP TS 36.331 for serving cell c.

If the UE transmits NPUSCH in NB-IoT UL slot i for serving cell c, power headroom is computed using Equation 4 below.

$$PH_c(i)=P_{CMAX,c}(i)-\{P_{O\_NPUSCH,c}(1)+\alpha_c(1)\cdot PL_c\} [dB]$$

[Equation 4]

UE Procedure for Transmitting Format 1 NPUSCH

A UE shall upon detection on a given serving cell of a NPDCCH with DCI format N0 ending in NB-IoT DL subframe n intended for the UE, perform, at the end of n+k₀ DL subframe, a corresponding NPUSCH transmission using NPUSCH format 1 in N consecutive NB-IoT UL slots $n_i$ with i=0, 1, . . . , N−1 according to the NPDCCH information where subframe n is the last subframe in which the NPDCCH is transmitted and is determined from the starting subframe of NPDCCH transmission and the DCI subframe repetition number field in the corresponding DCI; and $N=N_{Rep}N_{RU}N_{slots}^{UL}$, where the value of $N_{Rep}$ is determined by the repetition number field in the corresponding DCI, the value of $N_{RU}$ is determined by the resource assignment field in the corresponding DCI, and the value of $N_{slots}^{UL}$ is the number of NB-IoT UL slots of the resource unit corresponding to the allocated number of subcarriers in the corresponding DCI, $n_0$ is the first NB-IoT UL slot starting after the end of subframe n+k₀ value of $k_0$ is determined by the scheduling delay field ($I_{Delay}$) in the corresponding DCI according to Table 7.

Table 7 shows an example of k0 for DCI format N0.

TABLE 7

| $I_{Delay}$ | $k_0$ |
|---|---|
| 0 | 8 |
| 1 | 16 |
| 2 | 32 |
| 3 | 64 |

The resource allocation information in uplink DCI format N0 for NPUSCH transmission indicates to a scheduled UE
- a set of contiguously allocated subcarriers ($n_{sc}$) of a resource unit determined by the Subcarrier indication field in the corresponding DCI,
- a number of resource units ($N_{RU}$) determined by the resource assignment field in the corresponding DCI according to Table 9,
- a repetition number ($N_{Rep}$) determined by the repetition number field in the corresponding DCI according to Table 10.

The subcarrier spacing Δf of NPUSCH transmission is determined by the uplink subcarrier spacing field in the Narrowband Random Access Response Grant according to Subclause 16.3.3 in 3GPP TS36.213.

For NPUSCH transmission with subcarrier spacing Δf=3.75 kHz, $n_{sc}=I_{sc}$ where $I_{sc}$ is the subcarrier indication field in the DCI.

For NPUSCH transmission with subcarrier spacing Δf=15 kHz, the subcarrier indication field ($I_{sc}$) in the DCI determines the set of contiguously allocated subcarriers ($n_{sc}$) according to Table 8.

Table 8 shows an example of subcarriers allocated to the NPUSCH having Δf=15 kHz.

TABLE 8

| Subcarrier indication field ($I_{sc}$) | Set of Allocated subcarriers ($n_{sc}$) |
|---|---|
| 0-11 | $I_{sc}$ |
| 12-15 | 3($I_{sc}$ − 12) + {0, 1, 2} |
| 16-17 | 6($I_{sc}$ − 16) + {0, 1, 2, 3, 4, 5} |
| 18 | {0, 1, 2, 3, 4, 5, 6, 7, 8, 9, 10, 11} |
| 19-63 | Reserved |

Table 9 shows an example of the number of resource units for NPUSCH.

TABLE 9

| $I_{RU}$ | $N_{RU}$ |
|---|---|
| 0 | 1 |
| 1 | 2 |
| 2 | 3 |
| 3 | 4 |
| 4 | 5 |
| 5 | 6 |
| 6 | 8 |
| 7 | 10 |

Table 10 shows an example of the number of repetitions for NPUSCH.

TABLE 10

| $I_{Rep}$ | $N_{Rep}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |

Demodulation Reference Signal (DMRS)

The reference signal sequence $\bar{r}_u(n)$ for $N_{sc}^{RU}=1$ is defined by Equation 5 below.

$$\bar{r}_u(n) = \frac{1}{\sqrt{2}}(1+j)(1-2c(n))w(n \bmod 16),$$
$$0 \leq n < M_{rep}^{NPUSCH} N_{RU} N_{slots}^{UL}$$

[Equation 5]

Where the binary sequence c(n) is defined by clause 7.2 of TS36.211 and shall be initialized with $c_{init}=35$ at the start of the NPUSCH transmission. The quantity w(n) is given by Tables 1-11 where $u=N_{ID}^{cell} \bmod 16$ for NPUSCH format 2, and for NPUSCH format 1 if group hopping is not enabled, and by clause 10.1.4.1.3 of 3GPP TS36.211 if group hopping is enabled for NPUSCH format 1.

Table 11 shows an example of w(n).

TABLE 11

| u | w(0), . . . , w(15) |
|---|---|
| 0 | 1  1  1  1  1  1  1  1  1  1  1  1  1  1  1  1 |
| 1 | 1 -1  1 -1  1 -1  1 -1  1 -1  1 -1  1 -1  1 -1 |
| 2 | 1  1 -1 -1  1  1 -1 -1  1  1 -1 -1  1  1 -1 -1 |
| 3 | 1 -1 -1  1  1 -1 -1  1  1 -1 -1  1  1 -1 -1  1 |
| 4 | 1  1  1  1 -1 -1 -1 -1  1  1  1  1 -1 -1 -1 -1 |
| 5 | 1 -1  1 -1 -1  1 -1  1  1 -1  1 -1 -1  1 -1  1 |
| 6 | 1  1 -1 -1 -1 -1  1  1  1  1 -1 -1 -1 -1  1  1 |
| 7 | 1 -1 -1  1 -1  1  1 -1  1 -1 -1  1 -1  1  1 -1 |
| 8 | 1  1  1  1  1  1  1  1 -1 -1 -1 -1 -1 -1 -1 -1 |
| 9 | 1 -1  1 -1  1 -1  1 -1 -1  1 -1  1 -1  1 -1  1 |
| 10 | 1  1 -1 -1  1  1 -1 -1 -1 -1  1  1 -1 -1  1  1 |
| 11 | 1 -1 -1  1  1 -1 -1  1 -1  1  1 -1 -1  1  1 -1 |
| 12 | 1  1  1  1 -1 -1 -1 -1 -1 -1 -1 -1  1  1  1  1 |
| 13 | 1 -1  1 -1 -1  1 -1  1 -1  1 -1  1  1 -1  1 -1 |
| 14 | 1  1 -1 -1 -1 -1  1  1 -1 -1  1  1  1  1 -1 -1 |
| 15 | 1 -1 -1  1 -1  1  1 -1 -1  1  1 -1  1 -1 -1  1 |

The reference signal sequence for NPUSCH format 1 is given by Equation 6 below.

$$r_u(n) = \bar{r}_u(n)$$

[Equation 6]

The reference signal sequence for NPUSCH format 2 is given by Equation 7 below.

$$r_u(3n+m) = \bar{w}(m)\bar{r}_u(n), m=0,1,2$$

[Equation 7]

where $\bar{w}(m)$ is defined in Table 5.5.2.2.1-2 of 3GPP TS36.211 with the sequence index chosen according to $$\left(\sum_{i=0}^{7} c(8n_s + i)2^i\right) \bmod 3$$

with $c_{init}=N_{ID}^{Ncell}$.

The reference signal sequences $r_u(n)$ for $N_{sc}^{RU}>1$ is defined by a cyclic shift α of a base sequence according to Equation 8 below.

$$r_u(n) = e^{j\alpha n} e^{j\phi(n)\pi/4}, 0 \leq n < N_{sc}^{RU}$$

[Equation 8]

where φ(n) is given by Table 10.1.4.1.2-1 for $N_{sc}^{RU}=3$, Table 12 for $N_{sc}^{RU}=6$ and Table 13 for $N_{sc}^{RU}=12$.

If group hopping is not enabled, the base sequence index u is given by higher layer parameters threeTone-BaseSequence, sixTone-BaseSequence, and twelveTone-BaseSequence for $N_{sc}^{RU}=3$, $N_{sc}^{RU}=6$, and $N_{sc}^{RU}=12$, respectively. If not signalled by higher layers, the base sequence is given by Equation 9 below.

$$u = \begin{cases} N_{ID}^{Ncell} \bmod 12 & \text{for } N_{sc}^{RU} = 3 \\ N_{ID}^{Ncell} \bmod 14 & \text{for } N_{sc}^{RU} = 6 \\ N_{ID}^{Ncell} \bmod 30 & \text{for } N_{sc}^{RU} = 12 \end{cases}$$

[Equation 9]

If group hopping is enabled, the base sequence index u is given by clause 10.1.4.1.3 of 3GPP TS36.211.

The cyclic shift α for $N_{sc}^{RU}=3$ and $N_{sc}^{RU}=6$ is derived from higher layer parameters threeTone-CyclicShift and sixTone-CyclicShift, respectively, as defined in Table 14. For $N_{sc}^{RU}=12$, α=0.

Table 12 shows an example of φ(n) for $N_{sc}^{RU}=3$

TABLE 12

| u | φ(0), φ(1), φ(2) |  |  |
|---|---|---|---|
| 0 | 1 | -3 | -3 |
| 1 | 1 | -3 | -1 |
| 2 | 1 | -3 | 3 |
| 3 | 1 | -1 | -1 |
| 4 | 1 | -1 | 1 |
| 5 | 1 | -1 | 3 |
| 6 | 1 | 1 | -3 |
| 7 | 1 | 1 | -1 |
| 8 | 1 | 1 | 3 |

TABLE 12-continued

| u | φ(0), φ(1), φ(2) | | |
|---|---|---|---|
| 9 | 1 | 3 | −1 |
| 10 | 1 | 3 | 1 |
| 11 | 1 | 3 | 3 |

Table 13 shows another example of φ(n) for $N_{sc}^{RU}=6$

TABLE 13

| u | φ(0), . . . , φ(5) | | | | | |
|---|---|---|---|---|---|---|
| 0 | 1 | 1 | 1 | 1 | 3 | −3 |
| 1 | 1 | 1 | 3 | 1 | −3 | 3 |
| 2 | 1 | −1 | −1 | −1 | 1 | −3 |
| 3 | 1 | −1 | 3 | −3 | −1 | −1 |
| 4 | 1 | 3 | 1 | −1 | −1 | 3 |
| 5 | 1 | −3 | −3 | 1 | 3 | 1 |
| 6 | −1 | −1 | 1 | −3 | −3 | −1 |
| 7 | −1 | −1 | −1 | 3 | −3 | −1 |
| 8 | 3 | −1 | 1 | −3 | −3 | 3 |
| 9 | 3 | −1 | 3 | −3 | −1 | 1 |
| 10 | 3 | −3 | 3 | −1 | 3 | 3 |
| 11 | −3 | 1 | 3 | 1 | −3 | −1 |
| 12 | −3 | 1 | −3 | 3 | −3 | −1 |
| 13 | −3 | 3 | −3 | 1 | 1 | −3 |

Table 14 shows an example of α

TABLE 14

| $N_{sc}^{RU}=3$ | | $N_{sc}^{RU}=6$ | |
|---|---|---|---|
| threeTone-CyclicShift | α | sixTone-CyclicShift | α |
| 0 | 0 | 0 | 0 |
| 1 | 2π/3 | 1 | 2π/6 |
| 2 | 4π/3 | 2 | 4π/6 |
| | | 3 | 8π/6 |

For the reference signal for NPUSCH format 1, sequence-group hopping can be enabled where the sequence-group number u in slot $n_s$ is defined by a group hopping pattern $f_{gh}(n_s)$ and a sequence-shift pattern $f_{ss}$ according to Equation 10 below.

$$u=(f_{gh}(n_s)+f_{ss}) \bmod N_{seq}^{RU} \quad \text{[Equation 10]}$$

where the number of reference signal sequences available for each resource unit size, $N_{seq}^{RU}$ is given by Table 15.

Table 15 shows an example of $N_{seq}^{RU}$

TABLE 15

| $N_{sc}^{RU}$ | $N_{seq}^{RU}$ |
|---|---|
| 1 | 16 |
| 3 | 12 |
| 6 | 14 |
| 12 | 30 |

Sequence-group hopping can be enabled or disabled by means of the cell-specific parameter groupHoppingEnabled provided by higher layers. Sequence-group hopping for NPUSCH can be disabled for a certain UE through the higher-layer parameter groupHoppingDisabled despite being enabled on a cell basis unless the NPUSCH transmission corresponds to a Random Access Response Grant or a retransmission of the same transport block as part of the contention based random access procedure.

The group hopping pattern $f_{gh}(n_s)$ is given by Equation 11 below.

$$f_{gh}(n_s) = \left(\sum_{i=0}^{7} c(8n'_s + i) \cdot 2^i\right) \bmod N_{seq}^{RU} \quad \text{[Equation 11]}$$

where $n'_s=n_s$ for $N_{sc}^{RU}>1$ and $n_s'$ is the slot number of the first slot of the resource unit for $N_{sc}^{RU}=1$. The pseudo-random sequence c(i) is defined by clause 7.2. The pseudo-random sequence generator shall be initialized with $$c_{init} = \left\lfloor \frac{N_{ID}^{Ncell}}{N_{seq}^{RU}} \right\rfloor$$

at the beginning of the resource unit for $N_{sc}^{RU}=1$ and in every even slot for $N_{sc}^{RU}>1$.

The sequence-shift pattern $f_{ss}$ is given by Equation 12 below.

$$f_{ss}=(N_{ID}^{Ncell}+\Delta_{ss}) \bmod N_{seq}^{RU} \quad \text{[Equation 12]}$$

where $\Delta_{ss} \in \{0, 1, \ldots, 29\}$ is given by higher-layer parameter groupAssignmentNPUSCH. If no value is signalled, $\Delta_{ss}=0$.

The sequence r(•) shall be multiplied with the amplitude scaling factor $\beta_{NPUSCH}$ and mapped in sequence starting with r(0) to the sub-carriers.

The set of sub-carriers used in the mapping process shall be identical to the corresponding NPUSCH transmission as defined in clause 10.1.3.6 in 3GPP 36.211.

The mapping to resource elements (k,l) shall be in increasing order of first k, then l, and finally the slot number. The values of the symbol index l in a slot are given in Table 16.

Table 16 shows an example of demodulation reference signal location for NPUSCH

TABLE 16

| NPUSCH format | Values for l | |
|---|---|---|
| | Δf = 3.75 kHz | Δf = 15 kHz |
| 1 | 4 | 3 |
| 2 | 0, 1, 2 | 2, 3, 4 |

SF-FDMA Baseband Signal Generation

For $N_{sc}^{RU}>1$, the time-continuous signal $s_l(t)$ in SC-FDMA symbol l in a slot is defined by clause 5.6 with the quantity $N_{RB}^{UL}N_{sc}^{RB}$ replaced by $N_{sc}^{UL}$.

For $N_{sc}^{RU}=1$, the time-continuous signal $s_{k,l}(t)$ for sub-carrier index k in SC-FDMA symbol l in an uplink slot is defined by Equation 13 below $$s_{k,l}(t) = a_{k^{(-)},l} \cdot e^{j\tilde{\varphi}_{k,l}} \cdot e^{j2\pi(k+1/2)\Delta f(t-N_{CP,l}T_s)} \quad \text{[Equation 13]}$$

$$k^{(-)} = k + \lfloor N_{sc}^{UL}/2 \rfloor$$

For $0 \le t < (N_{CP,l}+N)T_s$ where parameters for Δf=15 kHz and of Δf=3.75 kHz are given in Table 17, $a_{k^{(-)},l}$ is the modulation value of symbol l and the phase rotation $\tilde{\varphi}_{k,l}$ is defined by Equation 14 below.

$$\varphi_{k,l} = \rho(\tilde{l} \bmod 2) + \hat{\varphi}_k(\tilde{l})$$ [Equation 14]

$$\rho = \begin{cases} \frac{\pi}{2} & \text{for } BPSK \\ \frac{\pi}{4} & \text{for } QPSK \end{cases}$$

$$\hat{\varphi}_k(\tilde{l}) = \begin{cases} 0 & \tilde{l} = 0 \\ \hat{\varphi}_k(\tilde{l}-1) + 2\pi\Delta f(k+1/2)(N+N_{CP,l})T_s & \tilde{l} > 0 \end{cases}$$

$$\tilde{l} = 0, 1, \ldots, M_{rep}^{NPUSCH} N_{RU} N_{slots}^{UL} N_{symb}^{UL} - 1$$

$$l = \tilde{l} \bmod N_{symb}^{UL}$$

where $\tilde{l}$ is a symbol counter that is reset at the start of a transmission and incremented for each symbol during the transmission.

Table 17 shows an example of SC-FDMA parameters for $N_{sc}^{RU}=1$.

TABLE 17

| Parameter | $\Delta f = 3.75$ kHz | $\Delta f = 15$ kHz |
|---|---|---|
| N | 8192 | 2048 |
| Cyclic prefix length $N_{CP,l}$ | 256 | 160 for l = 0 |
| | | 144 for l = 1, 2, ..., 6 |
| Set of values for k | −24, −23, ..., 23 | −6, −5, ..., 5 |

The SC-FDMA symbols in a slot shall be transmitted in increasing order of l, starting with l=0, where SC-FDMA symbol l>0 starts at time $$\sum_{l'=0}^{l-1} (N_{CP,l'} + N)T_s$$

within the slot. For, $\Delta f=3.75$ kHz, the remaining $2304T_s$ in $T_{slot}$ are not transmitted and used for guard period.

Narrowband Physical Random Access Channel (NPRACH)

The physical layer random access preamble is based on single-subcarrier frequency-hopping symbol groups. A symbol group is illustrated in FIGS. 1-8 Random access symbol group, consisting of a cyclic prefix of length $T_{CP}$ and a sequence of 5 identical symbols with total length $T_{SEQ}$. The parameter values are listed in Table 18.

Figure 10:
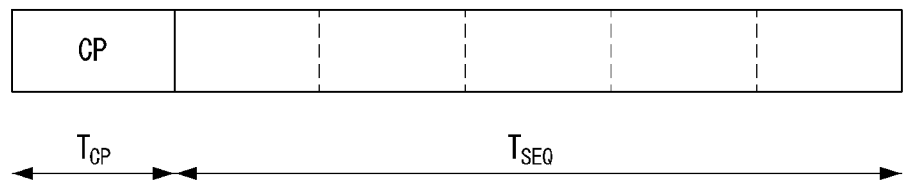
FIG. 10 illustrates an example of the random access symbol group.

FIG. 10 illustrates an example of the random access symbol group.

Table 18 shows an example of Random access preamble parameters.

TABLE 18

| Preamble format | $T_{CP}$ | $T_{SEQ}$ |
|---|---|---|
| 0 | $2048T_s$ | $5 \cdot 8192T_s$ |
| 1 | $8192T_s$ | $5 \cdot 8192T_s$ |

The preamble consisting of 4 symbol groups transmitted without gaps shall be transmitted $N_{rep}^{NPRACH}$ times.

The transmission of a random access preamble, if triggered by the MAC layer, is restricted to certain time and frequency resources.

A NPRACH configuration provided by higher layers contains the following:

NPRACH resource periodicity $N_{period}^{NPRACH}$ (nprach-Periodicity), frequency location of the first subcarrier allocated to NPRACH $N_{scoffset}^{NPRACH}$ (nprach-SubcarrierOffset), number of subcarriers allocated to NPRACH $N_{sc}^{NPRACH}$ (nprach-NumSubcarriers), number of starting sub-carriers allocated to contention based NPRACH random access $N_{sc\_cont}^{NPRACH}$ (nprach-NumCBRA-StartSubcarriers), number of NPRACH repetitions per attempt $n_{rep}^{NPRACH}$ (numRepetitionsPerPreambleAttempt), NPRACH starting time $N_{start}^{NPRACH}$ (nprach-StartTime), Fraction for calculating starting subcarrier index for the range of NPRACH subcarriers reserved for indication of UE support for multi-tone msg3 transmission $N_{MSG3}^{NPRACH}$ (nprach-SubcarrierMSG3-Range Start).

NPRACH transmission can start only $N_{start}^{NPRACH} \cdot 30720T_s$ time units after the start of a radio frame fulfilling $n_f \bmod(N_{period}^{NPRACH}/10)=0$. After transmissions of $4 \cdot 64(T_{CP}+T_{SEQ})$ time units, a gap of $40 \cdot 30720T_s$ time units shall be inserted.

NPRACH configurations where $N_{scoffset}^{NPRACH} + N_{sc}^{NPRACH} > N_{sc}^{UL}$ are invalid.

The NPRACH starting subcarriers allocated to contention based random access are split in two sets of subcarriers, $\{0, 1, \ldots, N_{sc\_cont}^{NPRACH} N_{MSG3}^{NPRACH}-1\}$ and $\{N_{sc\_cont}^{NPRACH} N_{MSG3}^{NPRACH}, \ldots, N_{sc_{cont}}^{NPRACH}-1\}$, where the second set, if present, indicate UE support for multi-tone msg3 transmission.

The frequency location of the NPRACH transmission is constrained within $N_{sc}^{RA}=12$ sub-carriers. Frequency hopping shall be used within the 12 subcarriers, where the frequency location of the $i^{th}$ symbol group is given by $n_{sc}^{RA}(i)=n_{start}+\tilde{n}_{sc}^{RA}(i)$ where $n_{start}=N_{scoffset}^{NPRACH}+\lfloor n_{init}/N_{sc}^{RA} \rfloor \cdot N_{sc}^{RA}$ and Equation 15,

[Equation 15]

$$\tilde{n}_{sc}^{RA}(i) =$$

$$\begin{cases} (\tilde{n}_{sc}^{RA}(0) + f(i/4)) \bmod N_{sc}^{RA} & i \bmod 4 = 0 \text{ and } i > 0 \\ \tilde{n}_{sc}^{RA}(i-1) + 1 & i \bmod 4 = 1,3 \text{ and } \tilde{n}_{sc}^{RA}(i-1) \bmod 2 = 0 \\ \tilde{n}_{sc}^{RA}(i-1) - 1 & i \bmod 4 = 1,3 \text{ and } \tilde{n}_{sc}^{RA}(i-1) \bmod 2 = 1 \\ \tilde{n}_{sc}^{RA}(i-1) + 6 & i \bmod 4 = 2 \text{ and } \tilde{n}_{sc}^{RA}(i-1) < 6 \\ \tilde{n}_{sc}^{RA}(i-1) - 6 & i \bmod 4 = 2 \text{ and } \tilde{n}_{sc}^{RA}(i-1) \geq 6 \end{cases}$$

$$f(t) = \left( f(t-1) + \left( \sum_{n=10t+1}^{10t+9} c(n)2^{n-(10t+1)} \right) \bmod (N_{sc}^{RA} - 1) + 1 \right) \bmod N_{sc}^{RA}$$

$$f(-1) = 0$$

where $\tilde{n}_{sc}^{RA}(0) = n_{init}$ mod $N_{sc}^{RA}$ with $n_{init}$ being the subcarrier selected by the MAC layer from $\{0, 1, \ldots, N_{sc}^{NPRACH}-1\}$, and the pseudo random sequence c(n) is given by clause 7.2 of 3GPP TS36.211. The pseudo random sequence generator shall be initialised with $c_{init}=N_{ID}^{Ncell}$.

The time-continuous random access signal $s_i(t)$ for symbol group i is defined by Equation 16 below.

$$s_i(t) = \beta_{NPRACH} e^{j2\pi(\tilde{n}_{SC}^{RA}(i)+Kk_0+1/2)\Delta f_{RA}(t-T_{CP})} \quad [\text{Equation 16}]$$

Where $0 \leq t < T_{SEQ}+T_{CP}$, $\beta_{NPRACH}$ is an amplitude scaling factor in order to conform to the transmit power $P_{NPRACH}$ specified in clause 16.3.1 in 3GPP TS 36.213, $k_0=-N_{sc}^{UL}/2$, $K=\Delta f/\Delta f_{RA}$ accounts for the difference in subcarrier spacing between the random access preamble and uplink data transmission, and the location in the frequency domain controlled by the parameter $n_{sc}^{RA}(i)$ is derived from clause 10.1.6.1 of 3GPP TS36.211. The variable $\Delta f_{RA}$ is given by Table 19 below.

Table 19 shows an example of random access baseband parameters.

TABLE 19

| Preamble format | $\Delta f_{RA}$ |
|---|---|
| 0, 1 | 3.75 kHz |

Downlink

A downlink narrowband physical channel corresponds to a set of resource elements carrying information originating from higher layers and is the interface defined between 3GPP TS 36.212 and 3GPP TS 36.211.

The following downlink physical channels are defined:
NPDSCH (Narrowband Physical Downlink Shared Channel)
NPBCH (Narrowband Physical Broadcast Channel)
NPDCCH (Narrowband Physical Downlink Control Channel)

A downlink narrowband physical signal corresponds to a set of resource elements used by the physical layer but does not carry information originating from higher layers. The following downlink physical signals are defined:
NRS (Narrowband reference signal)
Narrowband synchronization signal
Narrowband physical downlink shared channel (NPDSCH)=

The scrambling sequence generator shall be initialized with $c_{init}=n_{RNTI} \cdot 2^{14}+n_f$ mod $2 \cdot 2^{13}+\lfloor n_s/2 \rfloor+N_{ID}^{Ncell}$ where $n_s$ is the first slot of the transmission of the codeword. In case of NPDSCH repetitions and the NPDSCH carrying the BCCH, the scrambling sequence generator shall be reinitialized according to the expression above for each repetition. In case of NPDSCH repetitions and the NPDSCH is not carrying the BCCH, the scrambling sequence generator shall be reinitialized according to the expression above after every min $(M_{rep}^{NPDSCH},4)$ transmission of the codeword with $n_s$ and $n_f$ set to the first slot and the frame, respectively, used for the transmission of the repetition.

Modulation should be done using QPSK modulation scheme.

NPDSCH can be mapped to one or more than one subframes, $N_{SF}$, as given by clause 16.4.1.5 of 3GPP TS 36.213, each of which shall be transmitted NPDSCH $M_{rep}^{NPDSCH}$ times.

For each of the antenna ports used for transmission of the physical channel, the block of complex-valued symbols $y^{(p)}(0), \ldots y^{(p)}(M_{symb}^{ap}-1)$ shall be mapped to resource elements (k,l) which meet all of the following criteria in the current subframe:

the subframe is not used for transmission of NPBCH, NPSS, or NSSS, and
they are assumed by the UE not to be used for NRS, and
they are not overlapping with resource elements used for CRS (if any), and
the index l in the first slot in a subframe fulfils $l \geq l_{DataStart}$ where $l_{DataStart}$ is given by clause 16.4.1.4 of 3GPP TS 36.213.

The mapping of $y^{(p)}(0), \ldots y^{(p)}(M_{symb}^{ap}-1)$ in sequence starting with $y^{(p)}(0)$ to resource elements (k,l) on antenna port p meeting the criteria above shall be increasing order of the first the index k and the index l, starting with the first slot and ending with the second slot in a subframe. For NPDSCH not carrying BCCH, after mapping to a subframe, the subframe shall be repeated for $M_{rep}^{NPDSCH}-1$ additional subframes, before continuing the mapping of $y^{(p)}(\cdot)$ to the following subframe. The mapping of $y^{(p)}(0), \ldots y^{(p)}(M_{symb}^{ap}-1)$ is then repeated until $M_{rep}^{NPDSCH}N_{SF}$ subframes have been transmitted. For NPDSCH carrying BCCH, the $y^{(p)}(0), \ldots y^{(p)}(M_{symb}^{ap}-1)$ is mapped to $N_{SF}$ subframes in sequence and then repeated until $M_{rep}^{NPDSCH}N_{SF}$ subframes have been transmitted.

The NPDSCH transmission can be configured by higher layers with transmission gaps where the NPSDCH transmission is postponed. There are no gaps in the NPDSCH transmission if $R_{max} < N_{gap,threshold}$ where $N_{gap,threshold}$ is given by the higher layer parameter dl-GapThreshold and $R_{max}$ is given by 3GPP TS 36.213. The gap starting frame and subframe is given by $(10n_f + \lfloor n_s/2 \rfloor)$ mod $N_{gap,period}=0$ where the gap periodicity, $N_{gap,period}$, is given by the higher layer parameter dl-GapPeriodicity. The gap duration in number of subframes is given by $N_{gap,duration}=N_{gap,coeff} \cdot N_{gap,period}$, where $N_{gap,coeff}$ is given by the higher layer parameter dl-GapDurationCoeff. For NPDSCH carrying the BCCH there are no gaps in the transmission.

The UE shall not expect NPDSCH in subframe i if it is not a NB-IoT downlink subframe, except for transmissions of NPDSCH carrying SystemInformationBlockType1-NB in subframe 4. In case of NPDSCH transmissions, in subframes that are not NB-IoT downlink subframes, the NPDSCH transmission is postponed until the next NB-IoT downlink subframe.

UE procedure for receiving the NPDSCH
A NB-IoT UE shall assume a subframe as a NB-IoT DL subframe if
the UE determines that the subframe does not contain NPSS/NSSS/NPBCH/NB-SIB1 transmission, and
for a NB-IoT carrier that a UE receives higher layer parameter operationModeInfo, the subframe is configured as NB-IoT DL subframe after the UE has obtained SystemInformationBlockType1-NB.
for a NB-IoT carrier that DL-CarrierConfigCommon-NB is present, the subframe is configured as NB-IoT DL subframe by the higher layer parameter downlinkBitmapNonAnchor.

For a NB-IoT UE that supports twoHARQ-Processes-r14, there shall be a maximum of 2 downlink HARQ processes.

A UE shall upon detection on a given serving cell of a NPDCCH with DCI format N1, N2 ending in subframe n intended for the UE, decode, starting in n+5 DL subframe, the corresponding NPDSCH transmission in N consecutive NB-IoT DL subframe(s) $n_i$ with i=0, 1, ..., N−1 according to the NPDCCH information, where subframe n is the last subframe in which the NPDCCH is transmitted and is determined from the starting subframe of NPDCCH transmission and the DCI subframe repetition number field in the corresponding DCI;

subframe(s) ni with i=0, 1, ..., N−1 are N consecutive NB-IoT DL subframe(s) excluding subframes used for SI messages where, n0<n1< ..., nN−1, $N=N_{Rep}N_{SF}$, where the value of $N_{Rep}$ is determined by the repetition number field in the corresponding DCI, and the value of $N_{SF}$ is determined by the resource assignment field in the corresponding DCI, and $k_0$ is the number of NB-IoT DL subframe(s) starting in DL subframe n+5 until DL subframe $n_0$, where $k_0$ is determined by the scheduling delay field ($I_{Delay}$) for DCI format N1, and $k_0=0$ for DCI format N2. For DCI CRC scrambled by G-RNTI, $k_0$ is determined by the scheduling delay field ($I_{Delay}$) according to Table 21, otherwise $k_0$ is determined by the scheduling delay field ($I_{Delay}$) according to Table 20. The value of $R_{m,ax}$ is according to Subclause 16.6 in 3GPP 36.213 for the corresponding DCI format N1.

Table 20 shows an example of k0 for DCI format N1.

TABLE 20

| $I_{Delay}$ | $k_0$ | |
| --- | --- | --- |
| | $R_{max} < 128$ | $R_{max} \geq 128$ |
| 0 | 0 | 0 |
| 1 | 4 | 16 |
| 2 | 8 | 32 |
| 3 | 12 | 64 |
| 4 | 16 | 128 |
| 5 | 32 | 256 |
| 6 | 64 | 512 |
| 7 | 128 | 1024 |

Table 21 shows an example of k_0 for DCI format N1 with DCI CRC scrambled by G-RNTI.

TABLE 21

| $I_{Delay}$ | $k_0$ |
| --- | --- |
| 0 | 0 |
| 1 | 4 |
| 2 | 8 |
| 3 | 12 |
| 4 | 16 |
| 5 | 32 |
| 6 | 64 |
| 7 | 128 |

A UE is not expected to receive transmissions in 3 DL subframes following the end of a NPUSCH transmission by the UE.

The resource allocation information in DCI format N1, N2 (paging) for NPDSCH indicates to a scheduled UE Table 22 shows an example of the number of subframes for NPDSCH. A number of subframes ($N_{SF}$) determined by the resource assignment field ($I_{SF}$) in the corresponding DCI according to Table 22.

A repetition number ($N_{Rep}$) determined by the repetition number field ($I_{Rep}$) in the corresponding DCI according to Table 23.

TABLE 22

| $I_{SF}$ | $N_{SF}$ |
| --- | --- |
| 0 | 1 |
| 1 | 2 |
| 2 | 3 |
| 3 | 4 |
| 4 | 5 |
| 5 | 6 |
| 6 | 8 |
| 7 | 10 |

Table 23 shows an example of the number of repetitions for NPDSCH.

TABLE 23

| $I_{Rep}$ | $N_{Rep}$ |
| --- | --- |
| 0 | 1 |
| 1 | 2 |
| 2 | 4 |
| 3 | 8 |
| 4 | 16 |
| 5 | 32 |
| 6 | 64 |
| 7 | 128 |
| 8 | 192 |
| 9 | 256 |
| 10 | 384 |
| 11 | 512 |
| 12 | 768 |
| 13 | 1024 |
| 14 | 1536 |
| 15 | 2048 |

The number of repetitions for the NPDSCH carrying SystemInformationBlockType1-NB is determined based on the parameter schedulingInfoSIB1 configured by higher-layers and according to Table 24.

Table 24 shows an example of the number of repetitions for SIB1-NB.

TABLE 24

| Value of schedulingInfoSIB1 | Number of NPDSCH repetitions |
| --- | --- |
| 0 | 4 |
| 1 | 8 |
| 2 | 16 |
| 3 | 4 |
| 4 | 8 |
| 5 | 16 |
| 6 | 4 |
| 7 | 8 |
| 8 | 16 |
| 9 | 4 |
| 10 | 8 |
| 11 | 16 |
| 12-15 | Reserved |

The starting radio frame for the first transmission of the NPDSCH carrying SystemInformationBlockType1-NB is determined according to Table 25.

Table 25 shows an example of a start radio frame for the first transmission of the NPDSCH carrying SIB1-NB.

TABLE 25

| Number of NPDSCH repetitions | $N_{ID}^{Ncell}$ | Starting radio frame number for NB-SIB1 repetitions (nf mod 256) |
|---|---|---|
| 4 | $N_{ID}^{Ncell}$ mod 4 = 0 | 0 |
|   | $N_{ID}^{Ncell}$ mod 4 = 1 | 16 |
|   | $N_{ID}^{Ncell}$ mod 4 = 2 | 32 |
|   | $N_{ID}^{Ncell}$ mod 4 = 3 | 48 |
| 8 | $N_{ID}^{Ncell}$ mod 2 = 0 | 0 |
|   | $N_{ID}^{Ncell}$ mod 2 = 1 | 16 |
| 16 | $N_{ID}^{Ncell}$ mod 2 = 0 | 0 |
|   | $N_{ID}^{Ncell}$ mod 2 = 1 | 1 |

The starting OFDM symbol for NPDSCH is given by index $l_{DataStrart}$ in the first slot in a subframe k and is determined as follows if subframe k is a subframe used for receiving SIB1-NB, $l_{DataStrart}=3$ if the value of the higher layer parameter operationModeInfo is set to '00' or '01'

$l_{DataStrart}=0$ otherwise else $l_{DataStrart}$ is given by the higher layer parameter eutra-ControlRegionSize if the value of the higher layer parameter eutraControlRegionSize is present $l_{DataStrart}=0$ otherwise UE Procedure for Reporting ACK/NACK The UE shall upon detection of a NPDSCH transmission ending in NB-IoT subframe n intended for the UE and for which an ACK/NACK shall be provided, start, at the end of $n+k_0-1$ DL subframe transmission of the NPUSCH carrying ACK/NACK response using NPUSCH format 2 in N consecutive NB-IoT UL slots, where $N=N_{Rep}^{AN} N_{slots}^{UL}$, where the value of $N_{Rep}^{AN}$ is given by the higher layer parameter ack-NACK-NumRepetitions-Msg4 configured for the associated NPRACH resource for Msg4 NPDSCH transmission, and higher layer parameter ack-NACK-NumRepetitions otherwise, and the value of $N_{slots}^{UL}$ is the number of slots of the resource unit, allocated subcarrier for ACK/NACK and value of k0 is determined by the ACK/NACK resource field in the DCI format of the corresponding NPDCCH according to Table 16.4.2-1, and Table 16.4.2-2 in 3GPP TS36.213.

Narrowband Physical Broadcast Channel (NPBCH)

The processing structure for the BCH transport channel is according to Section 5.3.1 of 3GPP TS 36.212, with the following differences:

The transmission time interval (TTI) is 640 ms.

The size of the BCH transport block is set to 34 bits

The CRC mask for NPBCH is selected according to 1 or 2 transmit antenna ports at eNodeB according to Table 5.3.1.1-1 of 3GPP TS 36.212, where the transmit antenna ports are defined in section 10.2.6 of 3GPP TS 36.211

The number of rate matched bits is defined in section 10.2.4.1 of 3GPP TS 36.211

Scrambling shall be done according to clause 6.6.1 of 3GPP TS 36.211 with $M_{bit}$ denoting the number of bits to be transmitted on the NPBCH. $M_{bit}$ equals 1600 for normal cyclic prefix. The scrambling sequence shall be initialized with $c_{init}=N_{ID}^{Ncell}$ in radio frames fulfilling $n_f$ mod 64=0.

Modulation should be done using QPSK modulation scheme for each antenna port is transmitted in subframe 0 during 64 consecutive radio frames starting in each radio frame fulfilling $n_f$ mod 64=0 and shall Layer mapping and precoding shall be done according to clause 6.6.3 of 3GPP TS 36.211 with P∈{1,2}. The UE shall assume antenna ports $R_{2000}$ and $R_{2001}$ are used for the transmission of the narrowband physical broadcast channel.

The block of complex-valued symbols $y^{(p)}(0), \ldots y^{(p)}(M_{symb}-1)$ for each antenna port is transmitted in subframe 0 during 64 consecutive radio frames starting in each radio frame fulfilling $n_f$ mod 64=0 and shall be mapped in sequence starting consecutive radio frames starting with y(0) to resource elements (k,l) not reserved for transmission of reference signals shall be in increasing order of the first the index k, then the index l. After mapping to a subframe, the subframe shall be repeated in subframe 0 in the 7 following radio frames, before continuing the mapping of $y^{(p)}(\cdot)$ to subframe 0 in the following radio frame. The first three OFDM symbols in a subframe shall not be used in the mapping process. For the purpose of the mapping, the UE shall assume cell-specific reference signals for antenna ports 0-3 and narrowband reference signals for antenna ports 2000 and 2001 being present irrespective of the actual configuration. The frequency shift of the cell-specific reference signals shall be calculated by replacing cell $N_{ID}^{cell}$ with $N_{ID}^{Ncell}$ in the calculation of $v_{shift}$ in clause 6.10.1.2 of 3GPP TS 36.211.

Narrowband Physical Downlink Control Channel (NPDCCH)

The narrowband physical downlink control channel carries control information. A narrowband physical control channel is transmitted on an aggregation of one or two consecutive narrowband control channel elements (NCCEs), where a narrowband control channel element corresponds to 6 consecutive subcarriers in a subframe where NCCE 0 occupies subcarriers 0 through 5 and NCCE 1 occupies subcarriers 6 through 11. The NPDCCH supports multiple formats as listed in Table 26. For NPDCCH format 1, both NCCEs belong to the same subframe. One or two NPDCCHs can be transmitted in a subframe.

Table 26 shows an example of supported NPDCCH formats.

TABLE 26

| NPDCCH format | Number of NCCEs |
|---|---|
| 0 | 1 |
| 1 | 2 |

Scrambling shall be done according to clause 6.8.2 of TS36.211. The scrambling sequence shall be initialized at the start of subframe $k_0$ according to section 16.6 of TS36.213 after every 4th NPDCCH subframe with $c_{init}=\lfloor n_s/2 \rfloor 2^9 + N_{ID}^{Ncell}$ where $n_s$ is the first slot of the NPDCCH subframe in which scrambling is (re-)initialized.

Modulation shall be done according to clause 6.8.3 of TS36.211 using the QPSK modulation scheme.

Layer mapping and precoding shall be done according to clause 6.6.3 of TS36.211 using the same antenna ports as the NPBCH.

The block of complex-valued symbols $y(0), \ldots y(M_{symb}-1)$ shall be mapped in sequence starting with y(0) to resource elements (k,l) on the associated antenna port which meet all of the following criteria:

they are part of the NCCE(s) assigned for the NPDCCH transmission, and they are not used for transmission of NPBCH, NPSS, or NSSS, and they are assumed by the UE not to be used for NRS, and they are not overlapping with resource elements used for PBCH, PSS, SSS, or CRS as defined in clause 6 of TS36.211 (if any), and the index l in the first slot in a subframe fulfils l≥$l_{NPDCCHStart}$ where $l_{NPDCCHStart}$ is given by clause 16.6.1 of 3GPP TS 36.213.

The mapping to resource elements (k,l) on antenna port p meeting the criteria above shall be in increasing order of first the index k and then the index l, starting with the first slot and ending with the second slot in a subframe.

The NPDCCH transmission can be configured by higher layers with transmissions gaps where the NPDCCH transmission is postponed. The configuration is the same as described for NPDSCH in clause 10.2.3.4 of TS36.211.

The UE shall not expect NPDCCH in subframe i if it is not a NB-IoT downlink subframe. In case of NPDCCH transmissions, in subframes that are not NB-IoT downlink subframes, the NPDCCH transmission is postponed until the next NB-IoT downlink subframe.

DCI Format

DCI Format N0

DCI format N0 is used for the scheduling of NPUSCH in one UL cell. The following information is transmitted by means of the DCI format N0:

Flag for format N0/format N1 differentiation (1 bit), Subcarrier indication (6 bits), Resource assignment (3 bits), Scheduling delay (2 bits), Modulation and coding scheme (4 bits), Redundancy version (1 bit), Repetition number (3 bits), New data indicator (1 bit), DCI subframe repetition number (2 bits)

DCI Format N1

DCI format N1 is used for the scheduling of one NPDSCH codeword in one cell and random access procedure initiated by a NPDCCH order. The DCI corresponding to a NPDCCH order is carried by NPDCCH. The following information is transmitted by means of the DCI format N1:

Flag for format N0/format N1 differentiation (1 bit), NPDCCH order indicator (1 bit)

Format N1 is used for random access procedure initiated by a NPDCCH order only if NPDCCH order indicator is set to "1", format N1 CRC is scrambled with C-RNTI, and all the remaining fields are set as follows:

Starting number of NPRACH repetitions (2 bits), Subcarrier indication of NPRACH (6 bits), All the remaining bits in format N1 are set to one.

Otherwise,

Scheduling delay (3 bits), Resource assignment (3 bits), Modulation and coding scheme (4 bits), Repetition number (4 bits), New data indicator (1 bit), HARQ-ACK resource (4 bits), DCI subframe repetition number (2 bits)

When the format N1 CRC is scrambled with a RA-RNTI, then the following fields among the fields above are reserved:

New data indicator, HARQ-ACK resource

If the number of information bits in format N1 is less than that of format N0, zeros shall be appended to format N1 until the payload size equals that of format N0.

DCI Format N2

DCI format N2 is used for for paging and direct indication. The following information is transmitted by means of the DCI format N2.

Flag for paging/direct indication differentiation (1 bit)
If Flag=0:
Direct Indication information (8 bits), Reserved information bits are added until the size is equal to that of format N2 with Flag=1

If Flag=1:
Resource assignment (3 bits), Modulation and coding scheme (4 bits), Repetition number (4 bits), DCI subframe repetition number (3 bits)

NPDCCH Related Procedure

A UE shall monitor a set of NPDCCH candidates as configured by higher layer signalling for control information, where monitoring implies attempting to decode each of the NPDCCHs in the set according to all the monitored DCI formats.

An NPDCCH search space $NS_k^{(L',R)}$ at aggregation level L'∈{1,2} and repetition level R∈{1,2,4,8,16,32,64,128,256, 512,1024,2048} is defined by a set of NPDCCH candidates where each candidate is repeated in a set of R consecutive NB-IoT downlink subframes excluding subframes used for transmission of SI messages starting with subframe k.

The locations of starting subframe k are given by k=$k_b$, where $k_b$ is the $b^{th}$ consecutive NB-IoT DL subframe from subframe k0, excluding subframes used for transmission of SI messages, and b=u·R, and u=0, 1, . . . , $$\frac{R_{max}}{R} - 1,$$

and where subframe k0 is a subframe satisfying the condition $(10n_f+\lfloor n_s/2 \rfloor) \mod T = \lfloor \alpha_{offset} \cdot T \rfloor$, where T=$R_{max}$·G, T≥4. G and $\alpha_{offset}$ are given by the higher layer parameters.

For Type1-NPDCCH common search space, k=k0 and is determined from locations of NB-IoT paging opportunity subframes.

If the UE is configured by high layers with a NB-IoT carrier for monitoring of NPDCCH UE-specific search space, the UE shall monitor the NPDCCH UE-specific search space on the higher layer configured NB-IoT carrier, the UE is not expected to receive NPSS, NSSS, NPBCH on the higher layer configured NB-IoT carrier.

otherwise, the UE shall monitor the NPDCCH UE-specific search space on the same NB-IoT carrier on which NPSS/NSSS/NPBCH are detected.

The starting OFDM symbol for NPDCCH given by index $l_{NPDCCHStart}$ in the first slot in a subframe k and is determined as follows if higher layer parameter eutraControlRegionSize is present $l_{NPDCCHStart}$ is given by the higher layer parameter eutraControlRegionSize Otherwise, $l_{NPDCCHStart}$=0

Narrowband Reference Signal (NRS)

Before a UE obtains operationModeInfo, the UE may assume narrowband reference signals are transmitted in subframes #0 and #4 and in subframes #9 not containing NSSS.

When UE receives higher-layer parameter operationModeInfo indicating guardband or standalone, Before the UE obtains SystemInformationBlockType1-NB, the UE may assume narrowband reference signals are transmitted in subframes #0, #1, #3, #4 and in subframes #9 not containing NSSS.

After the UE obtains SystemInformationBlockType1-NB, the UE may assume narrowband reference signals are transmitted in subframes #0, #1, #3, #4, subframes #9 not containing NSSS, and in NB-IoT downlink subframes and shall not expect narrowband reference signals in other downlink subframes.

When UE receives higher-layer parameter operationModeInfo indicating inband-SamePCI or inband-DifferentPCI, Before the UE obtains SystemInformationBlockType1-NB, the UE may assume narrowband reference signals are transmitted in subframes #0, #4 and in subframes #9 not containing NSSS.

After the UE obtains SystemInformationBlockType1-NB, the UE may assume narrowband reference signals are transmitted in subframes #0, #4, subframes #9 not containing NSSS, and in NB-IoT downlink subframes and shall not expect narrowband reference signals in other downlink subframes.

Narrowband Primary Synchronization Signal (NPSS)

The sequence $d_l(n)$ used for the narrowband primary synchronization signal is generated from a frequency-domain Zadoff-Chu sequence according to Equation 17 below.

$$d_l(n) = S(l) \cdot e^{-j\frac{\pi u n(n+1)}{11}}, n = 0,1,\ldots,10 \quad \text{[Equation 17]}$$

where the Zadoff-Chu root sequence index u=5 and S(l) for different symbol indices l is given by Table 27.

Table 27 shows an example of S(l).

TABLE 27

| Cyclic prefix length | S(3), . . . , S(13) |        |        |        |    |    |        |        |        |    |    |
| --- | --- | --- | --- | --- | --- | --- | --- | --- | --- | --- | --- |
| Normal | 1 | 1 | 1 | 1 | −1 | −1 | 1 | 1 | 1 | −1 | 1 |

The same antenna port shall be used for all symbols of the narrowband primary synchronization signal within a subframe.

UE shall not assume that the narrowband primary synchronization signal is transmitted on the same antenna port as any of the downlink reference signals. The UE shall not assume that the transmissions of the narrowband primary synchronization signal in a given subframe use the same antenna port, or ports, as the narrowband primary synchronization signal in any other subframe.

The sequences $d_l(n)$ shall be mapped to resource elements (k,l) in increasing order of first the index k=0,1, . . . , $N_{sc}^{RB}-2$ and then the index l=3, 4, . . . , $2N_{symb}^{DL}-1$ in subframe 5 in every radio frame. For resource elements (k,l) overlapping with resource elements where cell-specific reference signals are transmitted, the corresponding sequence element d(n) is not used for the NPSS but counted in the mapping process.

Narrowband Secondary Synchronization Signals (NSSS)

The sequence d(n) used for the narrowband secondary synchronization signal is generated from a frequency-domain Zadoff-Chu sequence according to Equation 18 below.

$$d(n) = b_q(n) \cdot e^{-j2\pi\theta_f n} \cdot e^{-j\frac{\pi u n'(n'+1)}{131}} \quad \text{[Equation 18]}$$

where n = 0,1, . . . ,131 n' = n mod 131 m = n mod 128 u = $N_{ID}^{Ncell}$ mod 126 + 3

$q = \left\lfloor \frac{N_{ID}^{Ncell}}{126} \right\rfloor$

The binary sequence $b_q(n)$ is given by Table 28. The cyclic shift $\theta_f$ in frame number $n_f$ is given by $$\theta_f = \frac{33}{132}(n_f/2) \bmod 4.$$

Table 28 shows an example of $b_q(n)$.

TABLE 28

| q | $b_q(0), \ldots, b_q(127)$ |
| --- | --- |
| 0 | [1 1 1 1 1 1 1 1 1 1 1 1 1 1 1 1 1 1 1 1 1 1 1 1 1 1 1 1 1 1 1 1<br>1 1 1 1 1 1 1 1 1 1 1 1 1 1 1 1 1 1 1 1 1 1 1 1 1 1 1 1 1 1 1 1<br>1 1 1 1 1 1 1 1 1 1 1 1 1 1 1 1 1 1 1 1 1 1 1 1 1 1 1 1 1 1 1 1<br>1 1 1 1 1 1 1 1 1 1 1 1 1 1 1 1 1 1 1 1 1 1 1 1 1 1 1 1 1 1 1 1] |
| 1 | [1 −1 −1 1 −1 1 1 −1 −1 1 1 −1 −1 1 −1 1 −1 1 1 1<br>−1 1 −1 −1 1 1 1 −1 −1 1 −1 1 1 −1 1 1 −1 1 −1 −1 1 −1 1 1<br>−1 −1 1 1 −1 1 1 −1 −1 1 1 −1 1 1 −1 1 −1 −1 1 1 1 −1<br>−1 1 1 −1 1 1 −1 1 −1 −1 1 1 −1 1 1 1 −1 −1 1 1 −1 1 −1<br>−1 1 1 −1 1 1 −1 1 −1 1 −1 1 1 −1 1 1 −1 1 1 −1 1 −1<br>−1 1 1 −1 1 1 −1 −1 1 1 1 −1 1 −1 −1 1 1 1 −1 1 1 −1<br>−1 1 1 1 −1 −1 1 1 −1 1 1 1 −1] |
| 2 | [1 −1 −1 1 −1 1 1 1 −1 −1 1 1 1 −1 1 −1 −1 1 1 −1 1 1 1<br>−1 1 −1 −1 1 1 1 −1 1 −1 1 1 1 −1 1 1 1 −1 1 −1 −1 1 −1 −1<br>1 1 −1 −1 1 1 1 −1 1 −1 −1 1 1 −1 1 1 1 −1 1 1 −1 1 1 1<br>−1 1 −1 −1 1 1 1 −1 1 −1 1 1 1 −1 1 1 −1 1 −1 1 1 −1 1<br>−1 1 1 −1 1 1 −1 −1 1 1 1 −1 1 −1 1 1 1 −1 1 −1 −1 1 1<br>1 −1 1 1 −1 1 1 1 −1 −1 1 1 1 −1 1 −1 −1 1 1<br>1 −1 1 1 1 −1 1 −1 1 1]|
| 3 | [1 −1 −1 1 −1 1 1 1 −1 −1 1 1 1 −1 1 −1 −1 1 1 −1 1 1 1<br>−1 1 −1 −1 1 1 1 −1 1 −1 1 1 1 −1 1 1 1 −1 1 −1 −1 1 −1 −1<br>1 1 −1 −1 1 1 1 −1 1 −1 −1 1 1 −1 1 1 1 −1 1 1 −1 1 1 1<br>−1 1 −1 −1 1 −1 1 1 −1 1 −1 −1 1 1 1 −1 −1 1 1 1 −1 1 1 1<br>−1 1 −1 −1 1 −1 1 1 1 −1 −1 1 1 1 −1 −1 1 1 1 −1<br>−1 1 −1 1 1 1 −1 −1 1 1 1 −1 1 −1 −1 1 1 1 −1 1 1 −1<br>−1 1 1 1 −1 −1 1 1 −1 1 1 1 −1]|

The same antenna port shall be used for all symbols of the narrowband secondary synchronization signal within a subframe.

UE shall not assume that the narrowband secondary synchronization signal is transmitted on the same antenna port as any of the downlink reference signals. The UE shall not assume that the transmissions of the narrowband secondary synchronization signal in a given subframe use the same antenna port, or ports, as the narrowband secondary synchronization signal in any other subframe.

The sequence d(n) shall be mapped to resource elements (k,l) in sequence starting with d(0) in increasing order of the first the index k over the 12 assigned subcarriers and then the index l over the assigned last $N_{symb}^{NSSS}$ symbols of subframe 9 in radio frames fulfilling $n_f$ mod 2=0, where $N_{symb}^{NSSS}$ is given by Table 29.

Table 29 shows an example of the number of NSSS symbols.

TABLE 29

| Cyclic prefic length | $N_{symb}^{NSSS}$ |
| --- | --- |
| Normal | 11 |

OFDM Baseband Signal Generation

If the higher layer parameter operationModeInfo does not indicate 'inband-SamePCI' and samePCI-Indicator does not indicate 'samePCI', then the time-continuous signal $s_l^{(p)}(t)$ on antenna port p in OFDM symbol l in a downlink slot is defined by Equation 19 below.

$$s_l^{(p)}(t) = \sum_{k=-\lfloor N_{sc}^{RB}/2 \rfloor}^{\lceil N_{sc}^{RB}/2 \rceil - 1} a_{k^{(-)},l}^{p} \cdot e^{j2\pi \left(k+\frac{1}{2}\right)\Delta f(t-N_{CP,i}T_s)}$$ [Equation 19]

for $0 \leq t < (N_{CP,i}+N) \times T_s$ where $k^{(-)} = k + \lfloor N_{sc}^{RB}/2 \rfloor$, N=2048, $\Delta f$=15 kHz and $a_{k,l}^{(p)}$ is the content of resource element (k,l) on antenna port p.

If the higher layer parameter operationModeInfo indicates 'inband-SamePCI' or samePCI-Indicator indicate 'samePCI', then the time-continuous signal $s_l^{(p)}(t)$ on antenna port p in OFDM symbol l', where $l'=l+N_{symb}^{DL}(n_s \bmod 4) \in \{0, \ldots, 27\}$ is the OFDM symbol index from the start of the last even-numbered subframe, is defined by Equation 20 below.

$$s_l^{(p)}(t) = \sum_{k=-\lfloor N_{RB}^{DL}N_{sc}^{RB}/2 \rfloor}^{-1} e^{\theta_{k^{(-)}}} a_{k^{(-)},l}^{(p)} \cdot e^{j2\pi k\Delta f\left(t-N_{CP,l'\bmod N_{symb}^{DL}}T_s\right)} +$$

$$\sum_{k=1}^{\lceil N_{RB}^{DL}N_{sc}^{RB}/2 \rceil} e^{\theta_{k^{(+)}}} a_{k^{(+)},l}^{(p)} \cdot e^{j2\pi k\Delta f\left(t-N_{CP,l'\bmod N_{symb}^{DL}}T_s\right)}$$ [Equation 20]

for $0 \leq t < (N_{CP,i}+N) \times T_s$ where $k^{(-)} = k + \lfloor N_{RB}^{DL}N_{sc}^{RB}/2 \rfloor$ and $k^{(+)} = k + \lfloor N_{RB}^{DL}N_{sc}^{RB}/2 \rfloor - 1$, $\theta_{k,l'} = j2\pi f_{NB-IoT}T_s(N + \sum_{k=0}^{l'} N_{CP,i \bmod 7})$ if resource element (k,l') is used for Narrowband IoT, and 0 otherwise, and $f_{NB-IoT}$ is the frequency location of the carrier of the Narrowband IoT PRB minus the frequency location of the center of the LTE signal.

Only normal CP is supported for Narrowband IoT downlink in this release of the specification.

Hereinafter, the physical layer process of the narrowband physical broadcast channel (NPBCH) will be described in more detail.

Scrambling

Scrambling shall be done according to clause 6.6.1 with $M_{bit}$ denoting the number of bits to be transmitted on the NPBCH. $M_{bit}$ equals 1600 for normal cyclic prefix. The scrambling sequence shall be initialised with $c_{init}=N_{ID}^{Ncell}$ in radio frames fulfilling $n_f \bmod 64=0$.

Modulation

Modulation shall be done according to clause 6.6.2 using the modulation scheme in Table 10.2.4.2-1.

Table 30 shows an example of a modulation scheme for NPBCH.

TABLE 30

| Physical channel | Modulation schemes |
|---|---|
| NPBCH | QPSK |

Layer Mapping and Precoding

Layer mapping and precoding shall be done according to clause 6.6.3 with $P \in \{1,2\}$. The UE shall assume antenna ports $R_{2000}$ and $R_{2001}$ are used for the transmission of the narrowband physical broadcast channel.

Mapping to Resource Elements

The block of complex-valued symbols $y^{(p)}(0), \ldots, y^{(p)}(M_{symb}-1)$ for each antenna port is transmitted in subframe 0 during 64 consecutive radio frames starting in each radio frame fulfilling $n_f \bmod 64=0$ and shall be mapped in sequence starting with y(0) to resource elements (k,l). The mapping to resource elements (k,l) not reserved for transmission of reference signals shall be in increasing order of first the index k, then the index l. After mapping to a subframe, the subframe shall be repeated in subframe 0 in the 7 following radio frames, before continuing the mapping of $y^{(p)}(\bullet)$ to subframe 0 in the following radio frame. The first three OFDM symbols in a subframe shall not be used in the mapping process.

For the purpose of the mapping, the UE shall assume cell-specific reference signals for antenna ports 0-3 and narrowband reference signals for antenna ports 2000 and 2001 being present irrespective of the actual configuration. The frequency shift of the cell-specific reference signals shall be calculated by replacing $N_{ID}^{cell}$ with $N_{ID}^{Ncell}$ in the calculation of $v_{shift}$ in clause 6.10.1.2.

Next, information related to MIB-NB and SIBN1-NB will be described in more detail.

MasterInformationBlock-NB

The MasterInformationBlock-NB includes the system information transmitted on BCH.

Signalling radio bearer: N/A

RLC-SAP: TM

Logical channel: BCCH

Direction: E-UTRAN to UE

Table 31 shows an example of the MasterInformationBlock-NB format.

TABLE 31

```
-- ASN1START
MasterInformationBlock-NB ::=        SEQUENCE {
    systemFrameNumber-MSB-r13           BIT STRING (SIZE (4)),
    hyperSFN-LSB-r13                    BIT STRING (SIZE (2)),
    schedulingInfoSIB1-r13              INTEGER (0..15),
    systemInfoValueTag-r13              INTEGER (0..31),
    ab-Enabled-r13                      BOOLEAN,
    operationModeInfo-r13               CHOICE {
        inband-SamePCI-r13                  Inband-SamePCI-NB-r13,
        inband-DifferentPCI-r13             Inband-DifferentPCI-NB-r13,
        guardband-r13                       Guardband-NB-r13,
        standalone-r13                      Standalone-NB-r13
    },
    spare                               BIT STRING (SIZE (11))
}
ChannelRasterOffset-NB-r13 ::= ENUMERATED {khz-7dot5,
khz-2dot5, khz2dot5, khz7dot5}
Guardband-NB-r13 ::=                 SEQUENCE{
    rasterOffset-r13                    ChannelRasterOffset-NB-r13,
    spare                               BIT STRING (SIZE (3))
}
Inband-SamePCI-NB-r13 ::=            SEQUENCE {
    eutra-CRS-SequenceInfo-r13          INTEGER (0..31)
}
Inband-DifferentPCI-NB-r13 ::=       SEQUENCE {
    eutra-NumCRS-Ports-r13 ,            ENUMERATED {same, four}
    rasterOffset-r13                    ChannelRasterOffset-NB-r13,
    spare                               BIT STRING (SIZE (2))
}
Standalone-NB-r13 ::=                SEQUENCE {
    spare                               BIT STRING (SIZE (5))
}
-- ASN1STOP
```

Table 32 shows the description of the MasterInformationBlock-NB field.

TABLE 32

MasterInformationBlock-NB field descriptions ab-Enabled
Value TRUE indicates that access barring is enabled and that the UE shall acquire
SystemInformationBlockType14-NB before initiating RRC connection
establishment or resume.
eutra-CRS-SequenceInfo
Information of the carrier containing NPSS/NSSS/NPBCH.
Each value is associated with an E-UTRA PRB index as an offset from the middle of
the LTE system sorted out by channel raster offset.
eutra-NumCRS-Ports
Number of E-UTRA CRS antenna ports, either the same number of ports as NRS or
4 antenna ports.
hyperSFN-LSB
Indicates the 2 least significant bits of hyper SFN. The remaining bits are present in
SystemInformationBlockType1-NB.
MasterInformationBlock-NB field descriptions
operationModeInfo
Deployment scenario (in-band/guard-band/standalone) and related information. See
TS 36.211 [21] andTS 36.213 [23].
Inband-SamePCI indicates an in-band deployment and that the NB-IoT and LTE cell
share the same physical cell id and have the same number of NRS and CRS ports.
Inband-DifferentPCI indicates an in-band deployment and that the NB-IoT and LTE
cell have different physical cell id.
guardband indicates a guard-band deployment,
standalone indicates a standalone deployment.
rasterOffset
NB-IoT offset from LTE channel raster. Unit in kHz in set {−7.5, −2.5, 2.5, 7.5}
schedulingInfoSIB1
This field contains an index to a table specified in TS 36.213 [23, Table 16.4.1.3-3]
that defines SystemInformationBlockType1-NB scheduling information.
systemFrameNumber-MSB
Defines the 4 most significant bits of the SFN. As indicated in TS 36.211 [21], the 6
least significant bits of the SFN are acquired implicitly by decoding the NPBCH.
systemInfoValueTag
Common for all SIBs other than MIB-NB, SIB14-NB and SIB16-NB.

SystemInformationBlockType1-NB

The SystemInformationBlockType1-NB message contains information relevant when evaluating if a UE is allowed to access a cell and defines the scheduling of other system information.

Signalling radio bearer: N/A
RLC-SAP: TM
Logical channel: BCCH
Direction: E-UTRAN to UE Table 33 shows an example of a SystemInformationBlockType1 (SIB1)-NB message.

TABLE 33

```
-- ASN1START
SystemInformationBlockType1-NB ::= SEQUENCE {
  hyperSFN-MSB-r13            BIT STRING (SIZE (8)),
  cellAccessRelatedInfo-r13   SEQUENCE {
    plmn-IdentityList-r13       PLMN-IdentityList-NB-r13,
    trackingAreaCode-r13        TrackingAreaCode,
    cellIdentity-r13            CellIdentity,
    cellBarred-r13              ENUMERATED {barred, notBarred},
    intraFreqReselection-r13    ENUMERATED {allowed, notAllowed}
  },
  cellSelectionInfo-r13       SEQUENCE {
    q-RxLevMin-r13                Q-RxLevMin,
    q-QualMin-r13                 Q-QualMin-r9
  },
  p-Max-r13                   P-Max                         OPTIONAL, -- Need OP
  freqBandIndicator-r13       FreqBandIndicator-NB-r13,
  freqBandInfo-r13            NS-PmaxList-NB-r13            OPTIONAL, -- Need OR
  multiBandInfoList-r13       MultiBandInfoList-NB-r13      OPTIONAL, -- Need OR
  downlinkBitmap-r13          DL-Bitmap-NB-r13              OPTIONAL, -- Need OP,
```

TABLE 33-continued

```
  eutraControlRegionSize-r13        ENUMERATED {n1, n2, n3}
  OPTIONAL, -- Cond inband
  nrs-CRS-PowerOffset-r13           ENUMERATED {dB-6, dB-
4dot77, dB-3,
                                      dB-1dot77,   dB0,       dB1,
                                      dB1dot23,    dB2,       dB3,
                                      dB4,         dB4dot23,  dB5,
                                      dB6,         dB7,       dB8,
Cond inband-SamePCI                   dB9}         OPTIONAL, --
  schedulingInfoList-r13            SchedulingInfoList-NB-r13,
  si-WindowLength-r13               ENUMERATED {ms160, ms320,
ms480, ms640,
                                      ms960, ms1280, ms1600,
spare1},
  si-RadioFrameOffset-r13           INTEGER (1..15)           OPTIONAL, --
Need OP
  systemInfoValueTagList-r13        SystemInfoValueTagList-NB-r13
  OPTIONAL, -- Need OR
  lateNonCriticalExtension          OCTET STRING
  OPTIONAL,
  nonCriticalExtension              SEQUENCE { }
  OPTIONAL
}
PLMN-IdentityList-NB-r13 ::=    SEQUENCE (SIZE (1..maxPLMN-r11)) OF
PLMN-IdentityInfo-NB-r13
PLMN-IdentityInfo-NB-r13 ::=    SEQUENCE {
  plmn-Identity-r13                 PLMN-Identity,
  cellReservedForOperatorUse-r13    ENUMERATED {reserved,
notReserved},
  attachWithoutPDN-Connectivity-r13   ENUMERATED {true}
  OPTIONAL -- Need OP
}
SchedulingInfoList-NB-r13 ::= SEQUENCE (SIZE (1..maxSI-Message-NB-r13)) OF
SchedulingInfo-NB-r13
SchedulingInfo-NB-r13::=          SEQUENCE {
  si-Periodicity-r13                ENUMERATED {rf64, rf128, rf256, rf512,
                                      rf1024, rf2048, rf4096, spare},
  si-RepetitionPattern-r13          ENUMERATED {every2ndRF, every4thRF,
                                      every 8thRF, every 16thRF},
  sib-MappingInfo-r13               SIB-MappingInfo-NB-r13,
  si-TB-r13    ENUMERATED {b56, b120, b208, b256, b328, b440, b552,
b680}
}
SystemInfoValueTagList-NB-r13 ::= SEQUENCE (SIZE (1.. maxSI-Message-NB-
r13)) OF
                                    SystemInfoValueTagSI-r13
SIB-MappingInfo-NB-r13 ::=        SEQUENCE (SIZE (0..maxSIB-1)) OF SIB-
Type-NB-r13
SIB-Type-NB-r13 ::=               ENUMERATED {
                                    sibType3-NB-r13, sibType4-NB-r13,
sibType5-NB-r13,
                                    sibType14-NB-r13, sibType16-NB-r13,
spare3, spare2, spare1}
-- ASN1STOP
```

Table 34 shows the description of the SystemInformationBlockType1-NB field.

TABLE 34

SystemInformationBlockType1-NB field descriptions attachWithoutPDN-Connectivity
If present, the field indicates that attach without PDN connectivity as specified in TS 24.301 [35] is supported for this PLMN.
cellBarred
Barred means the cell is barred, as defined in TS 36.304 [4].
cellIdentity
Indicates the cell identity.
cellReservedForOperatorUse
As defined in TS 36.304 [4].
cellSelectionInfo
Cell selection information as specified in TS 36.304 [4].
downlinkBitmapNB-IoT downlink subframe configuration for downlink transmission.

TABLE 34-continued

SystemInformationBlockType1-NB field descriptions

If the bitmap is not present, the UE shall assume that all subframes are valid (except for subframes carrying NPSS/NSSS/NPBCH/SIB1-NB) as specified in TS 36.21323]
eutraControlRegionSize
Indicates the control region size of the E-UTRA cell for the in-band operation mode. Unit is in number of OFDM symbols.
freqBandIndicator
A list of as defined in TS 36.101 [42, table 6.2.4-1] for the frequency band in freqBandIndicator.
freqBandInfo
A list of additionalPmax and additionalSpectrumEmission values as defined in TS 36.101 [42, table 6.2.4-1] for the frequency band in freqBandIndicator.
hyperSFN-MSB
Indicates the 8 most significat bits of hyper-SFN. Together with hyperSFN-LSB in MIB-NB, the complete hyper-SFN is built up. hyper-SFN is incremented by one when the SFN wraps around.
intraFreqReselection
Used to control cell reselection to intra-frequency cells when the highest ranked cell is barred, or treated as barred by the UE, as specified in TS 36.304 [4].
multiBandInfoList
A list of additional frequency band indicators, additionalPmax and additionalSpectrumEmission values, as defined in TS 36.101 [42, table 5.5-1]. If the UE supports the frequency band in the freqBandIndicator IE it shall apply that frequency band. Otherwise, the UE shall apply the first listed band which it supports in the multiBandInfoList IE.
nrs-CRS-PowerOffset
NRS power offset between NRS and E-UTRA CRS. Unit in dB. Default value of 0.
plmn-IdentityList
List of PLMN identities. The first listed PLMN-Identity is the primary PLMN.
p-Max
Value applicable for the cell. If absent the UE applies the maximum power according to the UE capability.
q-QualMin
Parameter "Qqualmin" in TS 36.304 [4].
q-RxLevMin
Parameter Qrxlevmin in TS 36.304 [4]. Actual value Qrxlevmin = IE value * 2 [dB].
schedulingInfoList
Indicates additional scheduling information of SI messages.
si-Periodicity
Periodicity of the Si-message in radio frames, such that rf256 denotes 256 radio frames, rf512 denotes 512 radio frames, and so on.
si-RadioFrameOffset
Offset in number of radio frames to calculate the start of the SI window.
If the field is absent, no offset is applied.
si-RepetitionPattern
Indicates the starting radio frames within the SI window used for SI message transmission. Value every2ndRF corresponds to every second radio frame, value every4thRF corresponds to every fourth radio frame and so on starting from the first radio frame of the SI window used for SI transmission.
si-TB
This field indicates the transport block size in number of bits used to broadcast the SI message.
si-WindowLength
Common SI scheduling window for all SIs. Unit in milliseconds, where ms 160 denotes 160 milliseconds, ms 320 denotes 320 milliseconds and so on.
sib-MappingInfo
List of the SIBs mapped to this SystemInformation message. There is no mapping information of SIB2; it is always present in the first SystemInformation message listed in the schedulingInfoList list.
systemInfoValueTagList
Indicates SI message specific value tags. It includes the same number of entries, and listed in the same order, as in SchedulingInfoList.
systemInfoValueTagSI
SI message specific value tag as specified in Clause 5.2.1.3. Common for all SIBs within the SI message other than SIB14.
trackingAreaCode
A trackingAreaCode that is common for all the PLMNs listed.

TABLE 35

| Conditional presence | Explanation |
| --- | --- |
| inband | The field is mandatory present if IE operationModeInfo in MIB-NB is set to inband-SamePCI or inband-DifferentPCI. Otherwise the field is not present. |
| inband-SamePCI | The field is mandatory present, if IE operationModeInfo in MIB-NB is set to inband-SamePCI. Otherwise the field is not present. |

NB-IoT Initial Access Procedure

In the general signal transmission/reception procedure of NB-IoT, a procedure for initial access by an NB-IoT terminal to a base station has been briefly described. Specifically, the procedure for initial access by the NB-IoT terminal to the base station may include a procedure for searching for an initial cell and a procedure for obtaining system information by the NB-IoT terminal.

Figure 11:
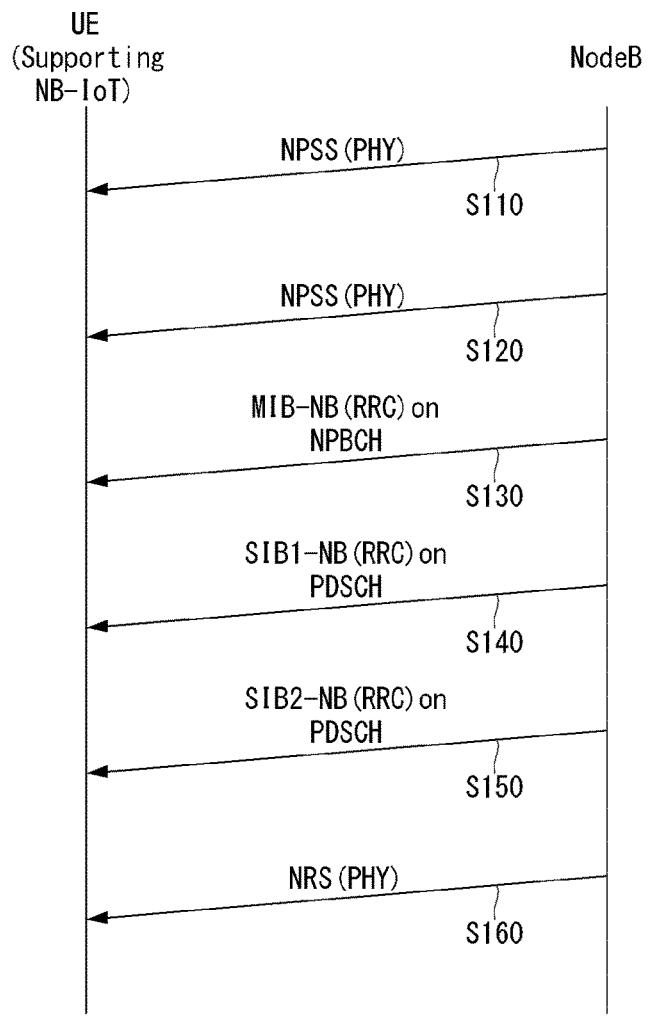
FIG. 11 is an example of an initial access procedure of NB-IoT.

In this regard, a specific signaling procedure between a terminal (UE) and a base station (e.g., NodeB, eNodeB, eNB, gNB, etc.) related to initial access of NB-IoT may be illustrated as shown in FIG. 11. Hereinafter, a general initial access procedure of NB-IoT, configuration of NPSS/NSSS, acquisition of system information (e.g., MIB, SIB, etc.) will be described in more detail with reference to FIG. 11.

FIG. 11 is an example of an initial access procedure of NB-IoT, and names of each physical channel and/or physical signal may be differently configured or referred to according to a wireless communication system to which NB-IoT is applied. As an example, basically, FIG. 11 is described in consideration of the NB-IoT based on the LTE system, but this is only for convenience of description, and it is a matter of course that the contents may be extended and applied to the NB-IoT based on the NR system.

Figure 15:
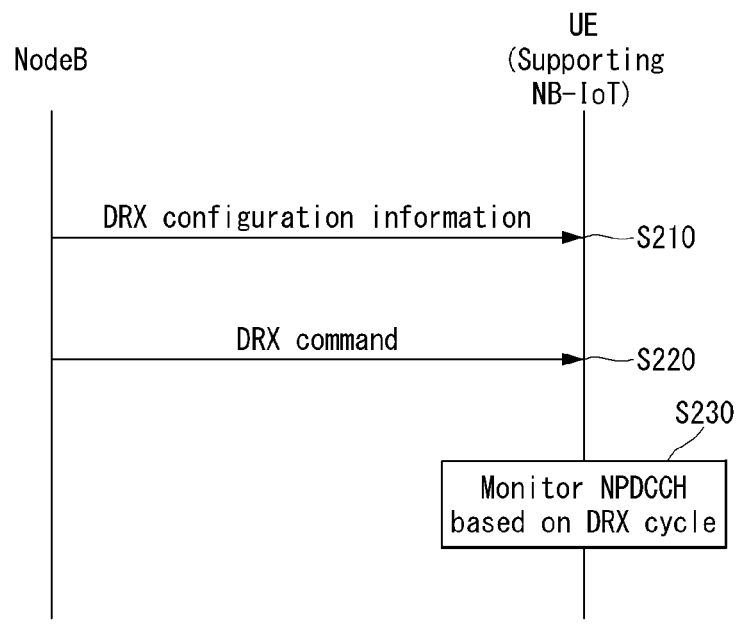
FIG. 15 illustrates an example of a DRX configuration and indication procedure for an NB-IoT terminal.

FIG. 15 is an example of an initial access procedure of NB-IoT. Each physical channel and/or a name of a physical signal may be differently configured or referred to according to a wireless communication system to which NB-IoT is applied. As an example, basically, FIG. 15 is described in consideration of the NB-IoT based on the LTE system, but this is only for convenience of description, and it goes without saying that the contents of this may be extended and applied to the NB-IoT based on the NR system.

As shown in FIG. 11, NB-IoT is based on following signals transmitted in the downlink: the first and the second narrowband synchronization signals (NPSS & NSSS). The NPSS is transmitted over 11 sub-carriers from the first subcarrier to the eleventh subcarrier in the sixth subframe of each frame (S110), and the NSSS is transmitted over 12 sub-carriers in the NB-IoT carrier in the tenth subframe for FDD and the first subframe for TDD of every other frame (S120).

The NB-IoT UE may receive MasterInformationBlock-NB (MIB-NB) on NPBCH (NB Physical Broadcast Channel) (S130).

The MIB-NB uses a fixed schedule with a periodicity of 640 ms and repetitions made within 640 ms. The first transmission of the MIB-NB is scheduled in subframe #0 of radio frames for which the SFN mod 64=0 and repetitions are scheduled in subframe #0 of all other radio frames. The transmissions are arranged in 8 independently decodable blocks of 80 ms duration.

Then, the UE may receive SystemInformationBlock-Type1-NB (SIB1-NB) on PDSCH (S140).

The SIB1-NB uses a fixed schedule with a periodicity of 2560 ms. SIB1-NB transmission occurs in subframe #4 of every other frame in 16 continuous frames. The starting frame for the first transmission of the SIB1-NB is derived from the cell PCID and the number of repetitions within the 2560 ms period and repetitions are made, equally spaced, within the 2560 ms period. TBS for SystemInformationBlockType1-NB and the repetitions made within the 2560 ms are indicated by schedulingInfoSIB1 field in the MIB-NB.

The SI messages are transmitted within periodically occurring time domain windows (referred to as SI-windows) using scheduling information provided in SystemInformationBlockType1-NB. Each SI message is associated with a SI-window and the SI-windows of different SI messages do not overlap. That is, within one SI-window only the corresponding SI is transmitted. The length of the SI-window is common for all SI messages, and is configurable.

Within the SI-window, the corresponding SI message can be transmitted a number of times over 2 or 8 consecutive NB-IoT downlink subframes depending on TBS. The UE acquires the detailed time/frequency domain scheduling information and other information, e.g. used transport format for the SI messages from schedulingInfoList field in SystemInformationBlockType1-NB. The UE is not required to accumulate several SI messages in parallel but may need to accumulate a SI message across multiple SI windows, depending on coverage condition.

SystemInformationBlockType1-NB configures the SI-window length and the transmission periodicity for all SI messages.

Further, the UE may receive SystemInformationBlockType2-NB (SIB2-NB) on PDSCH for additional information (S150).

On the other hand, NRS in FIG. 11 refers to Narrowband reference signal.

Random Access Procedure of NB-IoT

In the general signal transmission/reception procedure of NB-IoT, a procedure for randomly accessing a base station by an NB-IoT terminal has been briefly described. Specifically, a procedure in which the NB-IoT terminal randomly accesses the base station may be performed through a procedure in which the NB-IoT terminal transmits a preamble to the base station and receives a response thereto.

Figure 12:
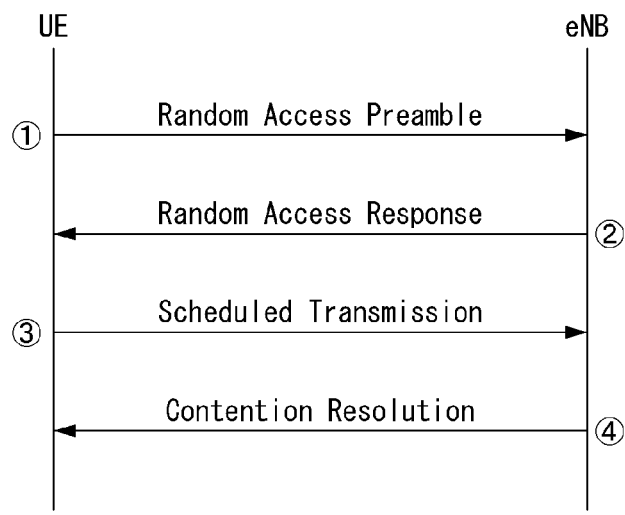
FIG. 12 is an example of an NB-IoT random access procedure.

In this regard, a specific signaling procedure between a terminal (UE and a base station (e.g., NodeB, eNodeB, eNB, gNB, etc.) related to random access of NB-IoT may be illustrated as shown in FIG. 12. Hereinafter, detailed contents of a random access procedure based on messages (e.g., msg1, msg2, msg3, msg4) used for a general random access procedure of NB-IoT will be described through the description of FIG. 12.

FIG. 12 is an example of an NB-IoT random access procedure, and names of each physical channel, each physical signal, and/or each message may be differently configured or referred to according to a wireless communication system to which NB-IoT is applied. As an example, basically, FIG. 12 is described in consideration of the NB-IoT based on the LTE system, but this is only for convenience of description, and it is a matter of course that the contents may be extended and applied to the NB-IoT based on the NR system.

FIG. 12 is an example of an NB-IoT random access procedure, and names of each physical channel, each physical signal, and/or each message may be differently configured or referred to according to a wireless communication system to which NB-IoT is applied. As an example, basically, FIG. 12 is described in consideration of the NB-IoT based on the LTE system, but this is only for convenience of description, and it is a matter of course that the contents may be extended and applied to the NB-IoT based on the NR system.

As shown in FIG. 12, in the case of NB-IoT, the RACH procedure has the same message flow as LTE having different parameters.

Hereinafter, the NPRACH transmitted from the NB-IoT terminal to the base station in relation to the NB-IoT random access procedure will be described in detail.

Figure 13:
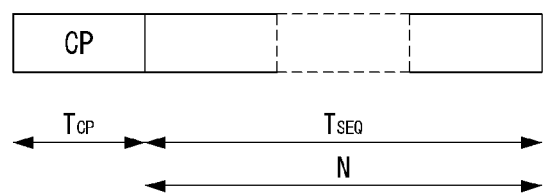
FIG. 13 illustrates the structure of a random access symbol group.

FIG. 13 illustrates the structure of a random access symbol group.

As shown in FIG. 13, a random access symbol group consists of a sequence of identical symbols with a cyclic prefix of length and a total length. The total number of symbol groups in the preamble repetition unit is denoted by P. The number of time-continuous symbol groups is given by G.

The parameter values of frame structures 1 and 2 are shown in Tables 36 and 37, respectively.

TABLE 36

| Preamble format | G | P | N | $T_{CP}$ | $T_{SEQ}$ |
|---|---|---|---|---|---|
| 0 | 4 | 4 | 5 | $2048T_s$ | $5 \cdot 8192T_s$ |
| 1 | 4 | 4 | 5 | $8192T_s$ | $5 \cdot 8192T_s$ |
| 2 | 6 | 6 | 3 | $24576T_s$ | $3 \cdot 24576T_s$ |

TABLE 37

| Preamble format | Supported uplink-downlink configurations | G | P | N | $T_{CP}$ | $T_{SEQ}$ |
|---|---|---|---|---|---|---|
| 0 | 1, 2, 3, 4, 5 | 2 | 4 | 1 | $4778T_s$ | $1 \cdot 8192T_s$ |
| 1 | 1, 4 | 2 | 4 | 2 | $8192T_s$ | $2 \cdot 8192T_s$ |
| 2 | 3 | 2 | 4 | 4 | $8192T_s$ | $4 \cdot 8192T_s$ |
| 0-a | 1, 2, 3, 4, 5 | 3 | 6 | 1 | $1536T_s$ | $1 \cdot 8192T_s$ |
| 1-a | 1, 4 | 3 | 6 | 2 | $3072T_s$ | $2 \cdot 8192T_s$ |

Transmission of the random access preamble is limited to specific time and frequency resources when triggered by the MAC layer. Each NPRACH resource configuration can configure up to three NPRACH resource configurations in cells corresponding to different coverage levels. NPRACH resource configuration is given by periodicity, number of repetitions, start time, frequency position, and number of subcarriers.

Discontinuous Reception Procedure of NB-IoT

During the general signal transmission/reception procedure of the above-described NB-IoT, the NB-IoT terminal is in an idle state (e.g., RRC_IDLE state) and/or an inactive state (e.g., RRC_INACTIVE state) in order to reduce power consumption. In this case, the NB-IoT terminal transitioned to an idle state and/or the inactive state may be configured to use the DRX scheme. For example, an NB-IoT terminal that has been transitioned to an idle state and/or an inactive state monitors the NPDCCH related to paging only in a specific subframe (or frame, slot) according to a DRX cycle configured by a base station or the like. It can be set to perform. Here, the NPDCCH related to paging may mean an NPDCCH scrambled with P-RNTI (Paging Access-RNTI).

Figure 14:
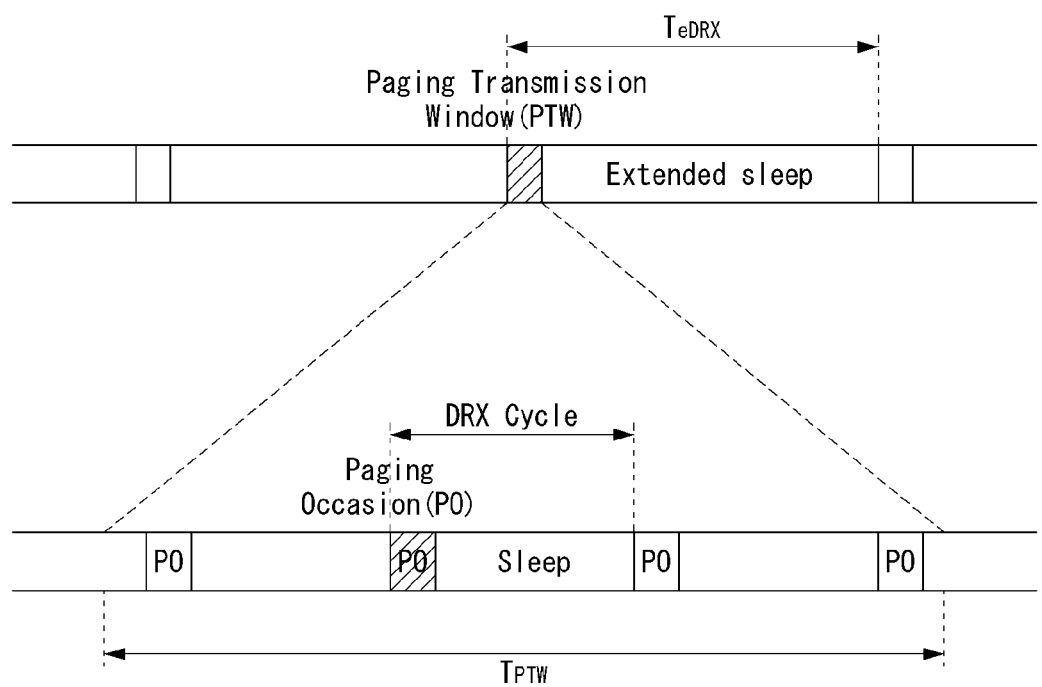
FIG. 14 illustrates an example of a DRX scheme in an idle state and/or an inactive state.

FIG. 14 illustrates an example of a DRX scheme in an idle state and/or an inactive state.

As shown in FIG. 14, the UE in the RRC_IDLE state only monitors some of the Subframes (SFs) with respect to paging (i.e., the paging occasions, PO) within a subset of radio frames (i.e., the paging frames, PF). Paging is used to trigger an RRC connection and to indicate a change in system information for UE in RRC_IDLE mode.

FIG. 15 illustrates an example of a DRX configuration and indication procedure for an NB-IoT terminal.

That is, DRX configuration and instruction for the NB-IoT terminal may be performed as shown in FIG. 15. In addition, FIG. 15 is only for convenience of description and does not limit the method proposed in the present disclosure.

Referring to FIG. 15, the NB-IoT terminal may receive DRX configuration information from a base station (e.g., NodeB, eNodeB, eNB, gNB, etc.) (S210). In this case, the terminal may receive such information from the base station through higher layer signaling (e.g., RRC signaling). Here, the DRX configuration information may include DRX cycle information, DRX offset, and configuration information for timers related to DRX.

Thereafter, the NB-IoT terminal may receive a DRX command from the base station (S220). In this case, the terminal may receive such a DRX command from the base station through higher layer signaling (e.g., MAC-CE signaling).

Upon receiving the above-described DRX command, the NB-IoT terminal may monitor the NPDCCH in a specific time unit (e.g., subframe, slot) according to the DRX cycle (S230). Here, monitoring the NPDCCH may means checking whether it matches (i.e., coincides) the desired value by scrambling corresponding CRC with a predetermined specific RNTI value after decoding the NPDCCH for a specific area according to the DCI format to be received through the corresponding search space.

When the corresponding NMB-IoT terminal receives information indicating its paging ID and/or a change of system information in the NPDCCH through the procedure shown in FIG. 15 described above, the connection (e.g., RRC connection) with the base station is initialized (or re-configured), or It may be configured to receive (or acquire) new system information from the base station.

When the NB-IoT UE detects the NPDCCH using a P-RNTI (Paging Access Radio Network Temporary Identifier) in the PO, the NB-IoT UE decodes the corresponding NPDSCH. The paging message is transmitted through the NPDSCH and may include a list of NB-IoT UEs to be paged and information including whether paging is for connection establishment or system information has been changed. Each NB-IoT UE that finds its ID in this list can transmit it to the paged upper layer and, in turn, receive a command to initiate an RRC connection. When the system information is changed, the NB-IoT UE starts reading SIB1-NB, and information that needs to read SIB again can be obtained from SIB1-NB.

Figure 16:
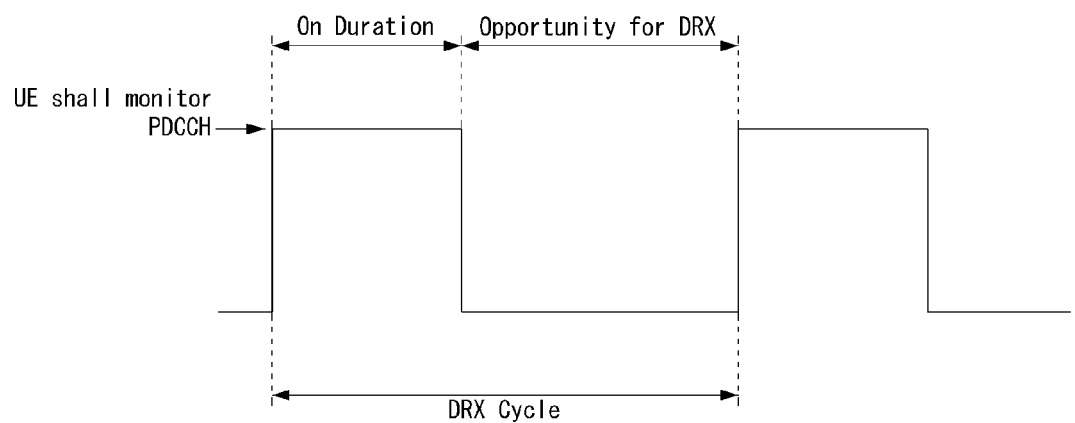
FIG. 16 illustrates an example of a cycle of DRX.

FIG. 16 illustrates an example of a cycle of DRX.

As shown in FIG. 16, the DRX Cycle specifies the periodic repetition of the On Duration followed by a possible period of inactivity. The MAC entity may be configured by RRC with a DRX functionality that controls the UE's PDCCH monitoring activity for the MAC entity's RNTIs (e.g., C-RNTI). Accordingly, the UE monitors the PDCCH for a short period (e.g., On Duration), and may stop monitoring the PDCCH for a long period (e.g., Opportunity for DRX). When in RRC_CONNECTED, if DRX is configured (i.e., Connected Mode DRX, CDRX), the MAC entity is allowed to monitor the PDCCH discontinuously using the DRX operation specified below; otherwise the MAC entity monitors the PDCCH continuously. For NB-IoT, the PDCCH may refer to the NPDCCH. For NB-IoT, an extended DRX cycle of 10.24 s is supported in RRC Connected.

RRC controls DRX operation by configuring the timers onDurationTimer, drx-InactivityTimer, drx-RetransmissionTimer (for HARQ processes scheduled using 1 ms TTI, one per DL HARQ process except for the broadcast process), drx-RetransmissionTimerShortTTI (for HARQ processes scheduled using short TTI, one per DL HARQ process), drx-ULRetransmissionTimer (for HARQ processes scheduled using 1 ms TTI, one per asynchronous UL HARQ process), drx-ULRetransmissionTimerShortTTI (for HARQ processes scheduled using short TTI, one per asynchronous UL HARQ process), the longDRX-Cycle, the value of the drxStartOffset and optionally the drxShortCycleTimer and shortDRX-Cycle. A HARQ RTT timer per DL HARQ process (except for the broadcast process) and UL HARQ RTT Timer per asynchronous UL HARQ process is also defined.

Machine Type Communication (MTC)

MTC (Machine Type Communication) is an application that does not require a large throughput that can be applied to M2M (Machine-to-Machine) or IoT (Internet-of-Things), and refers to the communication technology adopted to meet the requirements of an IoT service in 3GPP.

The MTC may be implemented to satisfy the criteria of (i) low cost & low complexity, (ii) enhanced coverage, and (iii) low power consumption.

In 3GPP, MTC has been applied from release 10, and briefly looks at the features of MTC added for each release of 3GPP.

First, the MTC described in 3GPP release 10 and release 11 relates to a load control method.

The load control method is to prevent IoT (or M2M) devices from suddenly loading the base station.

More specifically, in the case of release 10, the load control method relates to a method of controlling the load by disconnecting the connection to the connected IoT devices when a load occurs in the base station, and in the case of release 11, the load control method relates to a method of blocking access to a terminal in advance by a base station notifying the terminal to access later through broadcasting such as SIB14.

In the case of Release 12, features for low cost MTC were added, and for this purpose, UE category 0 was newly defined. UE category is an indicator of how much data a terminal can process in a communication modem.

That is, a UE of UE category 0 reduces the baseband and RF complexity of the UE by using a half duplex operation with a reduced peak data rate, relaxed RF requirements, and a single receiving antenna.

In Release 13, a technology called eMTC (enhanced MTC) was introduced, and by operating only at 1.08 MHz, which is the minimum frequency bandwidth supported by legacy LTE, the price and power consumption can be further reduced.

The contents described below are mainly eMTC-related features, but can be equally applied to MTC, eMTC, and MTC applied to 5G (or NR) unless otherwise specified. Hereinafter, for convenience of description, it will be collectively referred to as MTC.

Therefore, the MTC to be described later may be referred to eMTC (enhanced MTC), LTE-M1/M2, BL (Bandwidth reduced low complexity)/CE (coverage enhanced), non-BL UE (in enhanced coverage), NR MTC, enhanced BL/CE, etc. as well. That is, the term MTC can be replaced with a term to be defined in the future 3GPP standard.

MTC General Characteristics (1) MTC operates only in a specific system bandwidth (or channel bandwidth).

A specific system bandwidth may use 6RB of legacy LTE as shown in Table 38 below, and may be defined in consideration of the frequency range and subcarrier spacing (SCS) of the NR defined in Tables 39 to 41. The specific system bandwidth may be expressed as a narrowband (NB). For reference, Legacy LTE refers to a part described in 3GPP standards other than MTC. Preferably, in the NR, the MTC may operate using RBs corresponding to the lowest system bandwidth of Tables 40 and 41 below, as in legacy LTE. Alternatively, in NR, the MTC may operate in at least one bandwidth part (BWP) or may operate in a specific band of the BWP.

TABLE 38

| Channel bandwidth [MHz] | 1.4 | 3 | 5 | 10 | 15 | 20 |
|---|---|---|---|---|---|---|
| Transmission bandwidth configuration NRB | 6 | 15 | 25 | 50 | 75 | 100 |

TABLE 39

| Frequency range designation | Corresponding frequency range |
|---|---|
| FR1 | 450 MHz-6000 MHz |
| FR2 | 24250 MHz-52600 MHz |

Table 40 is a table showing an example of the maximum transmission bandwidth configuration (NRB) for the channel bandwidth and SCS in FR 1 of the NR.

TABLE 40

| SCS (kHz) | 5 MHz NRB | 10 MHz NRB | 15 MHz NRB | 20 MHz NRB | 25 MHz NRB | 30 MHz NRB | 40 MHz NRB | 50 MHz NRB | 60 MHz NRB | 80 MHz NRB | 90 MHz NRB | 100 MHz NRB |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

Table 41 is a table showing an example of the maximum transmission bandwidth configuration (NRB) for the channel bandwidth and SCS in FR 2 of the NR.

TABLE 41

| SCS (kHz) | 50 MHz NRB | 100 MHz NRB | 200 MHz NRB | 400 MHz NRB |
|---|---|---|---|---|
| 60 | 66 | 132 | 264 | N.A |
| 120 | 32 | 66 | 132 | 264 |

The MTC narrowband (NB) will be described in more detail.

MTC follows a narrowband operation to transmit and receive physical channels and signals, and the maximum channel bandwidth is reduced to 1.08 MHz or 6 (LTE) RBs.

The narrowband may be used as a reference unit for resource allocation units of some channels of downlink and uplink, and the physical location of each narrowband in the frequency domain may be defined differently according to system bandwidth.

The bandwidth of 1.08 MHz defined in MTC is defined in order for the MTC terminal to follow the same cell search (cell search) and random access procedure as the legacy terminal.

MTC can be supported by cells with a much larger bandwidth (e.g., 10 MHz) than 1.08 MHz, but physical channels and signals transmitted/received by MTC are always limited to 1.08 MHz.

The system having a much larger bandwidth may be a legacy LTE, NR system, 5G system, and the like.

Narrowband is defined as 6 non-overlapping consecutive physical resource blocks in the frequency domain.

If $N_{NB}^{UL} \geq 4$, the wideband is defined as 4 non-overlapping narrowbands in the frequency domain. If $N_{NB}^{UL} <= 4$, $N_{WB}^{UL}=1$ and a single wideband are composed of $N_{NB}^{UL}$ non-overlapping narrowband(s).

For example, in the case of a 10 MHz channel (50 RBs), 8 non-overlapping narrowbands are defined.

Figure 17:
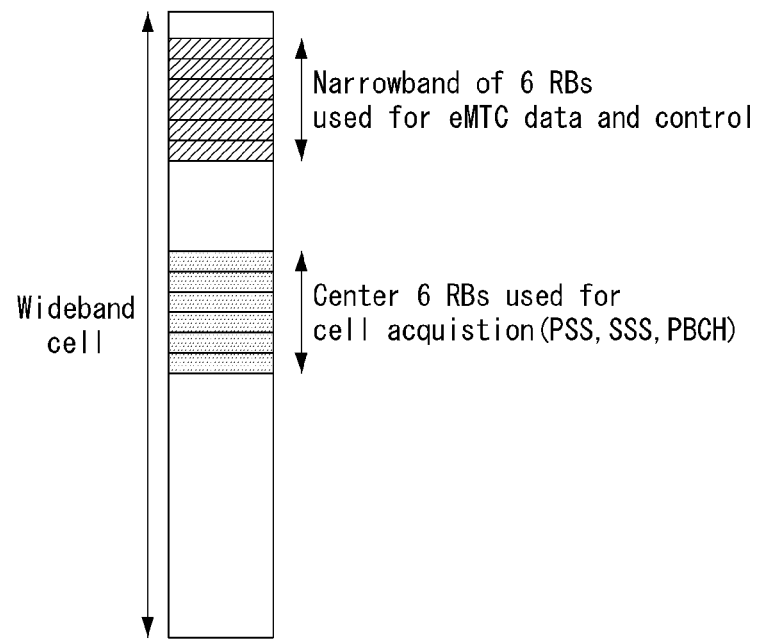
FIG. 17(a) is a diagram illustrating an example of a narrowband operation.
FIG. 17(b) is a diagram illustrating an example of repetition with RF retuning.
Figure 17:
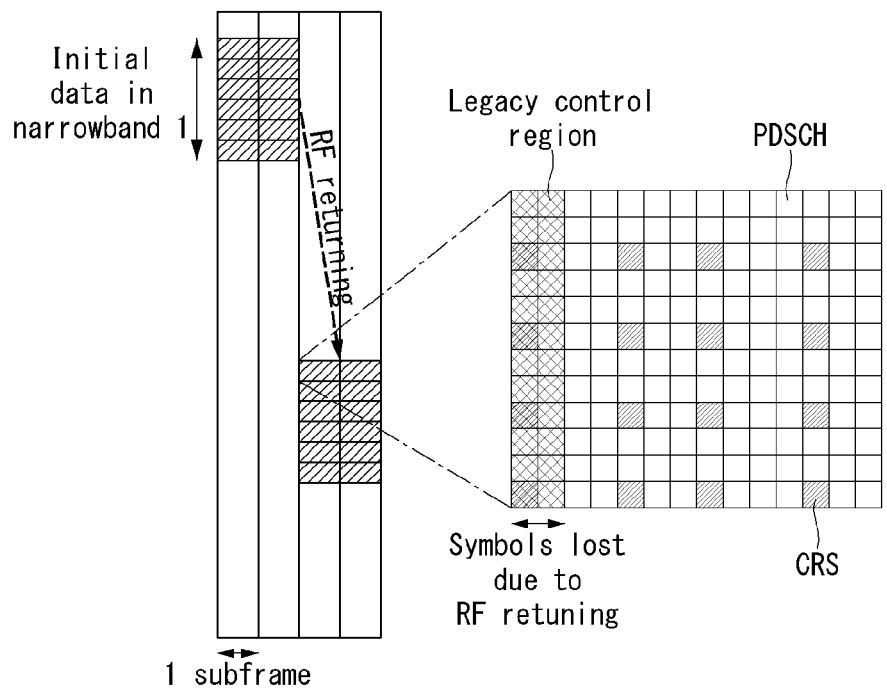

FIG. 17(a) is a diagram illustrating an example of a narrowband operation, and FIG. 17(b) is a diagram illustrating an example of repetition with RF retuning.

With reference to FIG. 17(b), frequency diversity by RF retuning will be described.

Due to the narrowband RF, single antenna and limited mobility, MTC supports limited frequency, spatial and temporal diversity. To reduce the effects of fading and outage, frequency hopping is supported between different narrowbands by RF retuning.

This frequency hopping is applied to different uplink and downlink physical channels when repetition is possible.

For example, when 32 subframes are used for PDSCH transmission, the first 16 subframes may be transmitted on the first narrowband. At this time, the RF front-end is returned to another narrowband, and the remaining 16 subframes are transmitted on the second narrowband.

The narrowband of the MTC may be configured by system information or downlink control information (DCI).

(2) MTC operates in half duplex mode and uses a limited (or reduced) maximum transmit power.

(3) MTC does not use a channel (defined in legacy LTE or NR) that should be distributed over the entire system bandwidth of legacy LTE or NR.

For example, legacy LTE channels not used for MTC are PCFICH, PHICH, and PDCCH.

Accordingly, the MTC cannot monitor the above channels and thus defines a new control channel, MPDCCH (MTC PDCCH).

The MPDCCH spans up to 6RBs in the frequency domain and one subframe in the time domain.

MPDCCH is similar to EPDCCH, and additionally supports common search space for paging and random access.

The MPDCCH is similar to the concept of E-PDCCH used in legacy LTE.

(4) MTC uses a newly defined DCI format, and may be DCI formats 6-0A, 6-0B, 6-1A, 6-1B, 6-2, etc. as an example.

(5) MTC is a PBCH (physical broadcast channel), PRACH (physical random access channel), M-PDCCH (MTC physical downlink control channel), PDSCH (physical downlink shared channel), PUCCH (physical uplink control channel), PUSCH (physical uplink shared channel) can be repeatedly transmitted. Due to such MTC repetition transmission, even when the signal quality or power is very poor, such as in a poor environment such as a basement, the MTC channel can be decoded, resulting in an increase in cell radius and a signal penetration effect. The MTC may support only a limited number of transmission modes (TM) that can operate in a single layer (or single antenna), or can support a channel or a reference signal (RS) that can operate in a single layer. For example, the transmission mode in which the MTC can operate may be TM 1, 2, 6 or 9.

(6) HARQ retransmission of MTC is adaptive and asynchronous, and is based on a new scheduling assignment received on the MPDCCH.

(7) In MTC, PDSCH scheduling (DCI) and PDSCH transmission occur in different subframes (cross subframe scheduling).

(8) All resource allocation information (subframe, transport block size (TBS), subband index) for SIB1 decoding is determined by parameters of MIB, and no control channel is used for SIB1 decoding of MTC.

(9) All resource allocation information (subframe, TBS, subband index) for SIB2 decoding is determined by several SIB1 parameters, and no control channel for SIB2 decoding of MTC is used.

(10) MTC supports extended paging (DRX) cycle.

(11) The MTC can use the same primary synchronization signal (PSS)/secondary synchronization signal (SSS)/common reference signal (CRS) used in legacy LTE or NR. In the case of NR, PSS/SSS is transmitted in units of SS blocks (or SS/PBCH blocks or SSBs), and TRS (tracking RS) can be used for the same purpose as CRS. That is, the TRS is a cell-specific RS and may be used for frequency/time tracking.

MTC Operating Mode and Level

Next, the MTC operation mode and level will be described. MTC is classified into two operation modes (first mode and second mode) and four different levels for coverage enhancement, and may be as shown in Table 42 below.

The MTC operation mode is referred to as CE Mode. In this case, the first mode may be referred to as CE Mode A and the second mode may be referred to as CE Mode B.

TABLE 42

| Mode | Level | Description |
|---|---|---|
| Mode A | Level 1 | No repetition for PRACH |
|  | Level 2 | Small Number of Repetition for PRACH |
| Mode B | Level 3 | Medium Number of Repetition for PRACH |
|  | Level 4 | Large Number of Repetition for PRACH |

The first mode is defined to improve small coverage in which complete mobility and channel state information (CSI) feedback are supported, and thus, there is no repetition or the number of repetitions is small. The operation of the first mode may be the same as the operation range of UE category 1. The second mode is defined for UEs with extremely poor coverage conditions supporting CSI feedback and limited mobility, and a large number of repetitive transmissions are defined. The second mode provides up to 15 dB of coverage enhancement based on the range of UE category 1. Each level of MTC is defined differently in RACH and paging procedure.

It looks at the MTC operation mode and how each level is determined.

The MTC operation mode is determined by the base station, and each level is determined by the MTC terminal. Specifically, the base station transmits RRC signaling including information on the MTC operation mode to the terminal. Here, RRC signaling may be an RRC connection setup message, an RRC connection reconfiguration message, or an RRC connection reestablishment message. Here, the term of the message may be expressed as an information element (IE).

Thereafter, the MTC terminal determines a level within each operation mode and transmits the determined level to the base station. Specifically, the MTC terminal determines the level in the operation mode based on the measured channel quality (e.g., RSRP, RSRQ, or SINR), and informs the determined level to the base station using PRACH resources (frequency, time, preamble) corresponding to the determined level.

MTC Guard Period

As described above, MTC operates in the narrowband. The position of the narrowband may be different for each specific time unit (e.g., subframe or slot). The MTC terminal tunes to a different frequency in all time units. Therefore, a certain time is required for all frequency retuning, and this certain time is defined as the guard period of the MTC. That is, the guard period is required when transitioning from one time unit to the next time unit, and transmission and reception do not occur during the period.

The guard period is defined differently depending on whether it is a downlink or an uplink, and is defined differently according to a downlink or uplink situation. First, the guard period defined in the uplink is defined differently according to the characteristics of data carried by the first time unit (time unit N) and the second time unit (time unit N+1). Next, the guard period of the downlink requires a condition that (1) the first downlink narrowband center frequency and the second narrowband center frequency are different, and (2) in TDD, the first uplink narrowband center frequency and the second downlink center frequency are different.

The MTC guard period defined in Legacy LTE is described, and guard periods of $N_{symb}^{retune}$ SC-FDMA symbols are generated at most for Tx-Tx frequency retuning between two consecutive subframes. If the upper layer parameter ce-RetuningSymbols is configured, $N_{symb}^{retune}$ is equal to ce-RetuningSymbols, otherwise $N_{symb}^{retune}=2$. In addition, for the MTC terminal configured with the upper layer parameter srs-UpPtsAdd, a guard period of the maximum SC-FDMA symbol is generated for Tx-Tx frequency retuning between the first special subframe for frame structure type 2 and the second uplink subframe.

Figure 18:
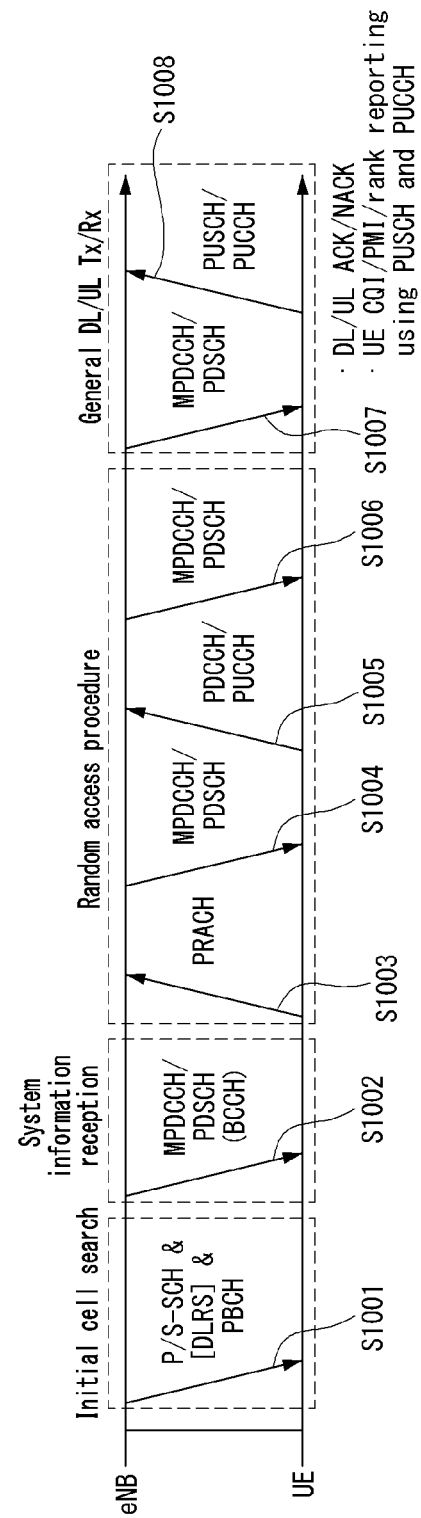
FIG. 18 is a diagram illustrating physical channels that can be used for MTC and a general signal transmission method using them.

FIG. 18 is a diagram illustrating physical channels that can be used for MTC and a general signal transmission method using them.

The MTC terminal, which is powered on again while the power is turned off, or that newly enters the cell, performs an initial cell search operation such as synchronizing with the base station in step S1101. To this end, the MTC terminal receives a Primary Synchronization Signal (PSS) and a Secondary Synchronization Signal (SSS) from the base station, synchronizes with the base station, and acquires information such as a cell identifier (ID). The PSS/SSS used for the initial cell search operation of the MTC may be a legacy LTE PSS/SSS, a Resynchronization signal (RSS), or the like.

Thereafter, the MTC terminal may receive a physical broadcast channel (PBCH) signal from the base station to obtain intra-cell broadcast information.

Meanwhile, the MTC terminal may check a downlink channel state by receiving a downlink reference signal (DL RS) in the initial cell search step. Broadcast information transmitted through PBCH is MIB (Master Information Block), and in MTC, the MIB is repeated in a subframe different from the first slot of subframe #0 of the radio frame (subframe #9 for FDD and subframe #5 for TDD).

PBCH repetition is performed by repeating exactly the same constellation point in different OFDM symbols so that it can be used for initial frequency error estimation even before attempting PBCH decoding.

Figure 19:
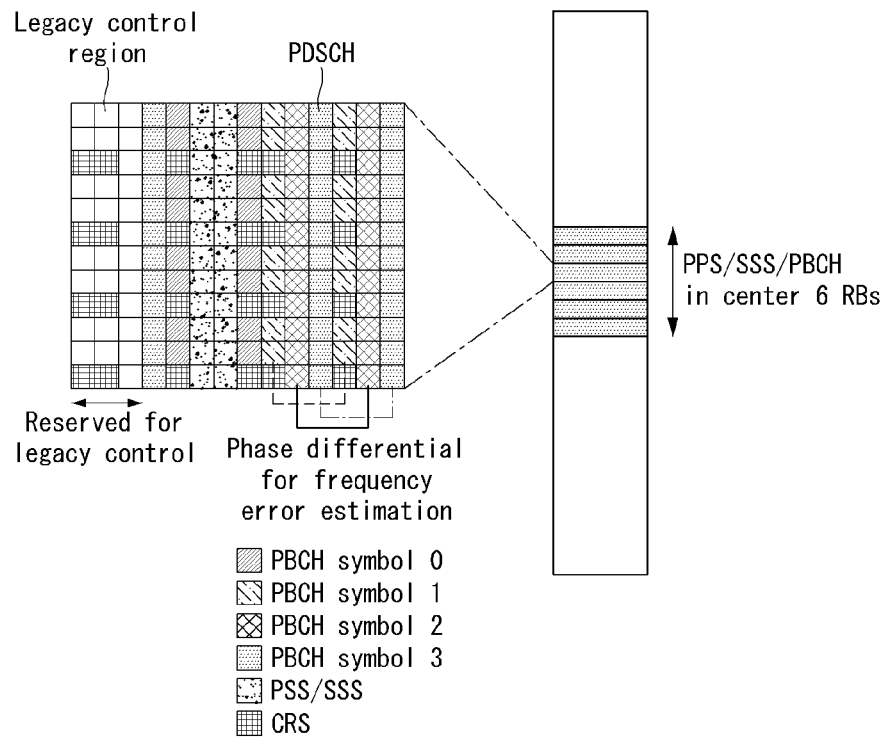
FIG. 19(a) illustrates an example of a frequency error estimation method for a repetition pattern for subframe #0, a general CP, and repeated symbols in FDD.
FIG. 19(b) illustrates an example of transmission of SIB-BR over a broadband LTE channel.
Figure 19:
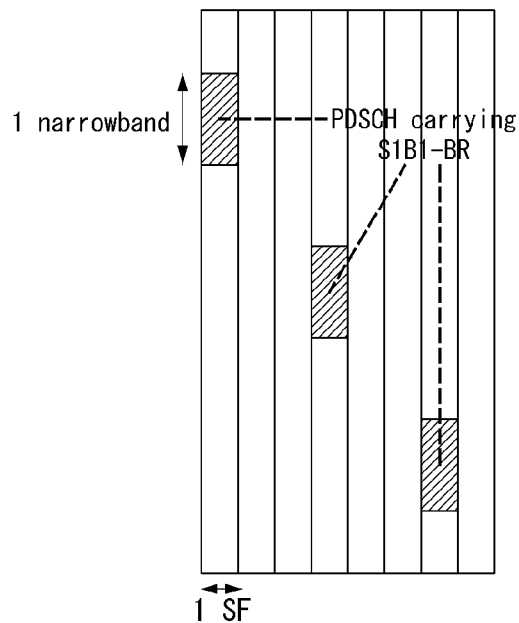

FIG. 19(a) illustrates an example of a frequency error estimation method for a repetition pattern for subframe #0, a general CP, and repeated symbols in FDD, and FIG. 19(b) illustrates an example of transmission of SIB-BR over a broadband LTE channel.

In MIB, five reserved bits are used in MTC to transmit scheduling information for a new system information block for bandwidth reduced device (SIB1-BR) including a time/frequency location and a transport block size.

SIB-BR is transmitted directly on the PDSCH without any control channel associated with it.

The SIB-BR remains unchanged in 512 radio frames (5120 ms) to allow multiple subframes to be combined.

Table 43 is a table showing an example of the MIB.

TABLE 43

```
-- ASN1START
MasterInformationBlock ::=        SEQUENCE {
    dl-Bandwidth                      ENUMERATED {
                                          n6, n15, n25, n50, n75, n100},
    phich-Config                      PHICH-Config,
    systemFrameNumber                 BIT STRING (SIZE (8)),
    schedulingInfoSIB1-BR-r13         INTEGER (0..31),
    systemInfoUnchanged-BR-r15        BOOLEAN,
    spare                             BIT STRING (SIZE (4))
}
-- ASN1STOP
```

In Table 43, the schedulingInfoSIB1-BR field represents an index for a table defining SystemInformationBlockType1-BR scheduling information, and a value of 0 means that SystemInformationBlockType1-BR is not scheduled. The overall function and information carried by SystemInformationBlockType1-BR (or SIB1-BR) is similar to that of legacy LTE SIB1. The contents of SIB1-BR can be classified into (1) PLMN, (2) cell selection criteria, and (3) scheduling information for SIB2 and other SIBs.

After completing the initial cell search, the MTC terminal may receive the MPDCCH and the PDSCH according to the MPDCCH information in step S1102 to obtain more detailed system information. For MPDCCH, (1) it is very similar to EPDCCH, carries common and UE specific signaling, (2) it can be transmitted only once or can be transmitted repeatedly (the number of repetitions is configured by higher layer signaling), (3) A number of MPDCCHs are supported, and the UE monitors the set of MPDCCHs, (4) it is formed by an aggregation of an enhanced control channel element (eCCE), each eCCE includes a set of resource elements, (5) RA-RNTI (Radio Network Temporary Identifier), SI-RNTI, P-RNTI, C-RNTI, temporary C-RNTI, and semi-persistent scheduling (SPS) C-RNTI are supported.

Thereafter, the MTC terminal may perform a random access procedure such as steps S1103 to S1106 in order to complete access to the base station. The basic configuration related to the RACH procedure is transmitted by SIB2. In addition, SIB2 includes parameters related to paging. Paging Occasion (PO) is a subframe in which P-RNTI can be transmitted on the MPCCH. When the P-RNTI PDCCH is repeatedly transmitted, PO refers to the start subframe of the MPDCCH repetition. The paging frame (PF) is one radio frame and may include one or a plurality of POs. When DRX is used, the MTC terminal monitors only one PO per DRX cycle. Paging NarrowBand (PNB) is one narrowband, and the MTC terminal performs paging message reception.

To this end, the MTC terminal may transmit a preamble through a physical random access channel (PRACH) (S1103) and receive a response message (RAR) to the preamble through the MPDCCH and a corresponding PDSCH (S1104). In the case of contention-based random access, the MTC terminal may perform a contention resolution procedure such as transmission of an additional PRACH signal (S1105) and reception of an MPDCCH signal and a PDSCH signal corresponding thereto (S1106). Signals and/or messages (Msg 1, Msg 2, Msg 3, Msg 4) transmitted in the RACH procedure in MTC may be repeatedly transmitted, and this repetition pattern is configured differently according to the CE level. Msg 1 may mean PRACH preamble, Msg 2 may mean RAR (random access response), Msg 3 may mean UL transmission of the MTC terminal for RAR, and Msg 4 may mean DL transmission of the base station for Msg 3.

For random access, signaling for different PRACH resources and different CE levels is supported. This provides the same control of the near-far effect for the PRACH by grouping together UEs experiencing similar path loss. Up to four different PRACH resources may be signaled to the MTC terminal.

The MTC terminal estimates the RSRP using a downlink RS (e.g., CRS, CSI-RS, TRS, etc.), and selects one of the resources for random access based on the measurement result. Each of the four resources for random access has a relationship with the number of repetitions for the PRACH and the number of repetitions for the random access response (RAR).

Therefore, the MTC terminal with bad coverage needs a large number of repetitions to be successfully detected by the base station, and needs to receive an RAR having a corresponding repetition number to satisfy their coverage level.

Search spaces for RAR and contention resolution messages are also defined in the system information and are independent for each coverage level.

And, the PRACH waveform used in MTC is the same as the PRACH waveform used in legacy LTE (e.g., OFDM and Zadof-Chu sequence).

After performing the above-described procedure, the MTC terminal receives MPDCCH signal and/or PDSCH signal (S1107) and transmits physical uplink shared channel (PUSCH) signal and/or physical uplink control channel (PUCCH) (S1108) as a general uplink/downlink signal transmission procedure. Control information transmitted from the MTC terminal to the base station is collectively referred to as uplink control information (UCI). UCI may include HARQ-ACK/NACK, scheduling request (SR), channel quality indicator (CQI), precoding matrix indicator (PMI), rank indication (RI) information, etc.

When the RRC connection to the MTC terminal is established, the MTC terminal blind-decodes the MPDCCH in a search space configured to obtain uplink and downlink data allocation.

MTC uses all OFDM symbols available in a subframe to transmit DCI. Therefore, time domain multiplexing between the control channel and the data channel in the same subframe is impossible. That is, as discussed above, cross-subframe scheduling between the control channel and the data channel is possible.

The MPDCCH having the last repetition in subframe #N schedules PDSCH allocation in subframe #N+2.

The DCI transmitted by the MPDCCH provides information on how many times the MPDCCH is repeated so that the MTC terminal knows when PDSCH transmission starts.

PDSCH allocation can be performed in different narrowbands. Therefore, the MTC terminal needs to retune before decoding the PDSCH allocation.

For uplink data transmission, scheduling follows the same timing as legacy LTE. Here, the last MPDCCH in subframe #N schedules PUSCH transmission starting in subframe #N+4.

FIG. 20 is a diagram illustrating an example of scheduling for each of the MTC and legacy LTE.

Legacy LTE allocation is scheduled using the PDCCH, which uses the first OFDM symbols in each subframe, and the PDSCH is scheduled in the same subframe as the subframe in which the PDCCH is received.

In contrast, the MTC PDSCH is scheduled for cross-subframe, and one subframe is defined between the MPDCCH and the PDSCH to allow MPDCCH decoding and RF retuning.

The MTC control channel and data channels may be repeated through a large number of subframes having a maximum of 256 subframes for the MPDCCH and a maximum of 2048 subframes for the PDSCH so as to be decoded under extreme coverage conditions.

Cell Search of MTC

Hereinafter, the (initial) cell search (cell search) procedure of MTC in step S1001 of FIG. 18 will be described in more detail.

Cell search is the procedure by which a UE acquires time and frequency synchronization with a cell and detects the cell ID of that cell. E-UTRA cell search supports a scalable overall transmission bandwidth corresponding to 6 RBs and upwards. PSS and SSS are transmitted in the downlink to facilitate cell search. If a resynchronization signal is transmitted in the downlink, it can be used to re-acquire time and frequency synchronization with the cell. Physical layer provides 504 unique cell identities using synchronization signals.

The UE searches for the PSS/SSS in the center 6 PRBs to obtain the cell ID, subframe timing information, duplexing mode (time division duplex (TDD), or frequency division duplex (FDD)), and cyclic prefix (CP) length. The PSS uses Zadoff-Chu (ZC) sequence. For frame structure type 1 (i.e. FDD), the PSS shall be mapped to the last orthogonal frequency division multiplexing (OFDM) symbol in slots 0 and 10. For frame structure type 2 (i.e. TDD), the PSS shall be mapped to the third OFDM symbol in subframes 1 and 6. The SSS uses an interleaved concatenation of two length-31 binary sequences. The concatenated sequence is scrambled with a scrambling sequence given by the PSS. For FDD, the SSS shall be mapped OFDM symbol number NsymbDL-2 in slots 0 and 10, where NsymbDL is the number of OFDM symbols in a downlink slot. For TDD, the SSS shall be mapped OFDM symbol number NsymbDL-1 in slots 1 and 11, where NsymbDL is the number of OFDM symbols in a downlink slot.

System Information Acquisition of MTC

Hereinafter, a procedure for obtaining system information of the MTC in step S1002 of FIG. 18 will be described in more detail.

FIG. 21 illustrates a general system for a system information acquisition procedure.

Upon searching the cell by using the PSS/SSS, the UE acquires system information (SI).

The UE applies the system information acquisition procedure to acquire the access stratum (AS)- and non-access stratum (NAS)-system information that is broadcasted by the E-UTRAN. The procedure applies to UEs in RRC_IDLE and UEs in RRC_CONNECTED.

System information is divided into master information block (MIB; MasterInformationBlock) and a number of system information blocks (SIBs). The MIB defines the most essential physical layer information of the cell required to receive further system information. The MIB is transmitted on PBCH. SIBs other than system information block type-1 (SIB1; SystemInformationBlockType1) are carried in SI messages and mapping of SIBs to SI messages is flexibly configurable by schedulingInfoList included in SystemInformationBlockType1, with restrictions that: each SIB is contained only in a single SI message, and at most once in that message; only SIBs having the same scheduling requirement (periodicity) can be mapped to the same SI message; system information block type-1 (SIB2; SystemInformationBlockType2) is always mapped to the SI message that corresponds to the first entry in the list of SI messages in schedulingInfoList. There may be multiple SI messages transmitted with the same periodicity. SystemInformationBlockType1 and all SI messages are transmitted on DL-SCH. The BL UEs and UEs in CE apply BR version of the SIB or SI messages, e.g. SystemInformationBlockType1-BR.

The MIB uses a fixed schedule with a periodicity of 40 ms and repetitions made within 40 ms. The first transmission of the MIB is scheduled in subframe #0 of radio frames for which the SFN mod 4=0, and repetitions are scheduled in subframe #0 of all other radio frames. For TDD/FDD system with a bandwidth larger than 1.4 MHz that supports BL UEs or UEs in CE, MIB transmission may additionally be repeated in subframe #0 of the same radio frame, and subframe #5 of the same radio frame for FDD and TDD.

The SystemInformationBlockType1 contain information relevant when evaluating if a UE is allowed to access a cell and defines the scheduling of other system information blocks. The SystemInformationBlockType1 uses a fixed schedule with a periodicity of 80 ms and repetitions made within 80 ms. The first transmission of SystemInformationBlockType1 is scheduled in subframe #5 of radio frames for which the SFN mod 8=0, and repetitions are scheduled in subframe #5 of all other radio frames for which SFN mod 2=0.

For BL UEs or UEs in CE, MIB is applied which may be provided with additional repetitions, while for SIB1 and further SI messages, separate messages are used which are scheduled independently and with content that may differ. The separate instance of SIB1 is named as SystemInformationBlockType1-BR. The SystemInformationBlockType1-BR include information such as valid downlink and uplink subframes, maximum support of coverage enhancement, and scheduling information for other SIBs. The SystemInformationBlockType1-BR is transmitted over PDSCH directly, without any control channel associated with it. The SystemInformationBlockType1-BR uses a schedule with a periodicity of 80 ms. Transport block size (TBS) for SystemInformationBlockType1-BR and the repetitions made within 80 ms are indicated via schedulingInfoSIB1-BR in MIB or optionally in the RRCConnectionReconfiguration message including the MobilityControlInfo. Specifically, five reserved bits in the MIB are used in eMTC to convey scheduling information about SystemInformationBlockType1-BR, including time and frequency location, and transport block size. SIB-BR remains unchanged for 512 radio frames (5120 ms) to allow a large number of subframes to be combined.

The SI messages are transmitted within periodically occurring time domain windows (referred to as SI-windows) using dynamic scheduling. Each SI message is associated with a SI-window and the SI-windows of different SI messages do not overlap. That is, within one SI-window only the corresponding SI is transmitted. The length of the SI-window is common for all SI messages, and is configurable. Within the SI-window, the corresponding SI message can be transmitted a number of times in any subframe other than multimedia broadcast multicast service single frequency network (MBSFN) subframes, uplink subframes in TDD, and subframe #5 of radio frames for which SFN mode. The UE acquires the detailed time-domain scheduling (and other information, e.g. frequency-domain scheduling, used transport format) from decoding system information radio network temporary identity (SI-RNTI) on PDCCH. For a BL UE or a UE in CE, the detailed time/frequency domain scheduling information for the SI messages is provided in SystemInformationBlockType1-BR.

The SystemInformationBlockType2 contains common and shared channel information.

Random Access Procedure of MTC

Hereinafter, a random access procedure of MTC in steps S1003 to S1006 of FIG. 18 will be described in more detail.

The random access procedure is performed for the following events:

Initial access from RRC_IDLE;
RRC Connection Re-establishment procedure;
Handover;
DL data arrival during RRC_CONNECTED requiring random access procedure;
UL data arrival during RRC_CONNECTED requiring random access procedure;
For positioning purpose during RRC_CONNECTED requiring random access procedure.

FIG. 22 illustrates a contention-based random access procedure.

A random access preamble (may be referred to as "Msg1") is transmitted over PRACH. A UE randomly selects one random access preamble from a set of random access preambles indicated by system information or a handover command, selects a PRACH resource able to transmit the random access preamble, and transmits the same.

The physical layer random access preamble consists of a cyclic prefix of length TCP and a sequence part of length TSEQ. The parameter values are listed in Table 44 below and depend on the frame structure and the random access configuration. Higher layers control the preamble format.

TABLE 44

| Preamble format | Tcp | TsEQ |
| --- | --- | --- |
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |
| 4 | $448 \cdot T_s$ | $4096 \cdot T_s$ |

Discontinuous Reception Procedure of MTC

During the general signal transmission/reception procedure of the MTC described above, the MTC terminal is in an idle state (e.g., RRC_IDLE state) and/or an inactive state (e.g., RRC_INACTIVE state) in order to reduce power consumption. In this case, the MTC terminal transitioned to the idle state and/or the inactive state may be configured to use the DRX scheme. For example, the MTC terminal that has been transitioned to the idle state and/or the inactive state may be configured to perform monitoring of the MPDCCH related to paging only in a specific subframe (or frame, slot) according to a DRX cycle configured by a base station, etc. Here, the MPDCCH related to paging may mean an MPDCCH scrambled with P-RNTI (Paging Access-RNTI).

FIG. 23 illustrates an example of a DRX scheme in an idle state and/or an inactive state.

As shown in FIG. 23, the MTC UE in the RRC_IDLE state monitors only some subframes (SF) in relation to paging (i.e., paging opportunity, PO) within a subset of radio frames (i.e., paging frame, PF). Paging is used to trigger RRC connection and indicate a change in system information for the UE in RRC_IDLE mode.

In addition, DRX configuration and indication for the MTC terminal may be performed as shown in FIG. 24.

FIG. 24 illustrates an example of a DRX configuration and indication procedure for an MTC terminal. In addition, FIG. 24 is merely for convenience of description and does not limit the method proposed in the present disclosure.

Referring to FIG. 24, the MTC terminal may receive DRX configuration information from a base station (e.g., NodeB, eNodeB, eNB, gNB, etc.) (S210). In this case, the MTC terminal may receive such information from the base station through higher layer signaling (e.g., RRC signaling). Here, the DRX configuration information may include DRX cycle information, DRX offset, and configuration information for timers related to DRX.

Thereafter, the MTC terminal may receive a DRX command from the base station (S220). In this case, the UE may receive such a DRX command from the base station through higher layer signaling (e.g., MAC-CE signaling).

The MTC terminal received the above-described DRX command may monitor the MPDCCH in a specific time unit (e.g., subframe, slot) according to the DRX cycle (S230). Here, monitoring the MPDCCH may means checking whether it matches (i.e., coincides) the desired value by scrambling corresponding CRC with a predetermined specific RNTI value after decoding the MPDCCH for a specific area according to the DCI format to be received through the corresponding search space.

When the corresponding MTC terminal receives information indicating its paging ID and/or a change of system information in the MPDCCH through the procedure shown in FIG. 24 described above, the connection (e.g., RRC connection) with the base station is initialized (or re-configured), or It may be configured to receive (or acquire) new system information from the base station.

FIG. 25 illustrates an example of a DRX cycle.

As shown in FIG. 25, the DRX Cycle specifies the periodic repetition of the On Duration followed by a possible period of inactivity. The MAC entity may be configured by RRC with a DRX functionality that controls the UE's PDCCH monitoring activity for the MAC entity's RNTIs (e.g., C-RNTI). Accordingly, the MTC UE monitors the PDCCH for a short period (e.g., On Duration), and may stop monitoring the PDCCH for a long period (e.g., Opportunity for DRX). When in RRC_CONNECTED, if DRX is configured (i.e., Connected Mode DRX, CDRX), the MAC entity is allowed to monitor the PDCCH discontinuously using the DRX operation specified below. Otherwise the MAC entity monitors the PDCCH continuously. For MTC, the PDCCH may refer to the MPDCCH. For MTC, an extended DRX cycle of 10.24 s is supported in RRC Connected.

Abbreviation

Before describing the method proposed in the present disclosure, abbreviations and definitions of terms to be described later are summarized.

MIB-NB: masterinformationblock-narrowband
SIB 1-NB: systeminformationblock1-narrowband
CRS: cell specific reference signal or common reference signal
ARFCN: absolute radio-frequency channel number
PRB: physical resource block
PRG: precoding resource block group
PCI: physical cell identifier
N/A: non-applicable
EARFCN: E-UTRA absolute radio frequency channel number
RRM: radio resource management
RSRP: reference signal received power
RSRQ: reference signal received quality
TBS: transport block size
TDD/FDD: time division duplex/frequency division duplex Definition NB-IoT: NB-IoT allows access to network services through E-UTRA with a channel bandwidth limited to 200 kHz.

NB-IoT in-band operation: NB-IoT operates in-band when using resource block(s) in a normal E-UTRA carrier.

NB-IoT guard band operation: NB-IoT operates as a guard band when using resource block(s) not used in the guard band of the E-UTRA carrier.

NB-IoT standalone operation: NB-IoT operates standalone when using its own spectrum. For example, the spectrum currently used by the GERAN system on behalf of one or more GSM carriers and the spectrum that is scattered for potential IoT deployments.

Anchor carrier: In NB-IoT, the carrier assumes that NPSS/NSSS/NPBCH/SIB-NB for FDD or NPSS/NSSS/NPBCH for TDD is transmitted.

Non-anchor carrier: In NB-IoT, a carrier that does not assume that NPSS/NSSS/NPBCH/SIB-NB for FDD or NPSS/NSSS/NPBCH for TDD is transmitted.

Channel raster: The smallest unit in which the terminal reads resources. In the case of the LTE system, the channel raster (channel raster) has a value of 100 kHz.

In addition, '/' described in the present disclosure can be interpreted as 'and/or', and 'A and/or B' may be interpreted as having the same meaning as 'including at least one of A or (and/or) B'.

The present disclosure provides a method for improving the mobility of LTE-MTC (Machine Type Communication)

by improving measurement performance such as Received Signal Received Power (RSRP)/Received Signal Received Quality (RSRQ).

More specifically, a method of improving the mobility of LTE-MTC is provided by utilizing a resynchronization signal (RSS) introduced in order to reduce system acquisition time for measurement such as RSRQ/RSRP.

In order to provide a method of improving the mobility of MTC, the present disclosure proposes the following three methods.

First, the present disclosure proposes a method (Method 1) of configuring a port of the RSS to measure RSRP/RSRQ by using a cell specific reference signal (CRS) and the RSS together, unlike conventional measuring RSRP/RSRQ using only the CRS.

Second, the present disclosure proposes a method (Method 2) of configuring the RSS and a measurement gap (MG) to use the RSS for measurement.

Third, the present disclosure proposes a method (Method 3) for the UE to perform measurement using the CRS and/or the RSS.

Hereinafter, the meaning of a serving cell may mean a cell in which a user equipment (UE) performs a (re-) connection establishment procedure through an initial access.

Alternatively, the serving cell may mean a primary cell or the like depending on a system, and may mean a reference cell in a more general sense.

Method of Configuring RSS Port for Measurement (Method 1)

The RSS introduced for system acquisition time reduction has no certain restrictions on the use of the RSS port except that the RSS transmission port is maintained for 2 subframes.

That is, without limitation on which antenna port is used for RSS transmission, when an RSS transmission port is determined, the determined RSS transmission port needs to be maintained for 2 frames.

However, exceptionally, when the CRS is transmitted through one port, it is mandatory to use the same port as the CRS transmission port as the RSS port.

In this case, when measuring RSRP/RSRQ using the RSS in addition to the CRS, that is, when both the CRS and the RSS are used for RSRP/RSRQ measurement, the RSS port may be configured to use CRS port 0.

Hereinafter, when measuring RSRP/RSRQ using both the CRS and the RSS, a method of configuring an RSS port will be described in more detail.

Proposal 1) Method to Fix the RSS Port to CRS Port 0

In this proposal, the same port as the CRS transmission port is used as the RSS transmission port.

That is, the terminal always performs measurement using the RSS and the CRS configured to be transmitted on the same port.

For example, CRS port 0 may be configured as a port through which the RSS and the CRS are transmitted.

This proposal is the simplest way to remove the port ambiguity of the RSS and the CRS.

Proposal 2) Method to Fix the RSS Port to 2 CRS Ports

This proposal is a method of fixing the port through which the RSS is transmitted to two CRS ports.

For example, the two CRS ports may be CRS port 1 and CRS port 2.

Since the port through which the RSS is transmitted is fixed to two CRS ports, there is an advantage in that it is possible to transmit Tx (Transmission) diversity of the RSS compared to the method of Proposal 1 above.

Proposal 3) Method to Determine the RSS Port by Performing Port Cycling within 2 CRS Ports or 4 CRS Ports.

This proposal is a method of performing port cycling in a time direction within two CRS ports or four CRS ports in order to determine the RSS port.

The RSS port cycling in the time direction may be performed in a predetermined unit. For example, the predetermined unit may be 2 subframes, which is the same as the conventional fixed RSS port unit. In addition, in order to quickly obtain a spatial diversity gain, it may be in an Orthogonal Frequency Division Multiplexing Symbol (OFDM) symbol unit, a slot unit, or one subframe unit. Alternatively, it may be a unit of multiple subframes configured with Radio Resource Control (RRC).

The port cycling may be performed in a frequency direction. The unit of the port cycling may be, for example, a resource block (RB) unit or a narrow band (NB) unit.

FIG. 26 is a diagram illustrating an example of a method of determining an RSS port by performing port cycling within CRS ports.

In FIG. 26, the port cycling may be performed within four CRS ports. The four CRS ports include port 0/port 1/port 2/port 3, the minimum unit of RSS configuration is 8 ms, and the RSS port may be maintained for a duration of 2 subframe.

Each of #1 to #8 represents one subframe, and the time length of one subframe is 1 ms. The RSS port cycling sequence for each subframe may be defined as follows. Port 0→Port 0→Port 1→Port 1→Port 2→Port 2→Port 3→Port 3.

In addition to the RSS port cycling within the CRS ports, this proposal includes that each port of the CRS port and each port (and precoding) of the RSS are configured to have a Quasi Co-Location (QCL) relationship with 1:1 or 1:M (M>1) and the port cycling between each port of the RSS having the QCL relationship with each port of the CRS port is performed.

When each port of the CRS and each port (and precoding) of the RSS have a QCL relationship with 1:1, it means that one port of the RSS is QCLed to one port of the CRS. In addition, when each port of the CRS and each port of the RSS have a QCL relationship with 1:M (M>1), it means that the M RSS ports are QCLed in one port of the CRS.

This proposal has an effect of obtaining a space diversity gain during RSS transmission.

Proposal 4) QCL Assumption Setup Between RSS Port and CRS Port

This proposal does not allow the RSS port to be determined as one of the CRS ports, but this proposal is a method of configuring to satisfy only the QCL relationship between the RSS port and the CRS port under the assumption that there is no significant difference in a short term or a long term in terms of RSRP/RSRQ measurement.

As in the above proposal 3, for spatial diversity, port (and precoding) cycling can be applied under the assumption of the QCL relationship.

Regarding the method of configuring an RSS port for measurement of a terminal, as discussed in the proposals 1 to 4, the base station (eNB) may signal information related to the RSS port configuration in order to provide flexibility according to the situation with respect to the method of configuration an RSS port. The Information related to the RSS configuration may be expressed as 'RSS port configuration information'.

There are three methods of signaling the RSS port configuration information as follows.

First, the base station can directly transmit port information to the terminal. For example, one of the proposals 1 to 3 may be directly indicated to the terminal.

Second, the base station may transmit RSS transmission mode information to the terminal. The transmission mode may be RSS port Tx diversity on/off, RSS port cycling on/off, or the like.

Third, the base station may transmit QCL on/off information to the terminal. For example, the QCL off information may be used for the purpose of commanding (or recommending) that the UE does not use the RSS for measurement.

RSS Configuration or Measurement Configuration Method_(Method 2)

In this method, in order to improve the RSRP/RSRQ measurement performance using the RSS, when a base station indicates a measurement configuration (hereinafter, referred to as MC) to a terminal, a method of transmitting measurement configuration information is proposed.

The measurement configuration information is configuration information for the UE to measure RSRP and/or RSRQ. Hereinafter, the measurement configuration information may be referred to as "configuration information".

When the base station indicates the terminal to be MC, it may mean that the base station transmits the configuration information so that the terminal performs measurement.

The configuration information for the RSRP and/or RSRQ measurement of the terminal may include (1) RSS power boosting information, (2) RSS configuration information, (3) RSS transmission information, and (4) RSS sequence information (including RSS cover code information), (5) CRS port information (referred to as CRS port configuration information), and the like.

The RSS power boosting information may be information related to a power ratio of the CRS to the RSS (RSS-to-CRS power ratio), and the RSS sequence information may include RSS cover code information.

Information including information related to an antenna port through which a reference signal is transmitted may be referred to as "port configuration information". Among the information (1) to (5), CRS port configuration information related to an antenna port through which the CRS is transmitted may be included in the port configuration information. In addition, the RSS port configuration information described above may also be included in the port configuration information.

Information including information used for measurement, such as information related to a relationship between the CRS and the RSS, may be referred to as 'measurement configuration information. Information (1) to (4) of the information (1) to (5) may be included in the measurement configuration information.

In summary, the configuration information may be expressed as including the port configuration information and the measurement configuration information.

The port configuration information includes information related to an antenna port through which a reference signal is transmitted.

Information related to the antenna port through which the reference signal is transmitted includes the CRS port configuration information and the RSS port configuration information.

The measurement configuration information includes information used for measurement, such as information related to a relationship between the CRS and the RSS.

The information used for the measurement may include the RSS power boosting information, the RSS configuration information, the RSS transmission information, and the RSS sequence information (RSS cover code information).

The configuration information may be configured for each component carrier (CC) or cell to be measured. That is, the MC information may be configured for each CC or cell.

The configuration information may be configured for each CC or cell for all or some CCs or cells of inter-frequency and/or intra-frequency.

All or part of the information (1) to (5) included in the configuration information is not configured for each CC or cell, but all or some of the information (1) to (5) may be configured as information commonly applied to CCs or cells.

That is, all or some of the information (1) to (5) included in the configuration information is not configured for each of a plurality of cells, but may be applied in common to the plurality of cells.

For convenience of description, the information (1) to (5) may be referred to as "measurement related information" or "measurement object", respectively.

Hereinafter, each of the measurement-related information will be described in detail.

RSS Power Boosting Information

In order to apply the RSS to RSRP/RSRQ measurement, the configuration information should include RSS power reference or power boosting information.

The RSS power reference or power boosting information may be an RSS value relative to the CRS power, and may be expressed as an RSS-to-CRS power ratio.

The terminal may assume the same value as the serving cell for a cell in which the RSS power reference or power boosting information is not configured.

Alternatively, the terminal may not expect to receive the RSS in the cell for which the RSS power reference or power boosting information is not configured, or may not use the RSS when measuring in the cell.

RSS Configuration Information

The RSS configuration information is information indicating whether the RSS is supported for each CC or cell, or whether RSRP/RSRQ measurement is supported using the RSS.

The terminal may determine whether to perform measurement using only the CRS or perform measurement using the CRS and/or the RSS in the cell or CC based on the RRS configuration information.

When the RSS configuration is different for each CC or cell, the base station or the terminal may operate as follows.

The base station relaxes the RSRP/RSRQ measurement requirement for a CC or cell in which the RSS is not supported or RSRP/RSRQ measurement using the RSS is not supported.

The base station may differently configure a duration and/or a period of the MG pattern (Measurement Gap pattern) according to whether the RSS is supported or whether RSRP/RSRQ measurement is supported using the RSS.

For example, when the RSS is supported or RSRP/RSRQ measurement using the RSS is supported, the base station can configure the MG pattern having a short MG duration and/or a large MG period in order to improve measurement performance through using the RSS.

Conversely, when the RSS is not supported or RSRP/RSRQ measurement using the RSS is not supported, in order to prevent performance reduction due to non-use of the RSS, the MG pattern having a long MG duration and/or a short MG period may be configured.

In addition, the base station may selectively apply the new MC(s) or the RSS configuration method(s) described below according to whether the RSS is supported or whether RSRP/RSRQ measurement is supported using the RSS.

If the RSS is not supported or RSRP/RSRQ measurement using the RSS is not supported, the base station may apply (additional) power boosting of the CRS to prevent performance reduction due to non-use of the RSS.

The (additional) power boosting of the CRS has the effect of offsetting the decrease in measurement performance due to not using the RSS.

The base station may process the reliability of the measured value differently depending on whether each CC or cell supports the RSS or whether RSRP/RSRQ measurement using the RSS is supported.

For example, the base station applies differently a decision threshold for cell selection/reselection of the terminal, or when determining cell selection/reselection based on a measured value, a confidence count (count) values are applied differently.

Since the RSS is a cell-specific value, in order to apply the RSS to RSRP/RSRQ measurement, the configuration information should include the RSS configuration information.

The terminal may assume the same configuration as the serving cell for a cell in which the RSS configuration information is not configured. Alternatively, the terminal does not use the RSS when measuring in the cell for a cell in which the RSS configuration information is not configured.

RSS Transmission Information

The RSS transmission information may include an RSS transmission duration and subframe information capable of RSS transmission.

The RSS transmission duration and subframe (hereinafter, referred to as RSS subframe) information capable of RSS transmission included in the RSS transmission information may be directly indicated to the terminal in a form of a bitmap. The RSS transmission duration information may be an RSS timing offset or a starting subframe number (SFN).

The terminal receiving the RSS transmission duration and RSS subframe information included in the RSS transmission information in the form of the bitmap may know that RSS transmission is not possible for the remaining duration or subframes. In addition, the RSS transmission duration and RSS subframe information included in the RSS transmission information may be indirectly indicated in a form of a bandwidth reduced low complexity (BL)/Coverage Enhancement (CE) DL subframe bitmap or a Multimedia Broadcast Single Frequency Network (MBSFN) subframe bitmap.

When the terminal receives the RSS transmission duration and RSS subframe information included in the RSS transmission information in the form of the BL/CE DL subframe bitmap, the terminal may know that the RSS is transmitted for only the BL/CE DL subframe, and the remaining duration is postponed or punctured.

In addition, when the terminal receives the RSS transmission duration and RSS subframe information included in the RSS transmission information in the form of the MBSFN subframe bitmap, the terminal may know that the RSS is transmitted only in the non-MBSFN subframe and an MBSFN duration is postponed or punctured. Alternatively, the RSS transmission information may be in a form of an RSS duration, a period and a time offset.

The RSS transmission duration or RSS subframe information is information that counts only a valid duration or subframe in which an actual RSS transmission is possible, or a duration or subframes that includes an invalid duration or subframe in terms of RSS transmission between a start and an end of RSS transmission.

RSS Sequence Information

The RSS sequence consists of a random sequence and a subframe-level cover code.

The RSS random sequence is initialized by cell ID (Physical Cell ID or Virtual CID) information and SI (system information) update information.

The SI update information may be a higher layer parameter 'systemInfoUnchanged-BR-R15'. Therefore, the configuration information may include the cell ID information and the SI update information so that an RSS sequence for a specific cell can be reproduced.

The SI update information may be a higher layer parameter systemInfoUnchanged-BR-R15 and/or an SI validity timer value. In addition, the configuration information should include RSS subframe-level cover code information.

If the RSS subframe-level cover code information has a 1:1 mapping relationship with the RSS subframe length, it may be replaced with information corresponding to the RSS subframe length. Alternatively, when using the RSS for neighbor cell measurement, 'systemInfoUnchanged-BR' may be allowed to be assumed to be a specific value. The specific value may be true or false.

CRS Port Configuration Information

In the case of conventional neighbor cell measurement using the CRS, CRS port 0 is assumed.

As the base station additionally transmits CRS port configuration information to the terminal, the terminal can expect improvement measurement performance due to an increase in the number of CRS resource elements (REs) used for measurement.

The CRS port configuration information may include information on the number of ports through which the CRS is transmitted.

The RSS transmission RE in the RSS subframe may be punctured by the CRS.

When the CRS port configuration information is not configured, the UE may operate assuming a maximum CRS port when measuring RSRP/RSRQ using the RSS sequence. The maximum CRS port may be 4 ports. When the CRS transmission port actually used is smaller than the maximum CRS port, the base station may additionally transmit the CRS port configuration information to the terminal.

By receiving the additionally transmitted CRS port configuration information, the terminal may additionally use an RSS RE equal to the difference between the maximum number of CRS ports and the actual number of CRS transmission ports for measurement. In addition, in order to support Proposal 3 or Proposal 4 of a method for configuring an RSS port for measurement described above, the base station may additionally configure a QCL relationship or QCL information between the RSS port and the CRS port.

Since the CRS port configuration, the RSS port configuration, and the QCL relationship may be different between cells, information related to the CRS port configuration, the RSS port configuration, and the QCL relationship should be included in the configuration information.

Measurement-related information including information related to the CRS port configuration, the RSS port configuration, and the QCL relationship may not be configured based on a center carrier of the RSS. That is, even if frequency resources of the inter-cell RSS are not overlapped with each other, if they can be accommodated within the measurement bandwidth from the viewpoint of the terminal performing the measurement, it may be given as one measurement related information.

However, for each cell, all of the above information may be provided within one measurement related information. The RSS location information for each cell within the measurement related information may be given as a logical index within the measurement bandwidth.

MG (Measurement Gap) Configuration Method_(Method 2)

Before explaining this method, the MG Gap Pattern (MGP) configuration and RSS configuration are summarized as follows.

First, the MG pattern configuration in the inter-frequency measurement duration is summarized as follows.

MGP #0: MG Period (MGP) 40 ms; MG Length (MGL) 6 ms; MG Offset (MGO) can be configured in ms unit within MGP.

MGP #1: MG Period (MGP) 80 ms; MG Length (MGL) 6 ms; MG Offset (MGO) can be configured in ms unit within MGP.

Next, the RRS configuration is summarized as follows.

RSS duration: {8, 16, 32, 40} ms

RSS period: {160, 320, 640, 1280} ms

RSS time offset can be configured within a period in 1/2/4 frame units

In the case of using the RSS for measurement based on the MGP and RSS configuration as described above, the RSS may not exist within the periodic MG duration from the point of view of the terminal, or the RSS may exist only partially. That is, the configuration needs to be modified in order for the RSS to always exist within the periodic MG duration, or in order for all of the RSS to exist within the MG duration.

FIG. 27 is a diagram illustrating an example in which a terminal performs measurement according to an MG configuration and an RSS configuration.

FIG. 27 is an example of conventional MGP #0, MGP #1, and RSS configuration of the shortest period.

According to the conventional method, even if the RSS is configured with the shortest period (160 ms), it is possible to measure using the RSS for the MG duration only once every 4 times for MGP #0 and every 2 times for MGP #1.

As shown in the example of FIG. 27, when the prior art is applied and the terminal can use the RSS for measurement, the terminal does not actually perform measurement in the MGP that does not include the RSS, and the terminal may be configured to expect reception of an MTC Physical Downlink Control Channel (MPDCCH)/Physical Downlink Shared Channel (PDSCH) from the base station.

The configuration in which the UE receives the MPDCCH/PDSHCH without performing measurement in the MGP that does not include the RSS is more suitable when the RSS is used only for serving cell measurement.

The MGP duration that does not overlap with the RSS duration may be used to improve throughput through MPDCCH/PDSCH reception.

When the RSS is used for measurement based on the conventional MGP configuration and RSS configuration as described above, the configuration of the CRS and the RSS that the terminal can use for the measurement may vary for each MG duration.

In this case, there is a limitation in improving the measurement performance using the RSS of the terminal, and the operation of the receiver of the terminal may be complicated.

In order to improve the RSRP/RSRQ measurement performance using the RSS of the terminal through solving the above problems, a method of configuring the MGP period to an integer multiple of the RSS period is proposed.

A method of configuring the MGP period to an integer multiple of the RSS period may be performed as follows.

Method to Match the MGP Period with a Period or an Integer Multiple of the Period in the RSS Configuration This method proposes a method of matching the MGP period with the period (or the minimum period of the RSS) or an integer multiple of the period in the RSS configuration.

For example, more specifically, the MGP period may be configured so that the MGP period coincides with the minimum period in the RSS configuration.

FIG. 28 is a diagram illustrating an example of a method of matching an MGP period to a period (or a minimum period of RSS) or an integer multiple of the period on an RSS configuration.

In FIG. 28, it can be seen that the period of the MGP #2 2810 is configured equal to 160 ms, which is the minimum period 2820 on the RSS configuration.

Method to Match a Period of RSS Configuration with a Period of MGP #0 and/or MGP #2

This method proposes a method of matching the period on the RSS (or RSS of the minimum period) configuration with the period of MGP #0 and/or MGP #1.

For example, RSS configuration of a period having the same value as the maximum period in the MGP configuration may be included in the RSS configuration.

FIG. 29 is a diagram illustrating an example of a method of matching a period on an RSS (or RSS of the minimum period) configuration with a period of MGP #0 and/or MGP #2.

In FIG. 29, it can be seen that the period 2920 of the RSS is configured to 80 ms so as to have the same period as 80 ms, which is the period 2910 of MGP #1.

By applying the method of configuring the MGP period to an integer multiple of the RSS period in order to improve the RSRP/RSRQ measurement performance using the RSS, measurement of uniform performance can be expected, and therefore, it can be expected to simplify the operation of the receiver to determine the measurement requirements and to satisfy the measurement requirements.

In addition, the MGP configuration and RSS configuration information may be used to determine whether the terminal measures RSRP and RSRQ using only the CRS or whether to measure RSRP and RSRQ using both the CRS and the RSS. The MGP configuration and RSS configuration information may be included in the M information.

For example, if the RSS duration is X subframe in the MGL (MG length) or the RSS duration is included in the MGL by a certain percentage (Y %) or more, the terminal may perform measurement using the CRS and the RSS, otherwise the terminal may perform measurement using only the CRS and report the measurement result to the base station.

As another example, when the RSS period is larger than the MG period as shown in FIG. 27, if a value obtained by dividing the RSS period by the MG period is greater than or equal to a specific value (Z), the increase in measurement performance due to use of the RSS compared to the complexity is not significant, so the terminal may perform RSRP/RSRQ measurement using only the CRS.

The X, Y, and Z values are fixed values or are values configured by a higher layer, and may be included in the measurement configuration (MC) information. The X, Y, and Z values may be configured for each CC or cell for all or some CCs or cells of inter-frequency and/or intra-frequency.

Alternatively, it is configured for each CC or cell, but may be composed of one or multiple measurement objects that are commonly applied to all or multiple CCs or cells.

RSRP/RSRP measurement performance is proportional to the number of REs measured by the UE. Therefore, focusing on the fact that the number of RSS measurement samples within a single NB is larger than that of the existing CRS (about 7 times), a method of configuring a smaller MGL than the conventional MGL is proposed. For example, irrespective of the RSS duration, in addition to the conventional MGL 6 ms (fixed), the MGL may be additionally configured by 1, 2, and 4 ms.

The method of configuring the additional MGL may be a method additionally applied to the method of configuring the RSS period equal to the MGP period.

In addition to the method of configuring an MGL smaller than the conventional MGL, for the same reason, a method of defining the RSS duration as a value equal to or smaller than the conventional MGL may be considered.

This method may be additionally applied to the method of configuring the RSS period equal to the MGP period. The RSS cover code needs to match the newly defined RSS duration. In order to match the RSS cover code with the newly defined RSS duration, the following options are possible.

FIG. 30 illustrates an example of a method of matching the RSS cover code with a newly defined RSS duration.

The following options will be described with reference to FIG. 30.

(1) The RSS cover code of the new duration is sequentially used from the earliest sequence of existing RSS cover code, and the remaining sequence is not used.

Referring to FIG. 30(a), 3811 denotes an existing RSS cover code sequence, and 3812 denotes an RSS cover code of a new duration.

It can be seen that the RSS cover code of the new duration is sequentially used from the earliest sequence of the existing RSS cover code, and the remaining sequence is not used.

By matching the RSS cover code with the newly defined RSS duration in the above manner, the RSS cover code can maintain the characteristic that the first sequence is configured to be suitable for obtaining an antenna diversity gain, and the subsequent section is configured to be suitable for obtaining a noise averaging gain.

(2) The last sequence of the RSS cover code of the new duration is matched with the last sequence of the existing RSS cover code, and the remaining previous sequence is not used.

Referring to FIG. 30(b), 3021 denotes an existing RSS cover code sequence, and 3022 denotes an RSS cover code of a new duration.

It can be seen that the last sequence of the RSS cover code of the new duration matches the last sequence of the existing RSS cover code, and the remaining previous sequence is not used.

There is a need to increase the noise averaging gain of the terminal in a situation where the noise averaging gain is more necessary because the SNR environment of the terminal that needs to improve the measurement performance using RSS is bad.

By matching the RSS cover code with the newly defined RSS duration in the above manner, a sequence located at the last part of the RSS cover code suitable for increasing the noise averaging gain than the first part of the RSS cover code can be used.

(3) The RSS cover code of the new duration is used by excluding the continuous part of the first sequence and the continuous part of the last sequence of the existing RSS cover code.

This is an intermediate step between options (1) and (2).

Referring to FIG. 30(c), 3831 denotes an existing RSS cover code sequence, and 3032 denotes an RSS cover code of a new duration.

It can be seen that the RSS cover code of the new duration is used by excluding the continuous part of the first sequence and the continuous part of the last sequence of the existing RSS cover code.

The reason why the RSS cover code is matched with the newly defined RSS duration in the above manner is to enable both the terminal with good SNR environment and the terminal with no SNR environment to use the RSS for measurement.

The base station needs to preferentially transmit the RSS for the existing terminals in a resource where the RSS duration configured with the newly defined RSS period and the RSS duration for the existing terminals are all overlapped.

In addition, when the RSS duration configured to the newly defined RSS period and the RSS section for existing terminals are partially overlapped, the base station may skip transmission of the RSS configured to the newly defined RSS period in the corresponding period.

This is to preferentially consider backward compatibility for existing terminals because the terminal supporting the new RSS period also supports configuration of the existing RSS.

The MGL may be configured to include an NB switching gap. The NB switching may mean a switching interval from normal downlink to downlink NB.

In the case of switching back for general downlink reception after intra-frequency measurement, that is, when switching from downlink NB to downlink, the existing LTE control region may not be able to absorb downlink switching time due to inadequate synchronization between cells.

That is, there may be a case where the switching time is shorter than the length of the LTE control region.

In preparation for such a case, the LTE control region can absorb the switching time in the following three ways.

First, it is possible to guarantee switching back time of at least two OFDM symbols to a general downlink.

For example, even if the terminal has configured the start OFMM symbol to 1 (StartOFDMsymbol=1), the terminal may not receive the normal downlink during two OFDM symbol periods.

Second, it is possible for the terminal to select downlink switching time that is greater than two OFDM symbols periods.

For example, the switching time may be as long as 3 or 4 OFDM symbol periods.

Finally, the switching time to the general downlink may be fixed to a value greater than two OFDM symbol periods.

For example, the switching time may be as long as 3 or 4 OFDM symbol periods.

Additional MG (MG2) Configuration Method for Intra-Frequency Inter-NB Measurement Based on the NB characteristics of LTE-MTC and the point that the RSS can be configured within the system bandwidth, in order to improve measurement performance using the RSS, in addition to 1) conventional inter-frequency MG (hereinafter, referred to as MG 1), an intra-frequency MG (hereinafter, referred to as MG 2) may be additionally configured.

Alternatively, 2) the conventional MG 1 can be configured including intra-frequency measurement and inter-frequency measurement.

1) MG 2 additionally configured to the conventional MG 1 may be configured independently or additionally from MG 1 for inter-frequency measurement using the conventional CRS, by using the RSS for intra-frequency and/or inter-frequency measurements, MG 2 configuration includes a configuration parameter, that is, measurement objects proposed in the RSS configuration or measurement configuration method_(Method 2).

MG 2 may not include the CRS in the case of a standalone MTC operation or a subframe in which the CRS cannot be expected.

When the CRS is not included in MG 2, the in-band LTE-MTC or the standalone MTC UE may perform the following operation.

First, RSRP/RSRQ may be measured/reported only by the RSS.

Second, assuming the default configuration, RSRP/RSRQ may be measured/reported using the CRS (or the CRS and the RSS), or Third, the default configuration may assume the same configuration as the CRS of the serving cell, or assume a 1-port CRS (port 0), or assume a maximum CRS port (port 0, 1, 2 and 3).

2) If MG2 is not additionally configured and the conventional MG 1 is configured including intra-frequency measurement and inter-frequency measurement, intra-frequency measurement and inter-frequency measurement may be sequentially performed during the period of MG 1 by Time Division Multiplexing (TDM) method.

RSS Configuration Method for Measurement

The RSS can be configured in different Physical Resource Block (PRB) locations within the system bandwidth for each CC or cell.

When configuring the RSS for measurement, the location of the RSS on the frequency can be determined in the following way. By determining the location of the RSS as follows, overhead for the MC indication of the base station can be reduced or convenience in the operation of the terminal can be achieved.

RSS Location is Determined in Conjunction with Narrow Band (NB)

(Proposal 1) Restriction on Location where RSS can be Configured

In order to reduce the signaling overhead of the RSS configuration-related information, this proposal provides a method for a base station to limit the location where the RSS can be configured to a specific location in the NB, and to indicate the RSS location to the terminal by an NB index.

For example, the location where the RSS within each NB can be configured may be fixed to the center 2RB within the NB.

(Proposal 2) Determine RSS Location in Conjunction with System Bandwidth and/or NB Location within System Bandwidth This proposal provides a method of configuring the RSS symmetrically to the center frequency when determining the RSS position within the system bandwidth.

Alternatively, this proposal provides a method of exceptionally different RSS configuration for the center 6RB or the NB composed of the center 6RB.

For example, the center NB may be configured to accommodate a plurality of RSSs, and only one of the remaining RSSs may be accommodated per NB.

Finally, this proposal provides a method of arranging the RSS in consideration of interference.

For example, in consideration of interference with a non-NB signal, that is, PRACH and PUCCH, a location where the RSS can be configured for each NB location may be differently determined.

Configure RSS in One NB

This method provides a method of configuring multiple RSSs in one or at least NB(s).

In order to minimize an operation such as minimizing the NB switching operation during measurement through this method, convenience of the measurement operation of the terminal can be achieved.

(Proposal 1) Configure Multiple RSSs in One NB by Allowing RSS Overlapping

This proposal provides a method of configuring multiple RSSs in one NB by allowing RSS overlapping.

According to this proposal, the UE can perform RSRP/RSRQ measurement of maximum cells without NB hopping.

(Proposal 2) Configure Up to 3 RSSs in One NB so that the RSSs does not Overlap

This proposal provides a method of configuring up to 3 RSSs in one NB so that the RSSs does not overlap.

According to the present proposal, by limiting the location of the lowest RSS PRB in the NB so that the RSSs does not overlap, the measurement performance of the terminal is not affected by the overlap compared to the above (Proposal 1), and signaling overhead can be reduced.

The lowest RSS PRB location may be limited to an even or odd index.

(Proposal 3) Configure to have an Interlace Structure Between RSSs

This proposal is a method of configuring the RSS locations of a plurality of cells in the same NB and interlacing in a subframe unit or a multiple of subframe units.

According to this proposal, it is possible to avoid overlapping between RSSs or minimize the effect of interference between adjacent RSSs on measurement.

This method may be a pattern signaled in the form of a period and an offset, or may be configured in a form of a bitmap.

In addition, the unit of the bitmap or pattern may be a subframe unit or a multiple unit of a subframe, or more densely, a symbol unit, or a measurement gap length (MGL) unit.

For example, when expressed as a bitmap in subframe units, it may be configured in the same way such as cell 1 {1 0 0 1 0 0 1 0 0 . . . }, cell 2 {0 1 0 0 1 0 0 1 0 . . . }, cell 3 {0 0 1 0 0 1 0 0 1 . . . }, and so on.

The RSS of cell 1 is configured in subframe #0, the RSS of cell 2 is configured in subframe #1, and the RSS of cell 3 is configured in subframe #2.

When interlaced in units of symbols, it may be configured in a form of punching the RSS sequence.

More generally, in the case of the RSS for measurement, in consideration of the effect of interference on measurement, the RSSs of different cells may be limited to be configured at locations not adjacent to each other on time/frequency resources.

Alternatively, in order for the RSSs of different cells to secure a constant interval on the time/frequency resource, the location (grid) of the PRB on the time/frequency resource in which the RSS can be configured may be limited.

The RSS spacing may be a spacing of 1 RB between adjacent RSSs.

Zero-Power RSS Configuration for Noise and Interference Measurements

The above-described methods and proposals means information on resources in which the RSS is transmitted or can be transmitted in an actual neighbor cell, which may be referred to as a non-zero power RSS.

The UE may measure RSRP or Received Signal Strength Indicator (RSSI) of a neighbor cell through the non-zero power RSS.

If the base station intends to use the RSS configuration for measuring noise or interference of a neighbor cell, the zero-power RSS may be configured.

In this case, the terminal assumes that the RSS is not actually transmitted from the serving cell in the duration in which the RSS is configured for noise or interference measurement of a neighbor cell.

When the terminal uses the power (e.g., RSSI) measured in the duration to measure quality information such as RSRQ for the serving cell, the measured power may be regarded as noise and/or noise power and used.

However, in order to minimize the influence of the legacy terminal, the terminal may assume that a specific broadcasting signal and channel such as CRS or PBCH (Physical Broadcast Channel), PSS (Primary Synchronization Signal), SSS (Secondary Synchronization Signal), or system information are transmitted from the serving cell.

Signaling Overhead Reduction Method_(Method 3)

In order to enable the terminal to use a reference signal for re-synchronization (RSS) for RSRP measurement of the neighbor cell(s), the base station may signal the following RSS-related parameters for each cell by using SI (System Information), etc.

ce-rss-periodicity-config: This indicates the RSS transmission period. Values such as {160, 320, 640, 1280} ms may be indicated.

ce-rss-duration-config: This indicates the RSS duration. Values such as {8, 16, 32, 40} subframes may be indicated.

ce-rss-freqPos-config: This indicates the frequency location where RSS is located. It may be indicated by the lowest PRB number ((lowest physical resource block number).

ce-rss-timeOffset-config: This indicates an RSS time offset. It may be indicated by the number of radio frames. of radio frames ce-rss-powerBoost-config: This indicates a power offset relative to LTE CRS. Values such as {0, 3, 4.8, 6} dB may be indicated.

If the above parameters related to the signals for measurement are configured for each cell, it may be a problem in terms of signaling overhead.

When the frequency location and time offset parameters are configured for each cell, it is particularly problematic in terms of signaling overhead.

This method proposes two methods for reducing signaling overhead of signaling for transmission of the frequency location parameter and the time offset parameter to the terminal.

First, this method proposes a method (Proposal 1) of arranging the RSS location of a neighbor cell adjacent to the RSS location of the serving cell.

The proposal 1 may be a method of arranging the RSS of the serving cell and the RSS of the neighbor cell in the same NB.

Second, this method proposes a method (Proposal 2) of limiting the relative arrangement range in which the RSS of the neighbor cell can be located based on the RSS location of the serving cell, and signaling only the relative location (delta) value based on the RSS location of the serving cell (hereinafter, it is referred to as 'delta signaling').

In the following, the proposals 1 to 2 will be described in detail.

Hereinafter, the serving cell may be referred to as an S-cell, and a neighbor cell may be referred to as an N-cell.

(Proposal 1) N-Cell RSS Frequency Location Parameter Delta Signaling

When the RSS frequency position of the serving cell is signaled at full resolution, for example, 7 bits may be required to represent {0, 1, 2, . . . , 98} PRBs.

When there are N neighbor cells, 7N signaling bits may be required to signal all of the RSS frequency locations of the neighbor cells.

FIG. 31 is a diagram illustrating an example of RSS frequency location parameter signaling without delta signaling.

Referring to FIG. 31, the RSS of the serving cell exists at a location where the RB index number is a specific X, and candidate locations where the RSS of the neighbor cell may be located are {0, 1, 2, . . . , 98} PRBs, and 7 bits may be required to represent all of the candidate locations.

In order to reduce signaling overhead, the base station may signal only a delta value, which is a specific difference value based on the RSS frequency location of the serving cell.

More specifically, the base station may limit the frequency location at which the RSS of the neighbor cell can be located based on the RSS location of the serving cell by a predetermined value, and signal the difference between the RSS frequency location of the serving cell and the RSS frequency location of the neighbor cell to the terminal.

FIG. 32 is a diagram illustrating an example of RSS frequency location parameter signaling using delta signaling.

Referring to FIG. 32, the RSS of the serving cell exists at a location where the RB index number is a specific X, and the frequency location at which the RSS of the neighbor cell can be located may be within the range of {0, +/−2, +/−4} PRBs, and the difference (delta) between the RSS frequency location of the serving cell and the RSS frequency location of the neighbor cell is {0, +/−2, +/−4} PRBs.

The range in which the RSS of the neighbor cell can be located may be determined by the number of signaling bits for the RSS location of the serving cell and the RSS frequency position of the neighbor cell. If the {0, +/−2, +/−4} PRBs are referred to as delta, 3 bits are required for the base station to signal the delta value.

Therefore, when there are N neighbor cells, only 3N signaling bits may be required in order for the base station to signal all of the RSS frequency positions of the neighbor cells.

There may be a case where a delta signaling parameter does not exist or a corresponding field does not exist in the RSS configuration for the neighboring cell (hereinafter referred to as "no signaling case"). The terminal receiving the RSS configuration in which the delta signaling parameter is not included may assume that delta is '0'. If there is a delta signaling parameter, the delta signaling parameter may represent {+/−2, +/−4}, and only 2N signaling bits may be required in order for the base station to signal all of the RSS frequency locations of neighbor cells when there are N neighbor cells.

As another example of delta signaling, in order to avoid overlapping the RSS of the serving cell and the RSS of the neighbor cell or interference between RSSs, a delta signaling unit may be configured in units of X PRBs. The X may have a value equal to or greater than 2.

The frequency candidate locations of adjacent RSSs limited by delta signaling may belong to one or more NBs for convenience of operation of the terminal.

Alternatively, for flexibility in deployment of the RSS location of the neighbor cell (deployment flexibility), the RSS location of the neighbor cell may be disposed regardless of the NB grid.

In order to effectively use the signaling bit in delta signaling, in the case of the no signaling case, the terminal may assume a specific value as the RSS frequency location value of the neighbor cell. For example, the specific value may be the same as the RSS of the serving cell.

In addition, when the RSS location of the neighbor cell is configured in consideration of the NB grid, the interpretation of the RSS location of the neighbor cell for the same signaling bit may be changed according to the RSS location of the serving cell.

For example, according to whether the RSS location of the serving cell is 0,2,4 in the NB grid, the interpretation of the frequency location information for the RSS of the neighbor cell may be {2,4}, {0,4}, {0, 2}, or may be {2,4}, {4,0}, {0,2}, respectively.

FIG. 33 is a diagram illustrating an example of a case where there are a plurality of RSS frequency location candidate blocks capable of configuring RSS.

When the number of neighbor cells to which the RSS is to be configured is large and/or when the RSS cannot be continuously configured, the RSS may be transmitted by configuring two or more RSS frequency location candidate blocks of FIG. 32 as shown in FIG. 33.

The block refers to a frequency area in which the RSS can be configured continuously or adjacently, as follows.

In this case, in consideration of signaling overhead, the locations of the blocks may be configured to a carrier specific value or a cell common value.

Which block of one or a plurality of blocks in which the RSS of the adjacent cell belongs to a carrier-specific, and the exact position in the block to which the RSS of the adjacent cell belongs may be set to be cell specific for each adjacent cell.

When a plurality of blocks is continuous or discontinuous, the configuration of the block(s) that is configured to be carrier-specific may be signaled in the form of a bitmap in a specific unit of the frequency domain.

The specific unit may be an RB, an NB composed of a plurality of adjacent RBs (e.g., 6 RBs), a plurality of adjacent NBs, or a predetermined or configured block unit.

When the specific unit is the block unit, an indication for a plurality of blocks may be defined in the form of a combination index in which each possible combination for each the number of blocks is mapped to an integer.

The unit of the block may be RB, a plurality of adjacent RBs, NBs, a plurality of adjacent NBs, and the like.

The block(s) configured to be carrier specific may have a specific size on a frequency and may be arranged at specific intervals.

In this case, the arrangement of the block(s) in the frequency domain may be configured based on parameters such as a starting point, a size, and an interval in the frequency domain.

The size of the block(s) may be in units such as RB(s), NB(s), etc., and the starting point and interval may be in units such as subcarrier(s) or RE(s), or RB(s), NB(s), etc.

When there is an RB not included in the NB around the DC subcarrier within the system bandwidth, for example, when the system bandwidth is {3,5,15}, the parameters related to the arrangement of the block(s) in the frequency domain may be calculated excluding the RB not included in the NB.

More specifically, in a situation where an RB not included in the NB exists around the DC subcarrier, the base station (eNB) may place the RSS at a specific location on the NB by adjusting the start point of block(s) and the spacing between blocks for scheduling convenience (e.g., when the RB location in the NB is the same during frequency hopping).

In this case, if the parameters are calculated without excluding the RB not included in the NB, in the two areas divided around the DC subcarrier, the RB included in NB(s) existed in the two areas respectively may vary.

For the above reasons, when an RB not included in the NB exists around the DC subcarrier, the base station may calculate a parameter related to the arrangement of the block(s) in the frequency domain excluding the RB.

For similar reasons, the location(s) of the block(s) may be determined with the parameter(s) for only one area (first area) of the two areas divided based on the DC subcarrier in the system bandwidth, and for RBs included in the other area (the second area), the locations of the block(s) of the first area may be symmetrically applied based on the DC subcarrier.

The methods related to block arrangement in the frequency domain can be applied when the number of blocks is one or more.

In a state in which multiple blocks are configured to be carrier-specific, the exact location of the RSS may be signaled by three methods.

The above three methods will be described with reference to FIG. 42.

FIG. 34 is a diagram illustrating an example of a method of configuring an exact position of an RSS in a frequency domain in a state in which a plurality of blocks are configured to be carrier-specific.

In FIG. 34, it is assumed that one block is composed of 1 NB (6 RBs), and the RSS is signaled in units of 2 RBs. In 3401 and 3402, even if the blocks are discontinuous, it is assumed that the blocks are continuous, and signals are sequentially signaled based on the RB index within the block.

3401 is a method of counting in the order of increasing the RB index excluding the RSS location of the serving cell. In the no signaling case, it is assumed that the terminal assumes the same RSS location as the serving cell.

3402 is a method of signaling in the order of increasing RB index starting from the RSS location of the serving cell, and signaling a region having a smaller RB index value than the RSS location of the serving cell through a modulo operation when the RB index is exceeded.

In addition, 3403 is a method of distinguishing a plurality of block(s) by MSB (or LSB)(s) and signaling the locations of RBs in each block separated by the remaining LSB (or MSB)(s).

In FIG. 34, an integer value expressed for each RSS location for each embodiment indicates a value obtained by integerizing corresponding signaling bits.

More specifically, in the case of 3403, 3 bits are used, the blocks are distinguished by MSB 1 bit, and the RSS locations existing in the block are identified by LSB 2 bits.

If When the RSS location is expressed in the order of RB index increase, it is shown in the order of {000}(0), {001} (1), {100}(4), (101)(5), and {110}(6). Considering that the synchronization performance or measurement performance may be degraded when the RSSs overlap in part or all in the frequency dimension, when configuring the RSS, the base station may configured the RSS in a certain unit or in the block unit in order to reduce signaling overhead. The certain unit is 2 RB units, that is, {0, 2, 4, ..., 98} PRBs, multiple units of 2 RB, NB units, and the like.

(Proposal 2) N-Cell RSS Time Offset Parameter Delta Signaling

The base station may signal a relative difference between the RSS time offset of the neighbor cell and the time offset value of the serving cell, that is, a delta value. For example, the base station signals one of the {0, +/−1, +/−2} frames as a delta value, and the RSS time offset of the neighbor cell is determined by adding the signaled delta value to the time offset value of the serving cell.

In addition, if there is no field indicating the delta value, the terminal may assume a delta value of 0. The unit of delta may be a frame unit or a unit of the RSS duration to further reduce signaling overhead. The RSS duration may be, for example, one of {8, 16, 32, 40} subframe values.

In addition, when the periods of the serving cell and the neighbor cell are different, the base station may signal and interpret the offset based on the smaller of the two periods of the serving cell and the neighbor cell to eliminate ambiguity.

The signaling overhead reduction method through delta signaling is not limited to the frequency location and time offset parameters, and may be applied to all when the same RRC parameters are configured for the serving cell and the neighbor cell.

More specifically, when the difference between the RSS power boosting parameter of the neighbor cell and the serving cell is expected to be small, similar to the delta signaling method, the base station may reduce signaling overhead by signaling only the difference value delta from the serving cell as the RSS power boosting parameter value of the neighbor cell.

That is, the base station does not indicate to the terminal an actual value of the RSS power boosting parameter of the neighbor cell, but may indicate to the terminal only a delta value that is a difference value from the RSS power boosting parameter value of the serving cell.

Alternatively, the terminal may assume the same value as the serving cell for the no signaling case. That is, when the RSS power boosting delta value is not indicated, the terminal may assume that the RSS power boosting parameter value of the neighbor is the same as the RSS power boosting parameter value of the serving cell.

In order to reduce signaling overhead, the RSS time offset value of the neighbor cell may be signaled with reduced resolution. For example, the base station may signal the RSS time offset value of the neighbor cell in an X frame unit or N>1 times the unit of the RSS time offset of the serving cell.

The X frame unit may be fixed in units of 8 or 16 frames, for example, and the N value may be in units of N, 2N or 4N frames.

The delta signaling information may be in the form of implicit signaling. For example, it may be implicitly signaled by a (virtual) cell index. That is, the terminal may determine the RSS location in the NB through a cell index detected in a neighboring cell, and, if necessary, through an additional modulo operation.

The implicit type of signaling is not limited to delta signaling information, and may be applied even when some or all of the information related to RSS configuration is transmitted.

In addition, the method(s) for reducing signaling overhead of all or part of the RSS configuration parameter(s) including the RSS time offset may be limited to a synchronous network. That is, it may be applied only when synchronization between cells is guaranteed. The above methods may be enabled/disabled based on information indicating whether the network is synchronous or asynchronous.

(Proposal 3) Carrier Specific Signaling for RSS Time Offset and Frequency Location In order to reduce signaling overhead, all or part of the RSS-related parameters may be configured only for the serving cell.

The terminal may assume the same value as the parameter of the serving cell for the RSS-related parameter of the neighbor cell. In this method, since it is assumed that the value of the RSS-related parameter of the neighbor cell is the same as the RSS-related parameter of the serving cell, the flexibility of RSS configuration may be limited.

Alternatively, the terminal may perform blind detection (BD) when receiving partial information. However, this method may have a disadvantage of increasing the power consumption of the terminal.

This proposal will be described from the terminal side to the network side, respectively.

If all or part of the RSS-related parameters are not configured for a neighbor cell, the terminal may assume the same value as the parameter of the serving cell.

Alternatively, the terminal may BD for partial information. More specifically, the terminal may search within the NB to which the RSS of the serving cell belongs or within a specific window around the time location of the RSS of the serving cell.

The frequency location and/or the time location of the RSS of the neighbor cell(s) may be located adjacent to or near the RSS of the serving cell, and the corresponding frequency location and/or time location parameters are not configured for the neighbor cell(s).

The case of transmitting or receiving part of the parameters or partial information may include the following cases.

The RSS frequency location of the neighbor cell may be signaled in units of X PRB, and the terminal may perform blind detection (BD) within the X PRB for the frequency location value.

The RSS time offset of the neighbor cell may be signaled in units of Y frames, and the terminal may perform BD within the Y frame for the time offset value.

FIG. 35 illustrates an example of an operation of a terminal in the present invention described above.

That is, FIG. 35 shows an operation of a terminal for performing measurement in a wireless communication system.

The terminal receives, from a serving base station, configuration information for measurement of a reference signal receive power (RSRP) and/or a reference signal received quality (RSRQ) (S3510).

The configuration information includes port configuration information related to an antenna port through which a reference signal is transmitted, and measurement configuration information related to a relationship between a cell-specific reference signal (CRS) and a re-synchronization signal (RSS) for the measurement.

Here, the port configuration information may include CRS port configuration information and RSS port configuration information.

In addition, the CRS port configuration information may be information related to the number of antenna ports through which the CRS is transmitted.

In addition, the RSS port configuration information may be information related to a relationship between at least one first antenna port through which the CRS is transmitted and at least one second antenna port through which the RSS is transmitted.

In addition, the at least one second antenna port may be configured to be the same as a fixed one antenna port among the at least one first antenna port according to the RSS port configuration information.

In addition, the at least one second antenna port may be configured to be the same as fixed two antenna ports among the at least one first antenna port according to the RSS port configuration information.

In addition, the RSS port configuration information may include sequence information related to a cyclic order of the at least one second antenna port.

In addition, the at least one second antenna port may be cycled in a time domain and/or a frequency domain according to the sequence information.

In addition, the cycled at least one second antenna port may be the same as two or four antenna ports included in the at least one first antenna port.

In addition, a Quasi Co-Location (QCL) relationship between the at least one first antenna port and the at least one second antenna port may be configured according to the RSS port configuration information.

In addition, the measurement configuration information may include information on a ratio of power of the RSS to power of the CRS.

In addition, the measurement configuration information may further include at least one of RSS configuration information indicating whether the RSS is supported, RSS transmission information related to a duration in which the RSS is transmitted, or RSS sequence information including information related to a cover code of the RSS.

In addition, the RSS may be in a first location on the frequency domain, the RRS transmitted by the serving base station may be in a second location on the frequency domain, and a difference between an RB index (Resource Block Index) value of the first location and an RB index value of the second location may not exceed a certain value.

Additionally, the terminal may further perform the step of obtaining the first location of the RSS based on the location information.

In this case, the first location may be obtained by adding a specific value less than or equal to the certain value included in the location information to the RB index value of the second location.

Next, the terminal receives, from a neighbor base station, the CRS and/or the RSS (S3520).

Next, the terminal calculates the RSRP and/or the RSRQ according to the configuration information using the CRS and the RSS (S3530).

Finally, the terminal reports, to the serving base station, the RSRP and/or the RSRQ (S3540).

Additionally, the terminal may further perform the step of receiving configuration information of a discontinuous reception (DRX) mode from the base station.

Here, the configuration information may be received a listening duration of the DRX mode.

More specific details implemented in the terminal for performing the measurement proposed in the present disclosure will be described with reference to the terminal operating method of FIG. 35.

In order to perform the measurement in a wireless communication system, the terminal includes a transmitter for transmitting a radio signal; a receiver for receiving a radio signal; and a processor functionally connected to the transmitter and the receiver.

The processor receives, from a serving base station, configuration information for measurement of a reference signal receive power (RSRP) and/or a reference signal received quality (RSRQ).

The configuration information includes port configuration information related to an antenna port through which a reference signal is transmitted, and measurement configuration information related to a relationship between a cell-specific reference signal (CRS) and a re-synchronization signal (RSS) for the measurement.

In addition, the processor receives, from a neighboring base station, the CRS and/or the RSS.

Next, the processor calculates the RSRP and/or the RSRQ according to the set configuration ting information using the CRS and the RSS.

In addition, the processor reports, to the serving base station, the RSRP and/or the RSRQ.

FIG. 36 is a diagram illustrating an example of an operation of a base station in the present disclosure as described above.

That is, FIG. 36 shows an operation of a base station in a method for a terminal to perform measurement in a wireless communication system.

The base station transmits, to the terminal, configuration information for measurement of a reference signal receive power (RSRP) and/or a reference signal received quality (RSRQ) (S3610).

The configuration information includes port configuration information related to an antenna port through which a reference signal is transmitted, and measurement configuration information related to a relationship between a cell-specific reference signal (CRS) and a re-synchronization signal (RSS) for the measurement.

Here, the port configuration information may include CRS port configuration information and RSS port configuration information.

In addition, the CRS port configuration information may be information related to the number of antenna ports through which the CRS is transmitted.

In addition, the RSS port configuration information may be information related to a relationship between at least one first antenna port through which the CRS is transmitted and at least one second antenna port through which the RSS is transmitted.

In addition, the at least one second antenna port may be configured to be the same as a fixed one antenna port among the at least one first antenna port according to the RSS port configuration information.

In addition, the at least one second antenna port may be configured to be the same as fixed two antenna ports among the at least one first antenna port according to the RSS port configuration information.

In addition, the RSS port configuration information may include sequence information related to a cyclic order of the at least one second antenna port.

In addition, the at least one second antenna port may be cycled in a time domain and/or a frequency domain according to the sequence information.

In addition, the cycled at least one second antenna port may be the same as two or four antenna ports included in the at least one first antenna port.

In addition, a Quasi Co-Location (QCL) relationship between the at least one first antenna port and the at least one second antenna port may be configured according to the RSS port configuration information.

In addition, the measurement configuration information may include information on a ratio of power of the RSS to power of the CRS.

In addition, the measurement configuration information may further include at least one of RSS configuration information indicating whether the RSS is supported, RSS transmission information related to a duration in which the RSS is transmitted, or RSS sequence information including information related to a cover code of the RSS.

In addition, the RSS may be in a first location on the frequency domain, the RRS transmitted by the serving base station may be in a second location on the frequency domain, and a difference between an RB index (Resource Block Index) value of the first location and an RB index value of the second location may not exceed a certain value.

Additionally, the terminal may further perform the step of obtaining the first location of the RSS based on the location information.

In this case, the first location may be obtained by adding a specific value less than or equal to the certain value included in the location information to the RB index value of the second location.

The terminal receives the CRS and/or the RSS from a neighbor base station, and calculates the RSRP and/or the RSRQ according to the configuration information using the CRS and the RSS.

Finally, the base station reports, from the terminal, the RSRP and/or the RSRQ (S3620).

Additionally, the base station may further perform the step of transmitting, to the terminal, discontinuous reception (DRX) mode configuration information.

Here, the configuration information may be received by the terminal in the listening duration of the DRX mode.

In the method for the terminal to perform measurement proposed in the present disclosure with reference to the base station operation method of FIG. 36, more detailed information implemented in the base station will be described.

In a wireless communication system, a base station for receiving a measurement report from a terminal includes a transmitter for transmitting a radio signal; a receiver for receiving a radio signal; and a processor functionally connected to the transmitter and the receiver.

The processor transmits, to the terminal, configuration information for measurement of a reference signal receive power (RSRP) and/or a reference signal received quality (RSRQ).

The configuration information includes port configuration information related to an antenna port through which a reference signal is transmitted, and measurement configuration information related to a relationship between a cell-specific reference signal (CRS) and a re-synchronization signal (RSS) for the measurement.

In addition, the processor transmits, to the terminal, the CRS and/or the RSS.

Next, the processor receives, from the terminal, the RSRP and/or the RSRQ report calculated by the terminal according to the configuration information using the CRS and the RSS.

General Apparatus to which the Present Disclosure May be Applied

FIG. 37 illustrates a block diagram of a radio communication device according to an embodiment of the present disclosure.

In reference to FIG. 37, a radio communication system includes a base station 3710 and a plurality of terminals 3720 positioned in a region of a base station 3710.

A base station 3710 includes a processor 3711, a memory 3712 and a radio frequency (RF) unit 3713. A processor 3711 implements a function, a process and/or a method previously suggested in FIG. 1 to FIG. 40. Radio interface protocol layers may be implemented by a processor 3711. A memory 3712 is connected to a processor 3711 to store a variety of information for operating a processor 3711. A RF unit 3713 is connected to a processor 3711 to transmit and/or receive a radio signal.

A terminal 3720 includes a processor 3721, a memory 3722 and a RF module 3723. A Processor 3721 implements a function, a process and/or a method previously suggested in FIG. 1 to FIG. 36. Radio interface protocol layers may be implemented by a processor 3721. A memory 3722 is connected to a processor 3721 to store a variety of information for operating a processor 3721. A RF unit 3723 is connected to a processor 3721 to transmit and/or receive a radio signal.

Memories 3712 and 3722 may be inside or outside processors 3711 and 3721 and may be connected to a processor 3711 and 3721 in a well-known various means. In addition, a base station 3710 and/or a terminal 3720 may have one single antenna or multiple antenna.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

FIG. 38 is another example of a block diagram of a radio communication device in which some embodiments of the present disclosure may be applied.

In reference to FIG. 38, a radio communication system includes a base station 3810 and a plurality of terminals 3820 positioned in a region of a base station. A base station may be represented as a transmission device and a terminal may be represented as a reception device, and vice versa. A base station and a terminal include processors 3811 and 3821, memories 3814 and 3824, one or more Tx/Rx radio frequency (RF) modules 3815 and 3825, Tx processors 3812 and 3822, Rx processors 3813 and 3823 and antennas 3816 and 3826. A processor implements the above-described function, process and/or method.

In more detail, an upper layer packet from a core network is provided for a processor 3811 in a DL (a communication from a base station to a terminal). A processor implements a function of a L2 layer. In a DL, a processor provides radio resource allocation and multiplexing between a logical channel and a transmission channel for a terminal 3820 and takes charge of signaling to a terminal. A transmission (TX) processor 3812 implements a variety of signal processing functions for a L1 layer (e.g., a physical layer). A signal processing function facilitates forward error correction (FEC) in a terminal and includes coding and interleaving. An encoded and modulated symbol is partitioned into parallel streams, and each stream is mapped to an OFDM subcarrier, is multiplexed with a reference signal (RS) in a time and/or frequency domain and is combined together by using Inverse Fast Fourier Transform (IFFT) to generate a physical channel which transmits a time domain OFDMA symbol stream. An OFDM stream is spatially precoded to generate a multiple spatial stream. Each spatial stream may be provided for a different antenna 3816 in each Tx/Rx module (or a transmitter-receiver 3815). Each Tx/Rx module may modulate a RF carrier in each spatial stream for transmission. In a terminal, each Tx/Rx module (or a transmitter-receiver 3825) receives a signal through each antenna 3826 of each Tx/Rx module. Each Tx/Rx module reconstructs information modulated by a RF carrier to provide it for a reception (RX) processor 3823. A RX processor implements a variety of signal processing functions of a layer 1. A RX processor may perform a spatial processing for information to reconstruct an arbitrary spatial stream heading for a terminal. When a plurality of spatial streams head for a terminal, they may be combined into a single OFDMA symbol stream by a plurality of RX processors. A RX processor transforms an OFDMA symbol stream from a time domain to a frequency domain by using Fast Fourier Transform (FFT). A frequency domain signal includes an individual OFDMA symbol stream for each subcarrier of an OFDM signal. Symbols and a reference signal in each subcarrier are reconstructed and demodulated by determining the most probable signal arrangement points transmitted by a base station. Such soft decisions may be based on channel estimated values. Soft decisions are decoded and deinterleaved to reconstruct data and a control signal transmitted by a base station in a physical channel. The corresponding data and control signal are provided for a processor 3821.

An UL (a communication from a terminal to a base station) is processed in a base station 3810 by a method similar to that described in a terminal 3820 in relation to a function of a receiver. Each Tx/Rx module 3825 receives a signal through each antenna 3826. Each Tx/Rx module provides a RF carrier and information for a RX processor 3823. A processor 3821 may be related to a memory 3824 which stores a program code and data. A memory may be referred to as a computer readable medium.

FIG. 39 illustrates an example of an autonomous vehicle to which the methods proposed in the present disclosure may be applied.

Referring to FIG. 39, the vehicle 100 may include a communication unit 110, a control unit 120, a memory unit 130, an input/output unit 140*a*, and a positioning unit 140*b*. Here, blocks 110 to 130/140*a* to 140*b* correspond to blocks 110 to 130/140 of FIG. X3, respectively.

The communication unit 110 may transmit and receive signals (e.g., data, control signals, etc.) with other vehicles or external devices such as a base station. The control unit 120 may perform various operations by controlling components of the vehicle 100. The memory unit 130 may store data/parameters/programs/codes/commands supporting various functions of the vehicle 100. The input/output unit 140*a* may output an AR/VR object based on information in the memory unit 130. The input/output unit 140*a* may include a HUD. The positioning unit 140*b* may obtain location information of the vehicle 100. The location information may include absolute location information of the vehicle 100, location information within a driving line, acceleration information, and location information with surrounding vehicles. The positioning unit 140*b* may include GPS and various sensors.

For example, the communication unit 110 of the vehicle 100 may receive map information, traffic information, etc. from an external server and store it in the memory unit 130. The positioning unit 140*b* may acquire vehicle location information through GPS and various sensors and store it in the memory unit 130. The control unit 120 may generate a virtual object based on map information, traffic information, vehicle location information, and the like, and the input/output unit 140*a* may display the generated virtual object on a window of the vehicle (1410, 1420). In addition, the control unit 120 may determine whether the vehicle 100 is operating normally within the driving line based on the vehicle location information. When the vehicle 100 deviates from the driving line abnormally, the control unit 120 may display a warning on the window of the vehicle through the input/output unit 140*a*. In addition, the control unit 120 may broadcast a warning message regarding a driving abnormality to nearby vehicles through the communication unit 110. Depending on the situation, the control unit 120 may transmit location information of the vehicle and information on driving/vehicle abnormalities to a related organization through the communication unit 110.

FIG. 40 illustrates an example of an XR device to which the methods proposed in the present disclosure may be applied.

The XR device may be implemented as an HMD, a head-up display (HUD) provided in a vehicle, a television, a smartphone, a computer, a wearable device, a home appliance, a digital signage, a vehicle, a robot, and the like.

Referring to FIG. 40, the XR device 100*a* may include a communication unit 110, a control unit 120, a memory unit 130, an input/output unit 140*a*, a sensor unit 140*b*, and a power supply unit 140*c*. Here, blocks 110 to 130/140*a* to 140*c* correspond to blocks 110 to 130/140 of FIG. X3, respectively.

The communication unit 110 may transmit and receive signals (e.g., media data, control signals, etc.) with other wireless devices, portable devices, or external devices such as a media server. Media data may include images, images, and sounds. The control unit 120 may perform various operations by controlling components of the XR device 100a. For example, the control unit 120 may be configured to control and/or perform procedures such as video/image acquisition, (video/image) encoding, and metadata generation and processing. The memory unit 130 may store data/parameters/programs/codes/commands required for driving the XR device 100a/generating an XR object. The input/output unit 140a may obtain control information, data, etc. from the outside, and may output the generated XR object. The input/output unit 140a may include a camera, a microphone, a user input unit, a display unit, a speaker, and/or a haptic module. The sensor unit 140b may obtain XR device status, surrounding environment information, user information, and the like. The sensor unit 140b may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, and/or a radar. The power supply unit 140c supplies power to the XR device 100a, and may include a wired/wireless charging circuit, a battery, and the like.

For example, the memory unit 130 of the XR device 100a may include information (e.g., data, etc.) necessary for generating the XR object (e.g., AR/VR/MR object). The input/output unit 140a may obtain a command to manipulate the XR device 100a from the user, and the control unit 120 may drive the XR device 100a according to the user's driving command. For example, when a user tries to watch a movie, news, etc. through the XR device 100a, the control unit 120 transmits the content request information through the communication unit 130 to another device (for example, the mobile device 100b) or the media server. The communication unit 130 may download/stream contents such as movies and news from another device (e.g., the mobile device 100b) or a media server to the memory unit 130. The control unit 120 may control and/or perform procedures such as video/image acquisition, (video/image) encoding, and metadata generation/processing for the content, and may generate/output an XR object based on information on a surrounding space or a real object acquired through the input/output unit 140a/sensor unit 140b.

In addition, the XR device 100a is wirelessly connected to the mobile device 100b through the communication unit 110, and the operation of the XR device 100a may be controlled by the mobile device 100b. For example, the mobile device 100b may operate as a controller for the XR device 100a. To this end, the XR device 100a may obtain 3D location information of the mobile device 100b, and then generate and output an XR object corresponding to the mobile device 100b.

In the present disclosure, the wireless device includes a base station, a network node, a transmitting terminal, a receiving terminal, a wireless device, a wireless communication device, a vehicle, a vehicle equipped with an autonomous driving function, a drone (Unmanned Aerial Vehicle, UAV), an AI (Artificial Intelligence) module, a robot, an Augmented Reality (AR) device, a Virtual Reality (VR) device, an MTC device, an IoT device, a medical device, a fintech device (or financial devices), a security device, a climate/environment device, or a device related to the 4th industrial revolution field or 5G service, etc. For example, a drone may be a vehicle that is not a human being and is flying by a radio control signal. For example, the MTC device and the IoT device are devices that do not require direct human intervention or manipulation, and may be a smart meter, a bending machine, a thermometer, a smart light bulb, a door lock, and various sensors. For example, a medical device is a device used for the purpose of diagnosing, treating, alleviating, treating or preventing a disease, examining, replacing, or modifying a structure or function, and may be a medical equipment, a surgical device, a (extracorporeal) diagnostic device, a hearing aid, a surgical device, and the like. For example, a security device is a device installed to prevent a risk that may occur and maintain safety, and may be a camera, a CCTV, or a black box. For example, a fintech device is a device capable of providing financial services such as mobile payment, and may be a payment device or a point of sales (POS). For example, the climate/environment device may mean a device that monitors and predicts the climate/environment.

In the present disclosure, the terminal is a mobile phone, a smart phone, a laptop computer, a digital broadcasting terminal, a personal digital assistants (PDA), a portable multimedia player (PMP), a navigation system, a slate PC, and a tablet PC. (tablet PC), a ultrabook, a wearable device (e.g., a smartwatch, a smart glass, a head mounted display (HMD)), a foldable device, and the like. For example, the HMD is a type of display device worn on the head and may be used to implement VR or AR.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present disclosure by coupling a part of the elements and/or technical features. The order of operations described in the embodiments of the present disclosure may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present disclosure may be implemented by various means, for example, hardware, firmware, software and the combination thereof. In the case of the hardware, an embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present disclosure may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the disclosure.

Therefore, the detailed description is not limited to the embodiments described above, but should be considered as examples. The scope of the present disclosure should be determined by reasonable interpretation of the attached claims, and all modification within the scope of equivalence should be included in the scope of the present disclosure.

INDUSTRIAL APPLICABILITY

The method for requesting scheduling for uplink data transmission in the wireless communication system of the present disclosure has been described mainly with the example applied to 3GPP LTE/LTE-A system, but may also be applied to various wireless communication systems except the 3GPP LTE/LTE-A system.

The invention claimed is:

1. A method of performing measurement at a terminal, in a wireless communication system, the method performed by the terminal comprising:
receiving, from a base station, configuration information related to a re-synchronization signal (RSS);
receiving the RSS from the base station; and
performing measurement of Reference Signal Received Power (RSRP) and/or Reference Signal Received Quality (RSRQ) using the RSS based on the configuration information,
wherein the configuration information includes a bitmap with one or more bits for indicating one or more narrow bands (NBs) used for a deployment of the RSS,
wherein three non-overlapping RSS locations are located in each of the one or more NBs, and
wherein RSS frequency locations of a specific cell are determined based on a modular operation using a cell identifier of the specific cell.

2. The method of claim 1, wherein the RSS is mapped to a resource in units of two resource blocks (RB).

3. A terminal for performing measurement in a wireless communication system, the terminal comprising:
a transmitter for transmitting a radio signal;
a receiver for receiving a radio signal; and
a processor for controlling the transmitter and the receiver,
wherein the processor is configured to:
receive, from a base station, configuration information related to a re-synchronization signal (RSS);
receive the RSS from the base station; and
perform measurement of Reference Signal Received Power (RSRP) and/or Reference Signal Received Quality (RSRQ) using the RSS based on the configuration information,
wherein the configuration information includes a bitmap with one or more bits for indicating one or more narrow bands (NBs) used for a deployment of the RSS,
wherein three non-overlapping RSS locations are located in each of the one or more NBs, and
wherein RSS frequency locations of a specific cell are determined based on a modular operation using a cell identifier of the specific cell.

4. The terminal of claim 3, wherein the RSS is mapped to a resource in units of two resource blocks (RB).

5. A method of transmitting a resynchronization signal (RSS) in a wireless communication system, the method performed by a base station and comprising:
transmitting, a terminal, configuration information related to the RSS; and
transmitting the RSS to the terminal,
wherein the configuration information includes a bitmap with one or more bits for indicating one or more narrow bands (NBs) used for a deployment of the RSS,
wherein three non-overlapping RSS locations are located in each of the one or more NBs, and
wherein RSS frequency locations of a specific cell are determined based on a modular operation using a cell identifier of the specific cell.

6. The method of claim 5, wherein the RSS is mapped to a resource in units of two resource blocks (RB).

7. A base station for transmitting a re-synchronization signal (RSS) in a wireless communication system, the base station comprising:
a transmitter for transmitting a radio signal;
a receiver for receiving a radio signal; and
a processor for controlling the transmitter and the receiver,
wherein the processor is configured to:
transmit, a terminal, configuration information related to the RSS; and
transmit the RSS to the terminal,
wherein the configuration information includes a bitmap with one or more bits for indicating one or more narrow bands (NBs) used for a deployment of the RSS,
wherein three non-overlapping RSS locations are located in each of the one or more NBs, and
wherein RSS frequency locations of a specific cell are determined based on a modular operation using a cell identifier of the specific cell.

* * * * *